United States Patent
Schneier et al.

(10) Patent No.: US 7,362,862 B2
(45) Date of Patent: Apr. 22, 2008

(54) METHODS AND APPARATUS FOR AWARDING PRIZES BASED ON AUTHENTICATION OF COMPUTER GENERATED OUTCOMES USING COUPONS

(75) Inventors: Bruce Schneier, Minneapolis, MN (US); Jay S. Walker, Ridgefield, CT (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 11/284,309

(22) Filed: Nov. 21, 2005

(65) Prior Publication Data

US 2006/0093142 A1 May 4, 2006

Related U.S. Application Data

(63) Continuation of application No. 10/309,406, filed on Dec. 3, 2002, which is a continuation-in-part of application No. 09/298,226, filed on Apr. 22, 1999, now abandoned, which is a continuation of application No. 08/677,544, filed on Aug. 8, 1996, now Pat. No. 5,970,143, which is a continuation-in-part of application No. 08/561,668, filed on Nov. 22, 1995, now Pat. No. 5,768,382.

(51) Int. Cl.
 *H04K 1/00* (2006.01)
(52) U.S. Cl. ........................................ 380/251; 380/251
(58) Field of Classification Search ................. 380/251
 See application file for complete search history.

(56) References Cited

U.S. PATENT DOCUMENTS 4,467,424 A * 8/1984 Hedges et al. ................ 463/26
4,658,093 A 4/1987 Hellman ....................... 380/25
5,036,461 A 7/1991 Elliott et al. ................ 364/408

(Continued)

FOREIGN PATENT DOCUMENTS

| GB | 2121569 A | 12/1983 |
|---|---|---|
| JP | 7-68051 | 3/1995 |
| JP | 7-255950 | 10/1995 |

OTHER PUBLICATIONS

Notice of Allowability for U.S. Appl. No. 11/284309 dated Aug. 31, 2007, 6pp.

(Continued)

*Primary Examiner*—Nasser Moazzami
*Assistant Examiner*—Mohammad Reza
(74) *Attorney, Agent, or Firm*—Walker Digital Management, LLC

(57) ABSTRACT

The present invention provides authentication of computer generated game or test results ("outcomes"), and a system by which persons who play games or take tests on a game or testing computer, respectively, may submit the outcomes of the games or tests to a central authority having at least one central computer, and have the central computer "certify" those outcomes as being accurately reported and fairly achieved. This certification of the computer generated result constitutes a "remote-auditing" of the activity taking place on the game computer. In one application, the system enables computer generated game tournaments in which players play the games on game computers and compete against each other by submitting the outcomes for those tournament games to the central computer, which certifies the outcomes and rates and ranks the players. In another application, the system provides for players of computer games to obtain a certified ranking and rating without participation in a tournament. In other embodiments, the system provides for self-authentication and certification of outcomes for games played on the game computer itself, or for mutual-authentication and certification of such outcomes on any other game computer in the system.

30 Claims, 33 Drawing Sheets

U.S. PATENT DOCUMENTS

| | | | |
|---|---|---|---|
| 5,050,212 A | 9/1991 | Dyson | 380/25 |
| 5,073,931 A | 12/1991 | Audebert et al. | 380/23 |
| 5,083,271 A * | 1/1992 | Thacher et al. | 700/92 |
| 5,112,051 A | 5/1992 | Darling et al. | 273/148 B |
| 5,155,680 A | 10/1992 | Wiedemer | 364/406 |
| 5,193,114 A | 3/1993 | Moseley | 380/23 |
| 5,202,923 A | 4/1993 | Kuriyama | 380/50 |
| 5,243,652 A | 9/1993 | Teare et al. | 380/21 |
| 5,243,654 A | 9/1993 | Hunter | 380/51 |
| 5,259,029 A | 11/1993 | Duncan, Jr. | 380/4 |
| 5,269,521 A | 12/1993 | Rossides | 273/138 R |
| 5,288,978 A | 2/1994 | Iijima | 235/380 |
| 5,297,205 A | 3/1994 | Audebert et al. | 380/23 |
| 5,319,710 A | 6/1994 | Atalla et al. | 380/23 |
| 5,326,104 A * | 7/1994 | Pease et al. | 463/18 |
| 5,347,580 A | 9/1994 | Molva et al. | 380/25 |
| 5,349,642 A | 9/1994 | Kingdon | 380/25 |
| 5,351,293 A | 9/1994 | Michener et al. | 380/21 |
| 5,355,413 A | 10/1994 | Ohno | 380/24 |
| 5,359,510 A | 10/1994 | Sabaliauskas | 364/410 |
| 5,377,268 A | 12/1994 | Hunter | 380/23 |
| 5,386,468 A | 1/1995 | Akiyama et al. | 380/25 |
| 5,398,932 A * | 3/1995 | Eberhardt et al. | 463/29 |
| 5,400,319 A | 3/1995 | Fite et al. | 369/275.5 |
| 5,412,575 A | 5/1995 | Constant et al. | 364/464.01 |
| 5,416,840 A | 5/1995 | Cane et al. | 380/4 |
| 5,434,918 A | 7/1995 | Kung et al. | 380/25 |
| 5,508,731 A | 4/1996 | Kohorn | 348/1 |
| 5,539,822 A | 7/1996 | Lett | 380/20 |
| 5,586,937 A * | 12/1996 | Menashe | 463/41 |
| 5,588,649 A | 12/1996 | Blumberg et al. | 463/18 |
| 5,643,086 A * | 7/1997 | Alcorn et al. | 463/29 |
| 5,725,428 A | 3/1998 | Achmuller | 463/20 |
| 5,768,382 A | 6/1998 | Schneier et al. | 380/23 |
| 5,850,447 A | 12/1998 | Peyret | 380/25 |
| 5,852,664 A | 12/1998 | Iverson et al. | 705/61 |
| 5,970,143 A | 10/1999 | Schneier et al. | 380/23 |
| 6,477,251 B1 | 11/2002 | Szrek et al. | 380/46 |
| 2003/0060286 A1 | 3/2003 | Walker et al. | 463/42 |

OTHER PUBLICATIONS

Office Action for U.S. Appl. No. 11/284309 dated Aug. 24, 2006, 14pp.
Notice of Allowability for U.S. Appl. No. 08/677544 dated Jan. 1, 1999, 6pp.
Office Action Summary for U.S. Appl. No. 08/561668 dated Jun. 6, 1997, 4pp.
Notice of Allowability for U.S. Appl. No. 08/561668 dated Nov. 20, 1997, 3pp.
International Search Report for Application No. PCT/US96/18834 dated Mar. 25, 1997, 3pp.
International Search Report for Application No. PCT/US96/18834 dated Mar. 25, 1997, 2pp.
Written Opinion for Application No. PCT/US96/18834 dated Nov. 26, 1997, 4pp.
International Preliminar Examination Report for Application No. PCT/US96/18834 dated Feb. 18, 1998, 3pp.
Supplementary European Search Report for Application No. PCT/US96/18834 dated Apr. 23, 1999, 1pp.

* cited by examiner

METHODS AND APPARATUS FOR AWARDING PRIZES BASED ON AUTHENTICATION OF COMPUTER GENERATED OUTCOMES USING COUPONS

RELATED APPLICATIONS

This application is continuation of U.S. application Ser. No. 10/309,406 entitled "METHODS AND APPARATUS FOR AWARDING PRIZES BASED ON AUTHENTICATION OF COMPUTER-GENERATED OUTCOMES USING COUPONS", filed Dec. 3, 2002 in the name of Schneier et al.; which is a Continuation-In-Part of now abandoned application Ser. No. 09/298,226, filed Apr. 22, 1999 now abandoned; which is a Continuation of application Ser. No. 08/677,544, filed on Aug. 8, 1996, issued as U.S. Pat. No. 5,970,143, which is Continuation-In-Part of commonly-owned, application Ser. No. 08/561,668, filed Nov. 22, 1995 and issued as U.S. Pat. No. 5,768,382.

BACKGROUND

1. Field of the Invention

The present invention relates generally to authentication of computer generated game or test results ("outcomes"), and more particularly, to a system by which persons who play games or take tests on a game or testing computer, respectively (hereinafter the "game computer" or "testing computer"), may submit the outcomes of the games or tests to a central authority having at least one central computer, and have the central computer "certify" those outcomes as being accurately reported and fairly achieved. This certification of the computer generated result constitutes a "remote-auditing" of the activity taking place on the game computer. In one application, the system enables computer generated game tournaments in which players play the games on game computers and compete against each other by submitting the outcomes for those tournament games to the central computer, which certifies the outcomes and rates and ranks the players. In another application, the system provides for players of computer games to obtain a certified ranking and rating without participation in a tournament. In other embodiments, the system provides for self-authentication and certification of outcomes for games played on the game computer itself, or for mutual-authentication and certification of such outcomes on any other game computer in the system. The system further enables the submission and certification of test outcomes using the same methodology.

The present invention also provides for "pay-per-use" in the home video game environment, where any game computer may be turned into a video game arcade machine by metering usage of the game computer and/or game programs that run on the game computer. Players simply pay per game, or for play over a specified period of time in accordance with different pricing protocols. The invention also allows for "time-dependent disablement" which lets players acquire game consoles for a relatively low down payment. Charges for game play may then be incurred on a daily, weekly, monthly, or some other periodic basis.

2. Description of the Prior Art

Tournaments are a popular form of recreation and are amenable to many forms of organized activities, such as sports or games. There are two primary types of tournaments. In the first, players compete against one another (i.e., head-to-head), singularly or in teams, under controlled conditions. Examples include boxing, chess, karate and the like. In the second, players play a game without direct or simultaneous interaction with another player, where the player having the best score (e.g., golf, bowling, etc.), fastest time to completion (e.g., puzzles) or some combination thereof is pronounced the winner. Winners earn recognition for their skill and sometimes even prizes. Accomplished players of games of skill are often provided with an officially recognized ranking, rating and/or title.

Classic tournaments are usually held at a specific time and at a specific location, where they are conducted under a set of rules which apply equally to all contestants, and under the supervision of one or more judges and/or a sanctioning authority. A typical chess tournament may include one hundred to two hundred players who get together at a central location. They pay an entry fee and play a series of games over the course of a specified time period under the auspices of an officially sanctioned tournament director(s). At the end of the competition, the players are ranked and cash prizes are awarded to the top finishers. The United States Chess Federation administers a national rating system that ranks players with a numerical rating based upon the results of tournament sanctioned games against other rated players. Ratings may change over time as the player wins and loses games played in ongoing tournaments. Various rating ranges are given named titles. For example, an "Expert" chess player has a rating of between 2,000 and 2,200 and a "Master" chess player has a rating over 2,200 and so on.

The aforementioned tournaments have several drawbacks. Since most tournaments are held at some specified location, it is likely that some players may have to travel an appreciable distance, incurring expenses for travel, food, lodging and the like. Furthermore, it is often difficult to schedule a given tournament at a time that is convenient for all participants. In addition, there are only a limited number of sanctioned tournament directors who are available to run such tournaments. Since the fundamental object of any tournament is to ensure the integrity and authenticity of the results, without a tournament director, the results of the tournament are not verifiable. It is also difficult and impractical to run niche tournaments that appeal to a very small segment of the population, as the fixed costs associated with running a tournament can make it economically impractical where only a few participants are involved.

Aside from the so-called classic tournaments mentioned above, the players of many popular computer generated games enjoy competing for bragging rights as to who has the best score. Most arcade gaming machines typically display a series of high scores identifying the most recent top scoring players who played on a specific machine. Similarly, some dedicated game systems such as Nintendo, Sega and the like, and personal computers with dedicated game software, may display a series of high scores identifying top scoring players. While this enables a player who achieves a sufficiently high score to compare his or her performance with other players who have played on that particular machine or computer with that software, there is no way to prevent players from lying to others about their "purported" score. Therefore, there exists a need for a system whereby players of such games can register their scores with a central computer that certifies the scores and enables players to receive their ranking/rating with respect to other players on a national or even worldwide scale. In this connection, such a system could enable players of such games to participate in "electronic" tournaments where players either play individually or in teams on independently disposed game computers, or head-to-head via an on-line connection between at least two competing players.

One approach to electronic tournaments is disclosed in U.S. Pat. No. 5,083,271 to Thacher et al. ("Thacher"). In the Thacher system, a plurality of gaming terminals are networked to a central computer. A player purchases credit, enters a tournament, and is assigned a unique identification code. This identification code is stored in the gaming terminal and at the central computer. The player then proceeds to play a tournament game on the gaming terminal. When the player has finished the game, the player's score is transmitted to the central computer along with the player identification code and a game identification number. The central computer sorts through all of the scores at the conclusion of the tournament and determines a winner. The Thacher patent claims to provide some level of protection against substitution of players by utilizing a separate personal identification code for each player. Thus, to the extent that a player's personal identification code is not compromised, the person playing the game is uniquely identified with the achieved score. This arrangement has disadvantages, however, including the extensive network between all of the participatory game terminals, and the inability to verify that the scores in the tournament games were accurately reported and fairly achieved. For example, there is nothing in the Thacher system which prevents a player from modifying the game software to produce a more favorable outcome, or from intercepting communications of score and identification data from the remote gaming terminal to the central computer and then altering the same to register a false score.

Another well known system for "authenticating" video game scores utilizes a primitive method in which players take photographs of both video screens containing game scores and the game console, and then mail the pictures to a central authority. The monthly magazine Nintendo POWER publishes the Power Players' Arena, in which top scoring players are identified. Top scoring players receive Nintendo POWER Stamps which can be redeemed for prizes. The photograph of the video screen ostensibly prevents a player from simply making up a score. The photograph of the video screen and the game console supposedly enables the central authority to determine whether the player has utilized any unauthorized device to change the standard play conditions for the game. This system has a number of disadvantages. Taking a clear photograph of a video display is often difficult due to the reflective nature thereof. There is also a considerable amount of time that is required to transmit the photograph to the central authority and players must wait for the scores to be authenticated by Nintendo and thereafter published. This system is also vulnerable to players hacking the game software. No effort is made to determine whether or not the game software was tampered with. The use of well known interposing devices such as the GAME GENIE, which fits into the access port of a standard game console and enables codes to be entered that temporarily change the play conditions as software instructions are loaded into the read-write memory of the game console from the read-only memory of the game cartridge, is ostensibly prevented by requiring that a photograph of the entire game console accompany the photograph of the video screen. However, players can easily circumvent this problem by playing a game with an interposing device, taping the output with a VCR, thereafter removing the interposing device, and then playing back the recorded game for a subsequent photograph to be made without the interposing device installed in the game console.

Thus, there exists a need for a system that enables game computers operating independently at different times or in different places to certify their game outcomes in a manner that can be verified by a recipient thereof for purposes of comparison with other game outcomes. The system should allow such certification to be performed either by another game computer, or by a central computer. The system should not require complicated networking or real-time connections between the game computers, or between each game computer and the central computer during game play. The system should further allow for establishing the players' ranking, rating and/or title with respect to other players of the games based upon the players' certified scores.

In view of the above, there also exists a need for a system which permits players to participate in tournaments on game computers at any place and any time, without requiring complicated and costly networks or an on-line connection between the game computer and a central computer while the game is being played, without the need for the players to go to a specified location, and without the need to have an officially sanctioned tournament director present where the games are being played while still ensuring the authenticity of the participants' scores. The system should further allow for establishing the players' ranking, rating and/or title in the tournaments with respect to other players of the games based upon the player's certified scores.

It is also known in the art to remotely control and monitor the use of video game software as disclosed in U.S. Pat. No. 5,497,479 to Hornbuckle. This patent teaches a system whereby rental software is downloaded from a central computer to a remote control module (RCM) which is operably associated with a game computer. The RCM operates to receive rental software packages from the central computer, and to control and verify the use of such software on the game computer. The rental software resides in the insecure memory of the game computer. A portion of the software is referred to as a "key module", a part of the software that is essential to program execution and without which the overall program will not execute on the game computer. The key module resides in an encrypted format, and must be decrypted by the RCM.

After such decryption, the key module is loaded with the rest of the program into the RAM of the game computer for execution. When the program is terminated, the decrypted instructions are erased from the RAM of the game computer. The RCM records the elapsed time between starting and stopping of the rental program, and stores such information in its memory for subsequent processing.

The Hornbuckle system suffers a primary drawback in that the key module resides in the insecure RAM of the game computer, thereby enabling a hacker to get at the key module, and allowing replacement of the key module in the data storage of the game computer. It would therefore be desirable to provide a system in which the use of game programs can be metered using cryptographic protocols without compromising secure encrypted portions of the such programs by not loading the same in unencrypted format into the insecure memory of a game computer. It would also be desirable to provide a system in which use of the game computer itself can be metered using similar protocols.

DETAILED DESCRIPTION OF THE PREFERRED EMBODIMENTS

Figure 1A:
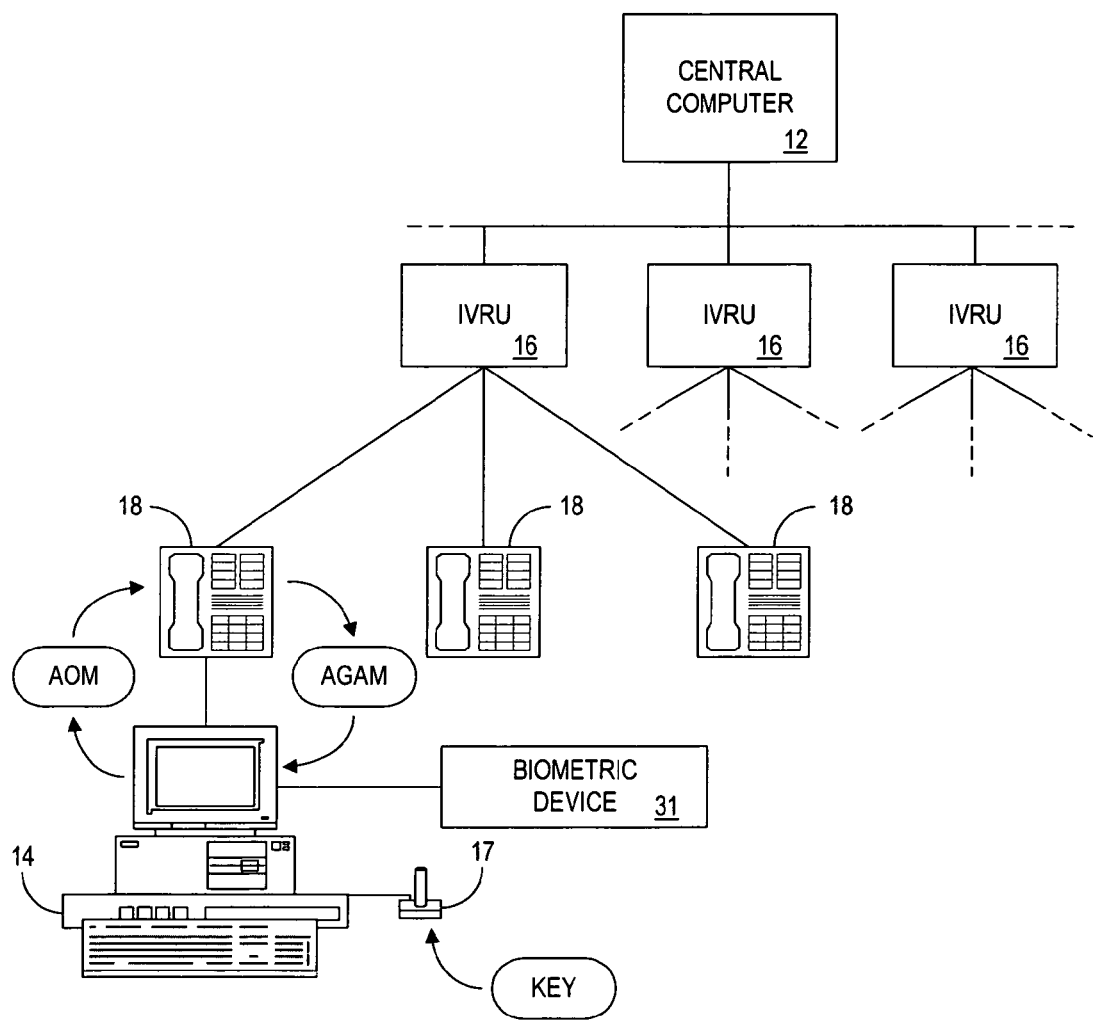
FIG. 1A is an overall schematic of the inventive system in one embodiment.

In view of the foregoing, the present invention provides a system for enabling geographically dispersed tournaments for computer generated games in which players can participate from virtually any location where they have access to a game computer (e.g., at home), without the need for an on-line connection between the game computer and the central computer while the game is being played.

The present invention provides a system for certifying the outcome of a computer generated game on a game computer and for ranking and rating the player based on that outcome or an aggregation of outcomes, with respect to other players of the game, by authenticating the outcome(s) of the game utilizing a central computer, either in connection with a given tournament or independent thereof, thereby eliminating the need for a trusted third party to be present at the tournament site or to be on-line to ensure that the outcomes were legitimately achieved and accurately reported.

The present invention further provides a system that enables a test taker of a computer administered test on a game computer, where the test is not provided on-line, the test software residing or associated with the game computer, to have his or her test score certified with a central computer and to obtain a ranking and rating with respect to other test-takers.

The present invention further provides a system for certifying outcomes of computer generated games played on game computers, and for ranking and rating the players of such games based on their outcomes or an aggregation of their outcomes, with respect to other players of the games, with a central computer having a database storing a unique attribute or identifier for each game computer or software, by generating authenticatable messages on the game computer that represent the players' game outcomes and the unique attribute or identifier associated with the particular game software or the game computer, and authenticating the authenticatable message at the central computer using cryptographic protocols.

The present invention further provides a system for providing cash prizes or other awards or tokens of recognition for players in accordance with their certified ranking and/or rating as described above.

The present invention further provides a system for certifying times to completion for races of skill played on game computers which start at designated times, either in connection with a given tournament or independent thereof, where the first participant to complete the game and have his or her time of completion certified by the central computer is declared the winner, and for enabling the participants to be ranked and rated with respect to each other.

The present invention further provides a system for races of skill tournaments, where the start times of the games are variable and players are ranked by the length of time it takes to finish playing the games as determined by a clock associated with the game computer or an external clock signal broadcast over a mass communications means, where the time is authenticated at the central computer and the player finishing a given game in the shortest amount of time is declared the winner.

It is yet another object of the present invention to provide a system for rating/ranking players in tournaments engaged in races of skill as described above, where the players obtain scores for the games where these scores are adjusted by the amount of time it took to complete the games and/or any other play conditions, at the central computer.

The present invention further provides a system for rating/ranking players in tournaments where groups of players form teams and the team scores are certified and ranked at the central computer.

The present invention further provides a system in which players engage in tournaments on game computers, where a start message which enables tournament play contains variables which are read by the game computers and direct the game programs to set game parameters based on player's individual ratings or other parameters, with certain specified attributes or other programmed characteristics, e.g., difficulty, variability, randomness, etc.

The present invention further provides a system in which players engage in tournaments on game computers where the players decide when they want to enter the tournaments and play.

The present invention further provides a system in which players engage in tournaments on game computers and where hardware security and/or cryptographic protocols are utilized to ensure the fairness and integrity of the tournament.

The present invention further provides a tournament system using cryptographic and other protocols, where a trusted third party is not required to prevent undetected player substitution.

The present invention further provides a system where the outcomes of computer games of chance are submitted to a central authority and certified using cryptographic and other protocols.

The present invention further provides a system in which players of video games having different ratings/skill levels may play head-to-head matches where the playing conditions during the game are equalized in response to handicap codes.

The present invention further provides a system wherein a computer generated result or outcome obtained on a computer is incorporated into an Authenticatable Outcome Message by the computer, and may be subsequently authenticated on the computer with cryptographic protocols.

It is yet another object of the present invention to provide a system in which a computer generated result or outcome obtained on any computer in the system is incorporated into an Authenticatable Outcome Message by that computer, and may be subsequently authenticated on any other computer in the system with cryptographic protocols.

The present invention further provides a system in which all data in connection with recreating a game played on a game computer may be stored on removable data memory media in an authenticatable format and subsequently used to generate a replay of the game on any game computer in the system by authenticating the data using cryptographic protocols.

The present invention further provides a system in which a device placed between a game computer and a TV, reads the data in a video output signal to obtain an outcome for the game from the video output signal, and incorporates the outcome into an Authenticatable Outcome Message.

The present invention further provides a system in which a device compatible with a VCR is placed between a game computer and a TV, reads the data in the video output signal, converts the data to digital format, makes the data authenticatable using cryptographic protocols, and stores the authenticatable data in data memory media for subsequent authentication and play back.

The present invention further provides a pay-per-use system for enabling video arcade type play on home game computers.

The present invention further provides a pay-per-use system for enabling time-dependent disablement with cryptographic protocols of game computers and/or game software.

The present invention further provides a novel, multi-functional game controller for implementing the foregoing with existing game console-type game computers.

In accordance with the foregoing, the present invention includes a system for authenticating the outcomes of computer generated games played on game computers, and for certifying those outcomes as being accurately reported and fairly achieved. The system provides for such certification in connection with tournaments or independent thereof. The system generally comprises, in one embodiment, a plurality of game computers, where each game computer includes associated memory and a processor for executing programs from its associated memory. The term "associated memory" is intended to include the internal read only memory ROM and read-write memory RAM of the game computer, as well as external devices such as hard disk drives, CD-ROM drives, floppy disk drives, game cartridges and the like. This memory is generally insecure, and may also be referred to as an insecure data source. The game computer contains game software including at least one game program that is executed by the processor to enable a player to play a game on the game computer. The games may be games of skill, races of skill, games of chance, predictions on future events of which the outcome is uncertain, and the like. In a game of skill, the game has an outcome as a result of game play, where the outcome is defined as the entire set of results of the game, including a score, time to completion, all data relating to the game itself, and any play related data. In the present invention, the outcome of the game is incorporated into an Authenticatable Outcome Message AOM that may be subsequently authenticated on the same game computer itself, any other game computer, or by a central computer. In some embodiments described herein, the authentication process not only authenticates but certifies the outcome as being accurately reported and fairly achieved.

An authentication means for generating and authenticating authenticatable messages is operatively associated with the processor of the game computer. The authentication means comprises what is referred to herein as an encryption/decryption module that utilizes cryptographic protocols. The encryption/decryption module may be part of the game software disposed in the associated memory of the game computer, or dedicated firmware disposed within the game computer. Preferably, however, the encryption/decryption module resides within a secure perimeter or security token as described in detail below. The Authenticatable Outcome Message may include data that reveals if the game software has been tampered with by the player. This data is also generated, checked and verified using cryptographic protocols, and is described in more detail below. An authenticated outcome that is determined to have been achieved without cheating the game software or the game computer is certified. The Authenticatable Outcome Message generated by the encryption/decryption module may be subsequently authenticated on the same game computer, on any other game computer with an encryption/decryption module, or by a central authority on a central computer.

The central computer includes an associated memory, a processor for executing programs from the central computer associated memory, and central computer authentication means operatively associated with the processor of said central computer for generating and authenticating authenticatable messages. The central computer authentication means are operable to authenticate Authenticatable Outcome Messages to authenticate game outcomes in response to authentication requests. By checking data appended to the outcome, the central computer can ascertain whether a player obtained the outcome by "cheating" the game software. The central computer may contain a plurality of relational databases for both certifying scores and managing tournaments. The procedures invoked to implement these functions are described in detail below and depicted in the accompanying drawings.

Where a central computer is used to certify outcomes and manage tournaments, communications between the game computers and the central computer may be transmitted via a telephone network. The telephone network may enable communication with live operators, but is preferably coupled to Interactive Voice Response Units IVRUs. The IVRUs are employed to prompt players to enter required information in connection with registering for tournaments and/or for submitting outcomes embodied in Authenticatable Outcome Messages for certification. Alternatively, the game computers may establish an on-line connection to the central computer for the purpose of transmitting registration data and Authenticatable Outcome Messages. The on-line connection may take place over a data network including commercial on-line service providers, Internet, World Wide Web, bulletin board systems or over RF, cable TV, satellite links and the like.

Another aspect of the invention provides for pay-per-use of the game computer or game programs that are executed on the game computer. The pay-per-use system includes a meter that communicates with the game computer, and operates to enable operation of the game computer or execution of game programs upon authorization from the central computer. The meter is a secure device, a computer having hardware disposed within a secure perimeter, capable of generating and authenticating authenticatable messages as described above. In a preferred embodiment, the meter controls operation of the game computer and/or game programs using cryptographic protocols.

In the inventive system, the operating system program of the game computer and game programs, are referred to as metered programs. Each metered program is comprised of a Software Control Block, an Insecure Software Component, and a Secure Software Component. In a first embodiment, the entire metered program resides in an insecure data source associated with the game computer, such as a hard disk or the like. The Secure Software Component is a cryptographically secure set of software instructions, that are decrypted by the meter and executed on the meter to produce at least one output parameter upon which the Insecure Software Component depends, in order to execute the latter on the game computer. The Software Control Block contains information about the metered program that identifies it to the meter, and, in some embodiments, enables the meter to calculate costs for running that program. The meter decrypts and executes the Secure Software Component as long as it has authorization from the central computer, in the form of a time or cost limit.

The many aspects of the present invention will best be understood as the detailed description thereof proceeds with particular reference to the accompanying drawings. With reference to the several views of the drawings, there are shown several embodiments of a system in accordance with the present invention generally denoted by the reference numeral 10.

In the embodiment shown in FIG. 1A, the system is principally comprised of a central computer 12 associated with a central authority, and a plurality of game computers 14. The term "game computer" is intended to include personal computers ("PCS"), personal digital assistants, coin-operated arcade video gaming machines, television units coupled to game units (e.g., game consoles such as Nintendo, Sega, etc.) and portable game devices (e.g., GAME BOY, GAME GEAR, NOMAD and the like). For the purpose of description, the game computer depicted in the drawings replicates a standard PC. Each game computer 14 contains software and/or firmware (for convenience, all references herein to programs are to "software") which generates games of the type well known in the art. The practice of playing games on the game computer 14 may be classified as a person against game activity. At the conclusion of a game, the player submits the outcome (e.g., a score and/or time to completion, a combination thereof and any other play-related data) to the central computer 12 as described in detail below. However, many popular games allow for players to play against each other on the same game computer 14, or by establishing an on-line connection between the players', respective game computers 14. In this case, the outcome of the players', competition is submitted and certified (e.g., player A beat player B with a score of X to Y). In the following description, each game computer 14 includes game software 15 which resides in memory generally identified by the reference numeral 23. The memory 23 includes read-write memory RAM, read-only memory ROM, and any non-volatile data source of programs associated with the game computer 14, such as a game cartridge, hard-disk, CD-ROM, PCMCIA card or special flash ROM chip. The specifics of the game software 15 as relates to the present invention will be described in more detail below. The game computer may also have an associated input control device 17, such as a joystick (shown) as is well known in the art. The input/output device 17 may comprise multiple joysticks or controls for players to play against each other.

The central computer 12 authenticates and/or certifies outcomes and manages tournaments. It is shown schematically in the drawings as a single unit, but may comprise a plurality of networked computers as required. In order to facilitate tournaments on a large scale, it may be required that the central computer 12 be broken up into regional computers, national computers and even a top level international computer. These computers may be interconnected via data networks such as TYMNET, DATAPAC or the like. The national computers poll the regional computers and the international computer polls the national computer for tournament data. Thus, regional tournaments only utilize the regional computers. If national tournaments are to be held, the national computers obtain the required tournament information from the regional computers. In the case of an international tournament, the international computer polls the national computers. Alternatively, several computers on a single level may be arranged so as to periodically verify each other in accordance with known principles. There are many ways in which the computers can be arranged, so for the purpose of description herein the central computer 12 is referred to as a single unit. As described in more detail below, in another embodiment of the invention, each game computer 14 is capable of authenticating an outcome from another game computer 14, with the central computer 12 operating as a Key Distribution Center ("KDC"), i.e., a database of encryption keys used for authenticating messages. The central computer 12 may also operate a "central scoreboard," i.e., a database where all certified scores and statistical information on players and teams are maintained. Statistics for a given player may include information on opponents, the time of play, ratings, rankings and the like. The information may be publicly available, or password protected (i.e., available only to those persons with the proper access password, or to those that have attained a certain rating threshold). The information may be made available via the Internet or major online providers, downloaded to game computers, or by mail or telephone.

Figure 1B:
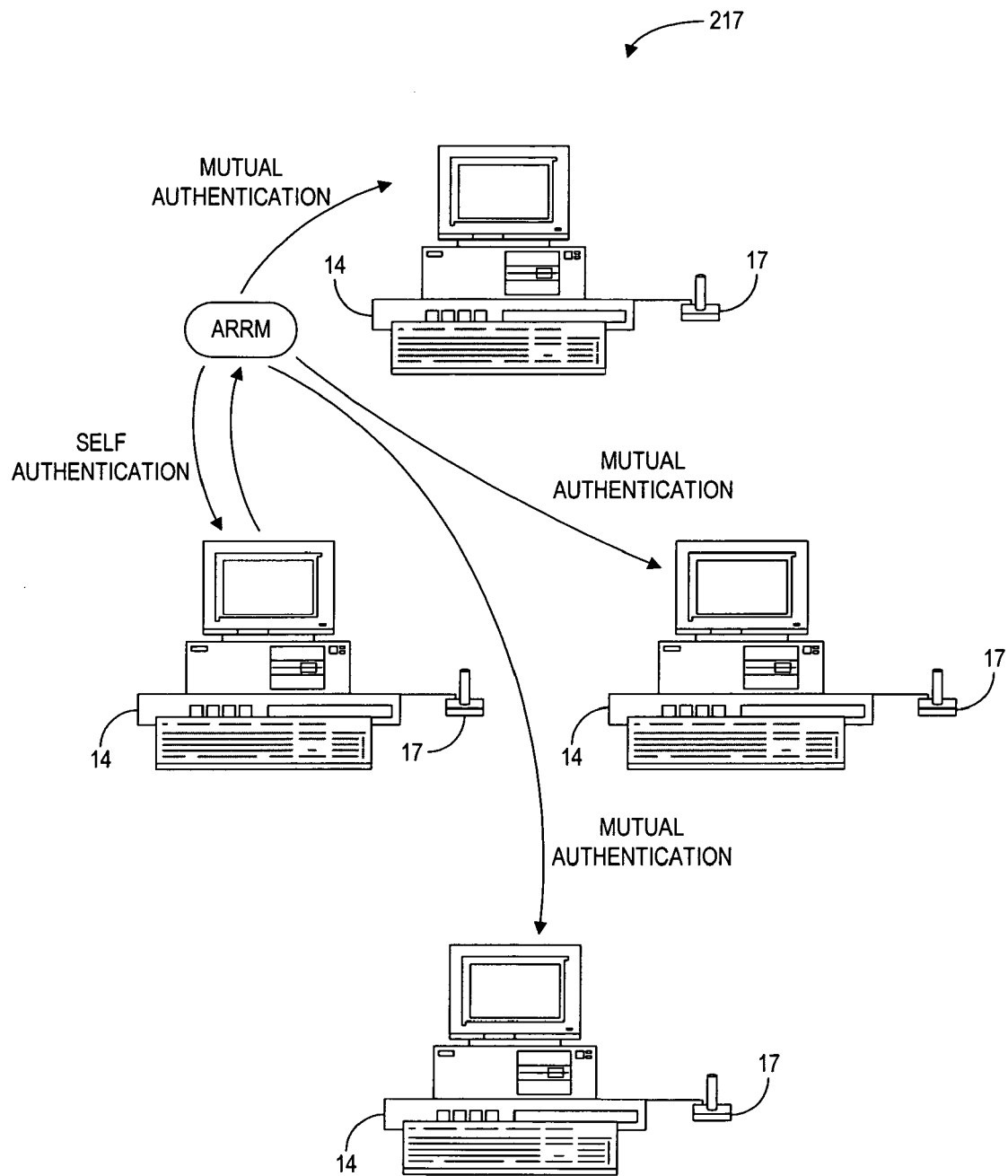
FIG. 1B is an overall schematic of the inventive system in a self-authentication and mutual-authentication embodiment.

In the embodiment shown in FIG. 1B, the game computers 14 are capable of "self-authentication" and "mutual-authentication." Self-authentication means that a game computer 14 can authenticate an outcome incorporated in an Authenticatable Outcome Message AOM which it generated. For example, if a player claims that a score printed on a piece of paper, or stored in a given memory media, is authentic, and this score is embodied in an Authenticatable Outcome Message AOM, the score may be authenticated by authenticating the authenticatable message AOM on the game computer 14. Similarly, the authenticatable message may be authenticated on any other game computer 14 in the system (i.e., mutual-authentication). The authentication protocols will be explained in more detail below.

Referring again to the embodiment shown in FIG. 1A, at least one Interactive Voice Response Unit ("IVRU") 16 is associated with a telephone network and coupled to the central computer 12 through a standard interface for access from a plurality of telephones 18, to enable players to enroll in tournaments and/or to submit the outcomes of the games to the central computer 12 for certification. In certain implementations, a player may register personal information and/or the game software 15 with the central computer over the telephone 18. Specifically, IVRUs are responsive to both voice and touch-tone signals communicated from the telephones 18. In this connection, the game computer 14 may communicate with a Dual Tone Frequency Modulator ("DTFM") to generate messages compatible with the IVRUs 16. An acoustic coupler 115 may be used to receive messages from the telephone 18 in the same manner. Since the operation of the IVRUs 16 and DTFMs are well known in the art, they need not be described in detail herein. The IVRUs 16 may be associated with an automatic call distributor ACD of the type known in the art to balance the call load. During times of peak calls, calls to any IVRU 16 may be routed to a neighboring IVRU 16.

Figure 2:
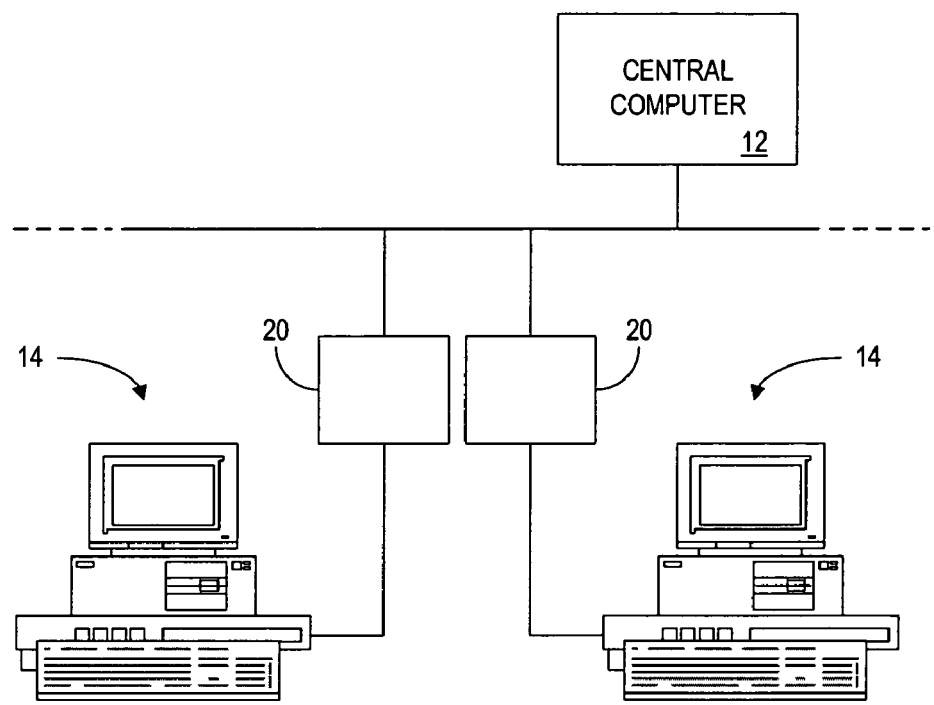
FIG. 2 is an overall schematic of the inventive system in another embodiment.

In an alternative embodiment shown in FIG. 2, the game computers 14 may communicate with the central computer 12 via a modem 20. In this regard, the game computers are not considered to be on-line with the central computer during the game. When a player desires to submit his or her outcome for a particular game or time of completion for a race of skill, the game computer 14 dials up and obtains access to the central computer, and uploads the game outcome information. This is discussed in more detail below. In this connection, it is anticipated that the central computer 12 may be accessed via a website 22 on the Internet 24 or over an on-line data network including commercial on-line service providers, bulletin board systems and the like, as shown schematically in FIG. 3. The process for establishing an on-line connection to a website on the Internet is well known and need not be described here in detail. It is essentially analogous to establishing a direct on-line link between the game computer 14 and the central computer 12. In yet other embodiments, the game computers 14 may communicate with the central computer 12 over RF, cable TV, satellite links and the like. For example, in an RF embodiment, communications are simply broadcast in an RF format and transmitted between the game computer 14 and the central computer 12. The same prompting arrangement as with an IVRU 16 may be employed, with the player entering commands instructing the game computer 14 to send a message to the central computer 12 directly through the key pad or joystick of the game computer 14. Similarly, messages may be communicated over a cable TV link directly to a television interfacing with a game console.

It is also anticipated that communications between the game computers 14 and the central computer 12 can be implemented with a physical data memory device such as a smart card, diskette and the like. The game computer 14, for example, might store game-related data onto a diskette which the player would be required to mail to the managing authority for inspection at the central computer 12. Such a procedure might be required in all instances where the player had won a substantial prize, or where cheating is suspected by tournament officials. Moreover, the game computer 14 may communicate with a printer for printing a copy of an outcome, a game screen containing the outcome and any other relevant data such as game statistics and the like, which may be mailed or faxed to the central authority for subsequent certification of the outcome and such data with the central computer 12.

Figure 4A:
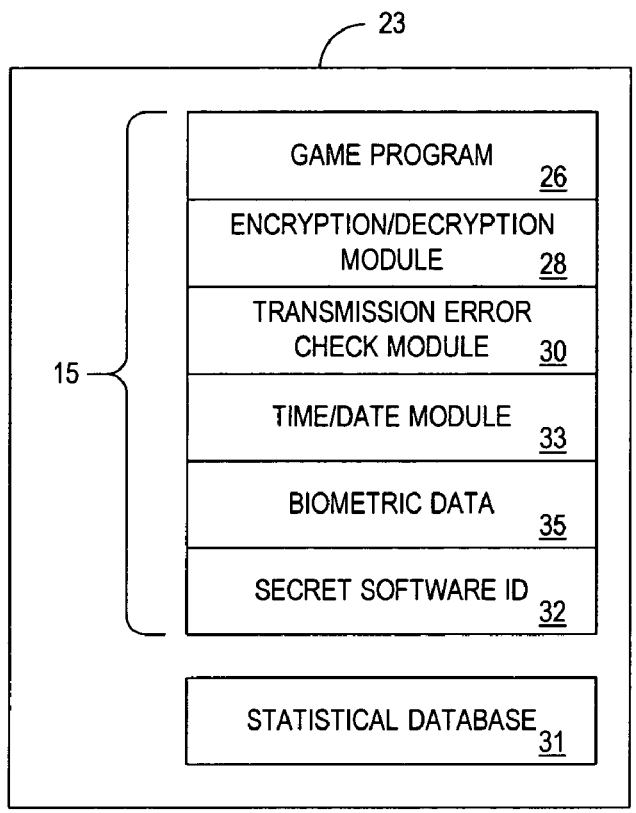
FIG. 4A is schematic of the memory arrangement and general components of the game computer.
Figure 4A:
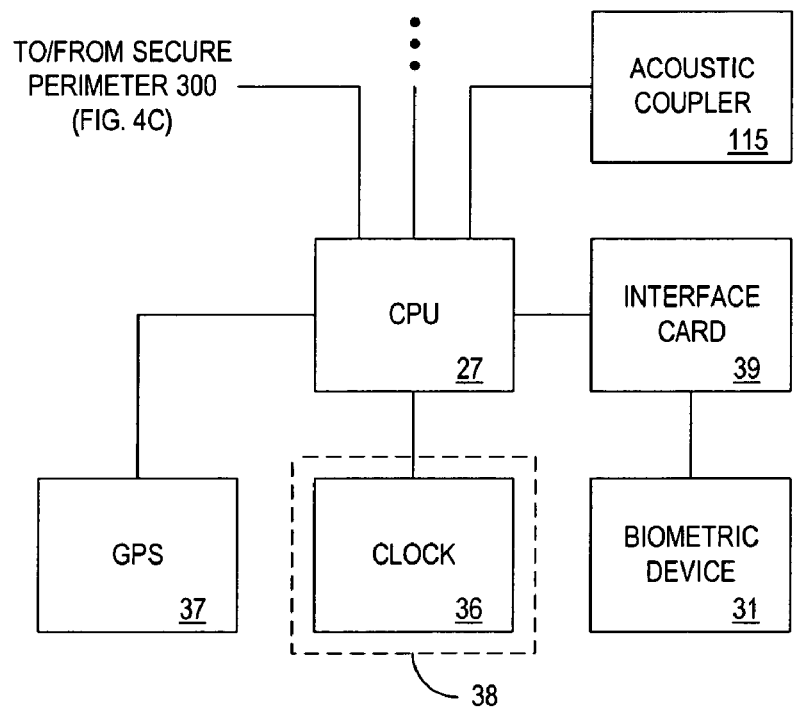

Referring now to FIG. 4A, there is shown a schematic of a portion of an illustrative memory arrangement and some hardware for the game computer 14 in the system of the present invention. For convenience, the internal memory 23 of a personal computer 14 is shown. As described above, the memory 23 includes RAM and ROM, and is coupled to a central processing unit ("CPU") 27 in a conventional manner. The CPU 27 and related hardware are typically referred to as a processor. We use the term "associated memory" to indicate that the game computer memory 23 may also be defined to include a non-volatile insecure data source of programs such as a game cartridge, hard disk, floppy disk, PCMCIA card, special flash ROM chip and the like. Secure memory is disposed within a secure perimeter that will be defined below. The processor loads programs into RAM and executes programs from memory in a conventional manner. In the illustrative embodiment, memory 23 contains a game software package 15 comprised of a game program 26, an encryption/decryption module 28, a transmission error check module 30, a secret software or game computer ID ("SSCID") stored in memory area 32 which uniquely identifies the particular game software 15 and/or game computer 14, a time/date module 33, and biometric data in memory area 35. The game software 15 may comprise a single "program," with the individual elements thereof constituting separate routines. For the purpose of description herein, the term game software 15 can be broadly defined to include a plurality of constituent programs, instructions, routines, files, databases, etc. The game software 15 may also have an associated non-secret software serial number SSN, the purpose of which will become apparent below. The transmission error check module 30 is used to process all incoming messages to the game computer 14 to detects manual, inputting errors, corruption of transmitted data due to communication problems such as line noise and the like, to enable a resend indication or request to be made. The time/data module 33 time-stamps messages using signals from the clock 36. The biometric data stored in memory area 35 is used for player verification, which is described in greater detail below. A dedicated game computer 14 may have all of its components including its associated memory 23, CPU 27 and clock 36 housed in a tamper-resistant and/or tamper-evident enclosure to prevent and reveal, respectively, tampering with any of these components. Tamper-evident enclosures include thermoset wraps which, upon inspection, can reveal any attempt to physically open the structure. Tamper-resistant structures may electronically destroy the memory contents of data should a player try to physically open the structure. A secure perimeter is a defined physical area of hardware which is tamper-resistant and/or tamper-evident, as described in more detail below.

The game program 26 generates games of skill of the type known in the art and commonly played in tournaments such as chess, backgammon, bridge, and the like. Other well-known games of skill (e.g., SONIC AND KNUCKLES, VECTORMAN, DONKEY KONG COUNTRY, MORTAL KOMBAT STREET FIGHTER, etc.) include those played on dedicated gaming machines such as game consoles, in an arcade or other place where such gaming machines reside. The game program 26 may be configured to enable games to be played in a practice mode, in which the outcomes are not certified or part of a tournament. Such practice games may not have the full functionality of tournament games. A practice golf game, for example, might have less complex wind patterns with wind speed and direction being fixed for a given hole. The tournament version may have winds that frequently change, and which may vary depending on the location of the ball. The game program 26 may also be arranged to include teaching modes for instructing players in a manner consistent with the way they play the game or its result.

The game program 26 may compile a statistical database 31 to store tournament game data that specifically relates to the player's actions during the game. For example, the player of a tournament game may have found X treasures, reached Y levels and eliminated Z enemies. This information may be stored and accessed only by the player who enters the proper code or message into the game computer 14. This message may be the start message which enables tournament play as discussed below. In a further application, certain aspects of the game, such as, for example, a screen or sequence of events where a player performed a certain move or where a particular opponent was defeated, may be stored and indexed in a database by a certain code to enable the player to call up any one of such screens or sequences at a later time by entering the start message associated with that game (in the case of a tournament) or by some other special command. A menu can be generated upon receipt of the start message or command, enabling the player to select and view the desired screens or particular sequences of events in the game.

The game program 26 may generate races of skill. These include puzzles where the player having the quickest time to completion is declared the winner. A crossword puzzle is a classic race of skill in which players compete to be the first to correctly solve the puzzle. Driving games with lap times also represent races of skill in which the shortest time to the finish line is declared the winner. Referring again to FIG. 4A, to time races of skill, the game program 26 may use a signal from the computer's clock 36 through the time/date module 33 to time-stamp a particular outcome message or to generate a time message which represents the amount of time the player took to complete a given game. In this connection, the clock 36 may be housed within a tamper-resistant and/or tamper evident seal 38. Preferably, a real-time clock 36 is disposed within a secure perimeter 300 as described below. In another embodiment described below, the clock 36 may reside within a dedicated game cartridge 21.

In yet another application, the game program 26 may generate games of chance where the outcomes of such games are submitted and certified in accordance with the invention.

The outcome of a game is defined as the entire set of the results of the game, including a score, time to completion in the case of a race of skill, or a combination of both. Alternatively, the outcome may be comprised of all data relating to the game itself (i.e., data stored in memory that enables the entire game to be recreated). In a golf game, for example, such data may include each shot that the player takes, which represents a combination of parameters such as current wind speed, club selected, foot placement, force with which the ball is hit, etc. If these parameters are stored to a disk as the game proceeds, it is possible to subsequently recreate the entire game by replaying the stored parameters. For added security, these values may be stored in encrypted form so that the player cannot alter the game data representing such results after the game is completed.

For typical scored games, execution of the game software 15 by the game computer 14 results in an outcome representing the player's score and, optionally, additional game related information such as the number of levels attained, amount of time spent at each level, number of lives lost, number of enemies eliminated and the like. A game may also have multiple outcomes associated with it. In a game of chess, for example, each move may be considered a separate outcome. Each move can be authenticated by the central computer. In some games, an individual's score may be dependent upon the scores of other players. Authenticating one player's outcome thus requires knowing the outcomes of the other players. For a race of skill, such as a puzzle, execution of the game software 15 by the game computer 14 results in an outcome representing the elapsed time it took the player to complete the game and, optionally, other game related information or subsidiary events such as the completion of certain sub-levels in the game and the like.

An outcome may be transformed or incorporated into an Authenticatable Outcome Message AOM (for clarity, a time of completion is transformed or incorporated into an authenticatable time message ATM) by using a variety of cryptographic protocols including one-way hash functions (also known as compression functions, contraction functions, message digests, fingerprints, cryptographic checksums, data integrity checks (DICs), manipulation detection codes (MDCs), and data authentication codes (DACs), one-way hash functions with encryption keys (also known as message authentication codes (MACs), digital signatures, and the like, with the encryption/decryption module 28. The practice of using cryptographic protocols to ensure the integrity and security of messages is well known in the art and need not be described here in detail. For reference, one of ordinary skill in the art may refer to BRUCE SCHNEIER, APPLIED CRYPTOGRAPHY, PROTOCOLS, ALGORITHMS, AND SOURCE CODE IN C, (2d Ed, John Wiley & Sons, Inc., 1996). The encryption/decryption module 28 contains algorithms and keys for encrypting, decrypting and/or authenticating messages. Examples of well-known cryptographic authentication protocols are as follows:

Encryption:

Setup: Central computer 12 and game computer 14 share a secret key.

1. Game computer 14 encrypts outcome message with the shared secret key to form an Authenticatable Outcome Message AOM.

2. Communicate Authenticatable Outcome Message AOM to central computer 12.

3. Central computer 12 reads and decrypts the Authenticatable Outcome Message AOM with the same key.

4. If the message is intelligible, then the central computer 12 accepts the outcome message as authentic.

*Encryption may be implemented with an algorithm such as DES (U.S. Government standard, specified in FIPS PUB 46). Encryption may utilize any of several algorithms known in the art such as IDEA, Blowfish, RC4, RC2, SAFER, etc. See APPLIED CRYPTOGRAPHY.

Message Authentication Code:

Setup: Central computer 12 and game computer 14 share a secret key.

1. Game computer 14 hashes outcome message with a MAC and the shared secret key to form an Authenticatable Outcome Message AOM.

2. Communicate Authenticatable Outcome Message AOM to central computer 12.

3. Central computer 12 reads the AOM and hashes the message with the shared secret key.

4. If the generated hash matches the received hash, the central computer 12 accepts the outcome message as authentic.

*Any of the MAC algorithms, such as, for example, DES, CBC and the like may be applied in this application.

Encryption with Public Key Cryptography

Setup: Game computer 14 has a public-key/private key pair. The central computer 12 knows the game computer 14's public key.

1. Game computer 14 encrypts outcome message with the private key to form an Authenticatable Outcome Message AOM.

2. Communicate Authenticatable Outcome Message AOM to central computer 12.

3. Central computer 12 decrypts the AOM with the public key of the game computer 14.

4. If the message is intelligible, the central computer 12 accepts the outcome message as authentic.

A sample algorithm for this procedure is RSA.

Signing with Public Key Cryptography

Setup: Game computer 14 has a public-key/private key pair. The central computer 12 knows the game computer 14's public key.

1. Game computer 14 signs the outcome message with the private key to form an Authenticatable Outcome Message AOM.

2. Communicate Authenticatable Outcome Message AOM to central computer 12.

3. Central computer 12 verifies the signature using the outcome message and the public key. The mathematics of verification indicates whether the outcome message is authentic.

4. If the outcome message is intelligible, then the central computer 12 accepts the outcome message as authentic.

There are several ways to ensure that an Authenticatable Outcome Message AOM is "fresh" (i.e., it has been used more than once). In the first, known as "challenge/response", the central computer 12 generates a-random or sequence number (also referred to as a "nonce") and communicates it to the game computer 14. The game computer 14 then incorporates this random number in the Authenticatable Outcome Message AOM. If the random number received matches the random number just generated, the central computer 12 accepts the message as fresh, i.e., an old message would contain a different random number.

In another method, the game computer 14 includes a sequence number in the Authenticatable Outcome Message AOM. This sequence number is incremented by one every time the game computer 14 generates an Authenticatable Outcome Message AOM. The central computer 12 stores the most recent sequence number in memory. It accepts the current outcome message if the sequence number received is one greater than the stored sequence number.

In yet another implementation, the game computer 14 includes the current time in the Authenticatable Outcome Message AOM. The central computer 12 then checks the time associated with the Authenticatable Outcome Message AOM against the time from the central computer's associated clock. If the times are within a prescribed window, the current outcome message is accepted as fresh.

In still another procedure, the game computer 14 includes a random number in the Authenticatable Outcome Message AOM. The central computer 12 maintains a database of all random numbers received from the game computers 14. If the new random number is not in that database, then the current Authenticatable Outcome Message AOM is accepted as fresh. If a time element is incorporated as well, then the central computer 12 only has to store a relatively small quantity of unexpired messages.

Figure 4B:
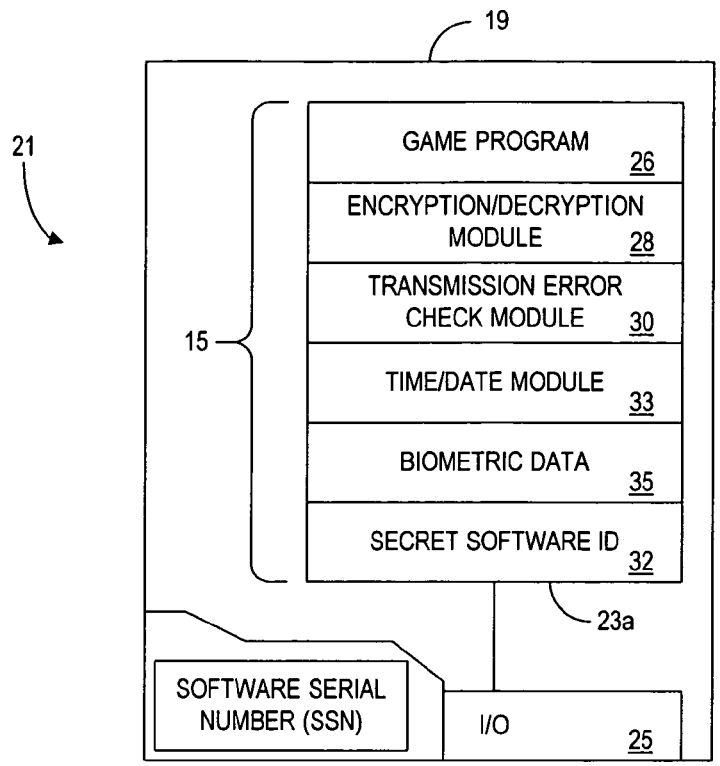
FIG. 4B is a schematic of a game cartridge in one embodiment.

In FIGS. 4A and 4B, the encryption/decryption module 28 is depicted as part of the game software 15. In, that embodiment, the encryption/decryption module 28 refers to cryptographic algorithms and keys or other data, software instructions and the like. These reside with the rest of the game program in a data storage device such as a game cartridge, hard disk, CD-ROM or the like. The actual processing to implement the cryptographic protocols takes place in the game computer's CPU 27, not within a specialized cryptographic processor.

Figure 4C:
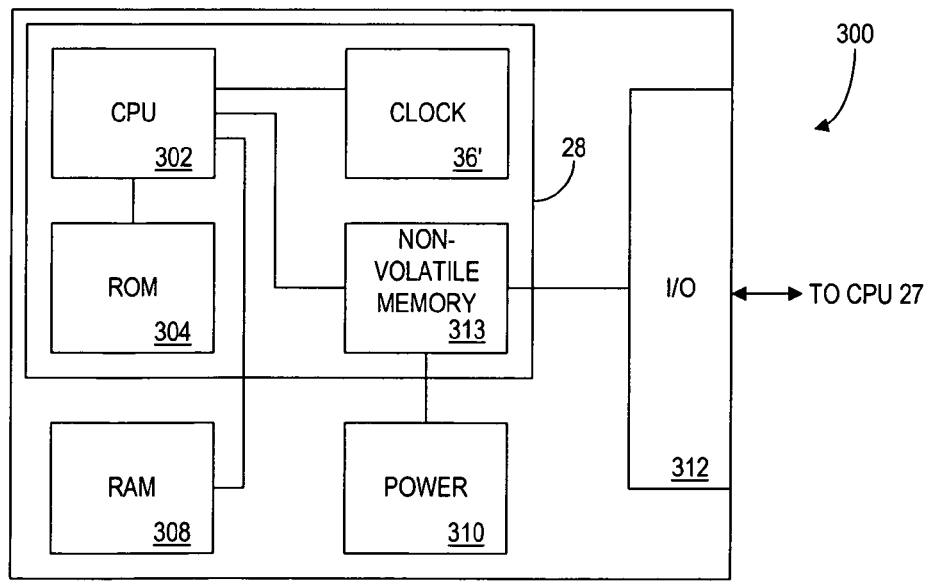
FIG. 4C is a schematic of a secure perimeter for the encryption/decryption module.

Preferably, as shown schematically in FIG. 4C, some or all of the encryption/decryption module 28 resides within a secure perimeter 300. A secure perimeter is a defined physical area of hardware which is tamper-resistant and/or tamper-evident, in which resides data or algorithms whose characteristics must not be alterable in order for a system to remain secure. Examples of devices which incorporate secure perimeters include U.S. military encryption devices such as the STU-III telephone made by Motorola and AT&T, and the iPower card, available from National Semiconductor Corp. The latter is a dedicated encryption/decryption device embodied in a PCMCIA card which can interface with the game computer 14 through, for example, the game computer's PCMCIA socket (for game computers 14 with PCMCIA compatibility). In the iPower card, both the key/data storage and cryptographic functionality are located within the secure perimeter. Referring again to FIG. 4C, a secure perimeter such as an iPower card is shown. It includes a 32-bit CPU 302 with ROM 304 containing encryption algorithms, a real-time clock 36 and an interface with an off-chip battery (310)—backed RAM 308 which holds encryption data and key information. Any attempt to tamper with or get at the encryption data stored within the device results in a memory loss of that data. Moreover, the I/O pins 312 of the device are electrically isolated to prevent pin-level probes, and the chip itself contains mechanical and chemical protection to prevent chip-probing equipment from accessing the encryption information from the CPU 302 directly. Such a secure perimeter 300 may additionally include additional non-volatile memory 313 for storing other software instructions and/or additional game related or other data as will be explained in more detail below. Hereinafter, the CPU 302 within the secure perimeter 300 will be referred to as the secure CPU 302, and the memory within the secure perimeter 300 will be referred to as the secure memory. Thus, within an iPower card, all encryption/decryption functions are performed in the secure perimeter and do not take place in the CPU 27 of the game computer 14. Communications between the secure CPU 302 of the secure perimeter 300 and the CPU 27 of the game computer 14 are known in the art and need not be described here in detail. When the secure CPU 302 of the secure perimeter 300 is called upon by the game computer 14 to generate an Authenticatable Outcome Message, authenticate an Authenticatable Outcome Message, and/or perform any other required functions, the CPU 27 of the game computer 14 sends the appropriate signals to the secure CPU 302 of the secure perimeter 300. In this regard, the entire encryption/decryption module 28 is said to reside within the secure perimeter 300. This means that all cryptographic keys and algorithms are stored in memory within the secure perimeter 300, and all cryptographic functions are implemented on the secure processor 302 within the secure perimeter 300. Thus, when cryptograhic protocols are to be used for encryption and/or authentication, the game computer CPU 27 communicates commands and data to be encrypted or made authenticatable to the secure processor of the secure perimeter 300 as described below, requesting that the data be cryptographically processed. The secure CPU 302 of the secure perimeter 300 may be used to subsequently authenticate the Authenticatable Outcome Messages AOMs that it generates, as well as Authenticatable Outcome Messages AOMs from any other game computer 14 in the system. It may also be used to time-stamp messages or track times to completion for races of skill with the clock 36. The secure CPU 302 may also perform some of the computational tasks required to execute the game software.

In an alternative embodiment, cryptographic keys may be stored in secure memory within the secure perimeter 300, but cryptographic algorithms and software instructions are stored in unsecure memory associated with the rest of the game software 15 (i.e, in a conventional game cartridge, hard disk, floppy disk, CD-ROM or the like), and actual processing to implement the cryptographic protocols takes place in the game computer's CPU 27.

External secure devices such as the aforementioned ipower cards can function as "tokens." A token is a physical computing device used by individuals to gain access to protected electronic resources. Tokens commonly include cryptographic capabilities and can store keys or other data. Intelligent security tokens may be utilized to prevent unauthorized player access to the game computer 14, as well as for implementing the encryption/decryption functions for outcome authentication and certification. The iPower card described above, is an example of a token contained within a secure perimeter.

Other such tokens include the SMARTDISK, manufactured by SmartDisk Security Corporation. The SMARTDISK contains a CPU and memory used for encrypting and decrypting data. Thus, as with the iPower card, the encryption/decryption module 28 may reside in the SMARTDISK (i.e., all cryptographic functions are implemented within the SMARTDISK). The SMARTDISK requires a user password to function. Thus, access to the system requires the player to physically possess the token and know the proper password. Smart cards are similar tokens. They are shaped like credit-cards, but contain an embedded microprocessor for implementing various security functions.

Another type of token called TOUCH MEMORY is manufactured by Dallas Semiconductor Corporation. This device consists of a computer chip housed within a small button shaped stainless steel case. The case may be ring-shaped and worn around a player's finger. The chip contains up to 64 kb of RAM or EPROM, sufficient to store a plurality of cryptographic keys. The device transmits data bidirectionally at 16.3 kb per second when placed into contact with a reader device. Each chip contains a unique serial number that is laser-etched into the chip at the time of manufacture. Keys from the device may be used in any of the cryptographic protocols described herein for authentication and/or encryption, as well as for user identification. The DS1422 UNIQUEWARE product can be configured to transparently decrement each time that the device is used, allowing players to obtain and store a limited number of start messages, for example. The DS1427 configuration includes a tamper-resistant real-time clock 361 that may be utilized in the different applications described herein.

In yet another embodiment, a player may obtain a joystick which has a unique identifier associated with it. The joystick identifier may be used as a key in the cryptographic protocols described herein, or to enable the player's game software 15 to generate a certified or tournament game. The key may be stored on a ROM chip within the joystick. When the game software 15 loads instructions to generate the game into the RAM of the game computer 14, the key from the joystick is loaded into RAM and verified. If the proper key is not found, the game software 15 may be disabled. This is conceptually similar to a "dongle." Alternatively, the joystick may have an associated input/output interface for accepting data from and communicating data to a secure perimeter such as an iPower card. Thus, the authentication protocols may take place within the structure of the joystick. This approach is described in more -detail in an alternative embodiment below.

Other secure devices include the SENTINEL SUPERPRO manufactured by Rainbow Technologies. The SENTINEL SUPERPRO is a dongle which stores keys required for the operation of software applications. The software directs the computer it is running on to access the dongle and, if it does not find the right key, suspends execution of, the program. The dongle plugs into the parallel port or ADB port of a personal computer and measures 1.65 inches long by 2.125 inches wide. It contains 128 bytes of read/write memory organized as sixteen 64 bit words. These words can be used as time counters for leased software, or they can count executions for limiting the operation of demonstration products. Memory cells can also be programmed with customer information, serial numbers, passwords, and the like. With regard to the present invention, the keys and algorithms that form part of the encryption/decryption module 28 could reside in the memory of such a dongle.

Dongles may also include specialized cryptographic processors and memory, allowing functionality similar to that found within an iPower card. Dongles configured to plug into a parallel port, however, have the advantage of being compatible with nearly all Intel-based computer hardware, as opposed to iPower cards which require PCMCIA capabilities.

The above secure devices are particularly well suited to the storage of game related data for auditing purposes. In a computer golf hole-in-one tournament, for example, it may be desirable to track each swing that a player takes since large prizes for a hole-in-one would attract hackers interested in forging such an event. To prevent such cheating, game parameters (swing speed, club used, etc.) would be sent to the secure CPU 302 where they would be encrypted. This encrypted data could be stored in the non-volatile secure memory 313 within the secure perimeter 300 as an encrypted receipt file. Any player scoring a hole-in-one could be required to send in the secure device before receiving payment, allowing tournament officials to examine the game data to see if it matched the claimed result. Alternatively, the encrypted game parameters could be communicated back to the central computer 14 and stored on the hard drive or copied to a floppy disk(insecure memory). In the event of a claim for a large prize, the player would simply mail in the disk to the managing authority and the encrypted data would be decrypted and analyzed by the central computer 12 by recreating the game with such data to determine whether the claimed score was actually achieved.

For an additional level of security, the secure CPU 302 may perform some of the game calculations normally executed by CPU 27. In an illustrative application, the game, program renders a golfing game of skill, such as, for example, PGA TOUR 96 available from ELECTRONIC ARTS. In this game, a digital image of a golf game is rendered on the game computer 14, comprising a golf ball on a tee, fairway, trees, sandtraps, etc. A human figure is superimposed on this background, and swings a golf club in response to player inputs via a keyboard or joystick. The player's club swing data represents various parameters, including the club selected (e.g., one iron, two iron, three wood, etc.) and its specific characteristics (e.g., club head orientation), foot placement, and swing force, speed, direction and the like. In the course of a typical computer generated golf game, these parameters are applied to software instructions that compute a trajectory path for the ball to generate a resultant ball location. After the player swings the club, the display may depict the new ball location relative to the hole. Other factors, including ambient conditions such as wind speed and direction or other random variables, may be introduced for greater realism. With a secure CPU 302, the calculation as to the new location for the ball may be taken away from CPU 27. This is accomplished by making these calculations part of a Secure Software Component 710 of the game program 26, which will only run on the secure CPU 302, for example, by encrypting the block of software instructions that relate to computation of such portions of the game with the above-described game parameters, or by requiring additional data or algorithms stored in secure memory within the secure perimeter 300 to make such computation. Thus, the secure CPU 302 computes the new ball position, which is then communicated back to the CPU 27 of the game computer 14 where it is displayed on screen. The results of the calculations can also be stored on the hard drive of the game computer 14 as described previously. Some game variables, such as wind speed, could also be generated by the secure CPU 302. These variables would impact the calculation of the new ball position, and would prevent players from using mechanical devices to play a perfect game since at least one variable cannot be controlled. Alternatively, a game parameter such as wind speed, could be generated by the secure CPU 302, and then transmitted to the CPU 27 where the new ball position could then calculated. This embodiment is described in more detail below with regard to the pay-per-use metering system.

Figure 4D:
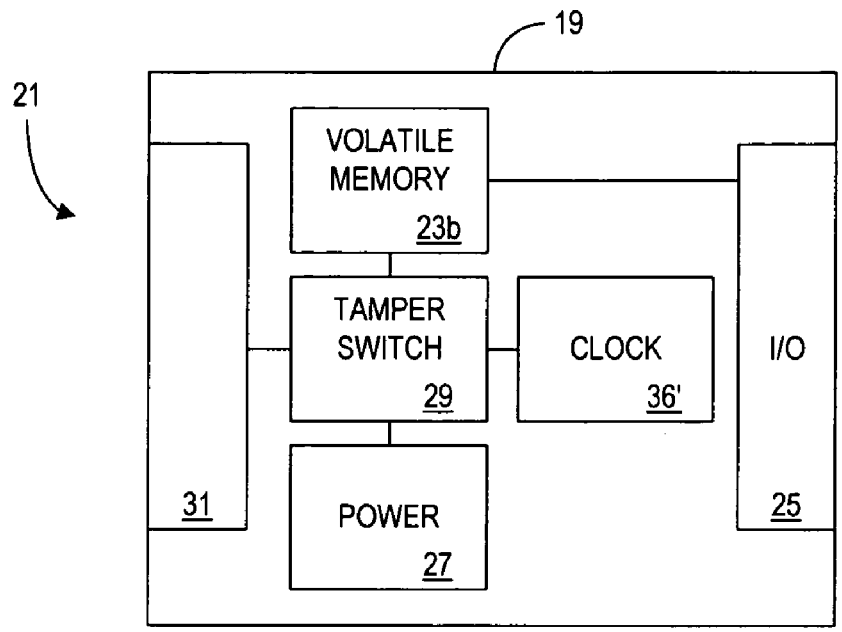
FIG. 4D is a schematic of a game cartridge in another embodiment.
Figure 4E:
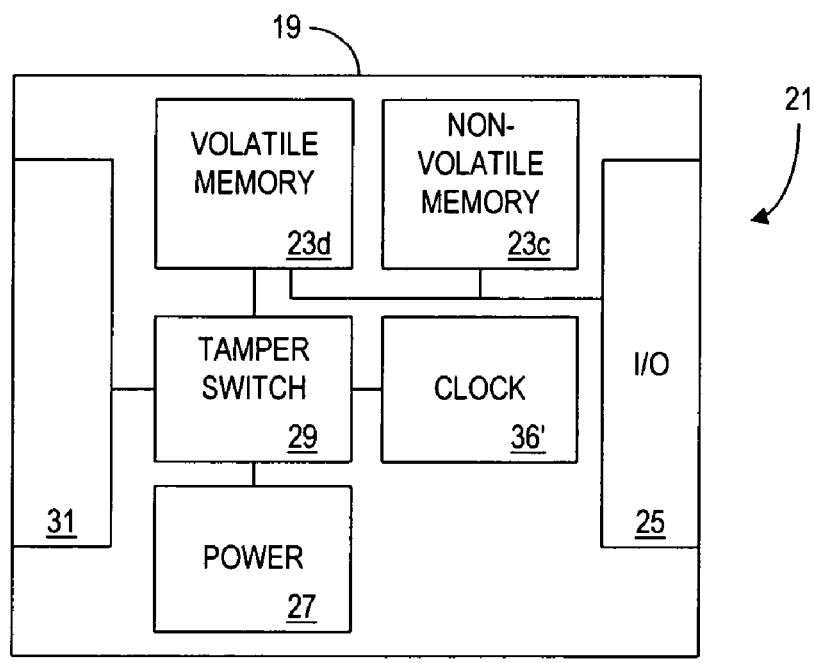
FIG. 4E is a schematic of a game cartridge in still another embodiment.
Figure 4F:
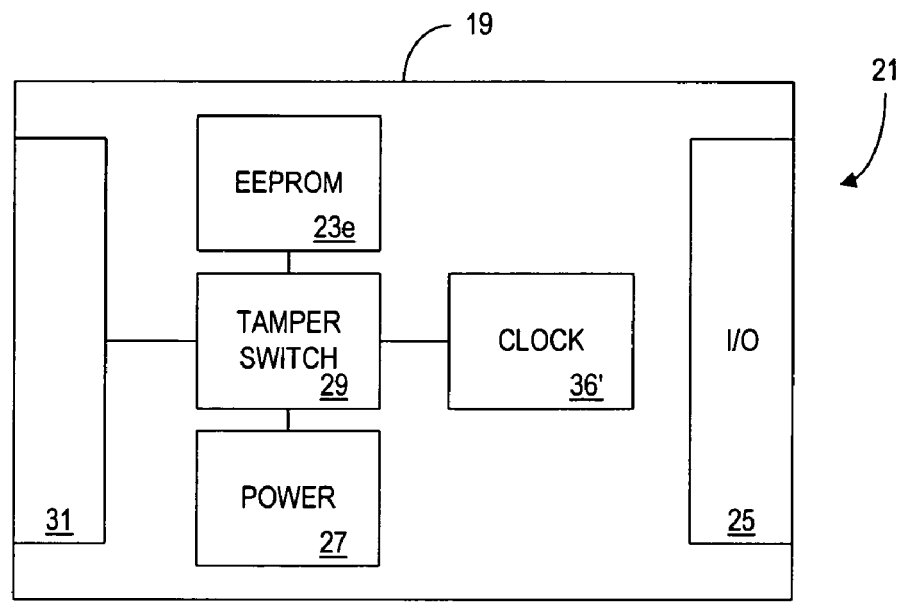
FIG. 4F is a schematic of a game cartridge in yet another embodiment.
Figure 4G:
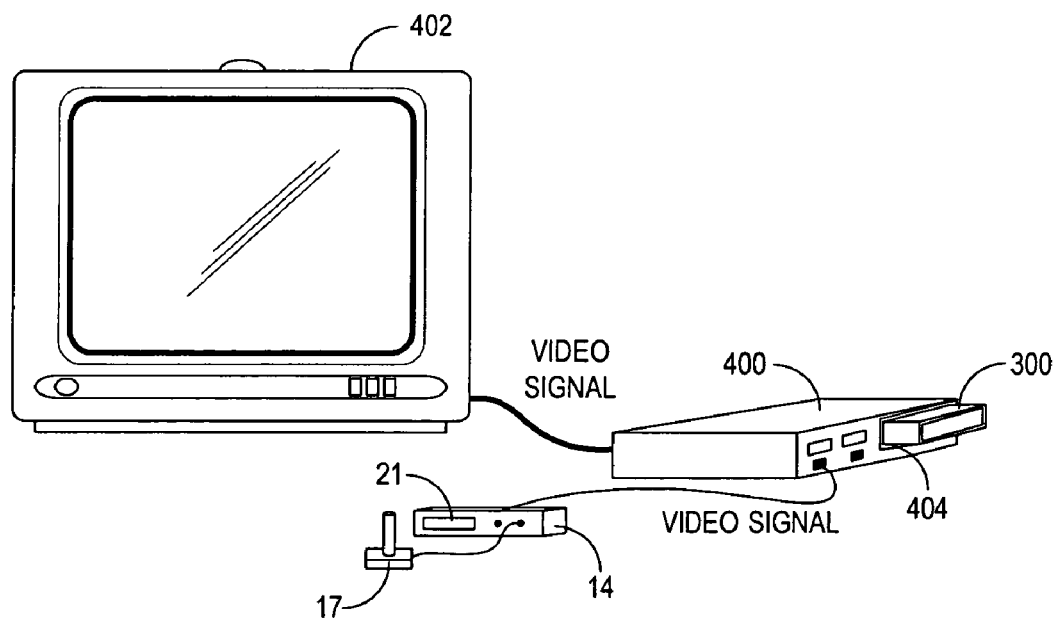
FIG. 4G is a schematic of an embodiment utilizing a secure perimeter and VCR in connection with a game console type game computer.
Figure 4H:
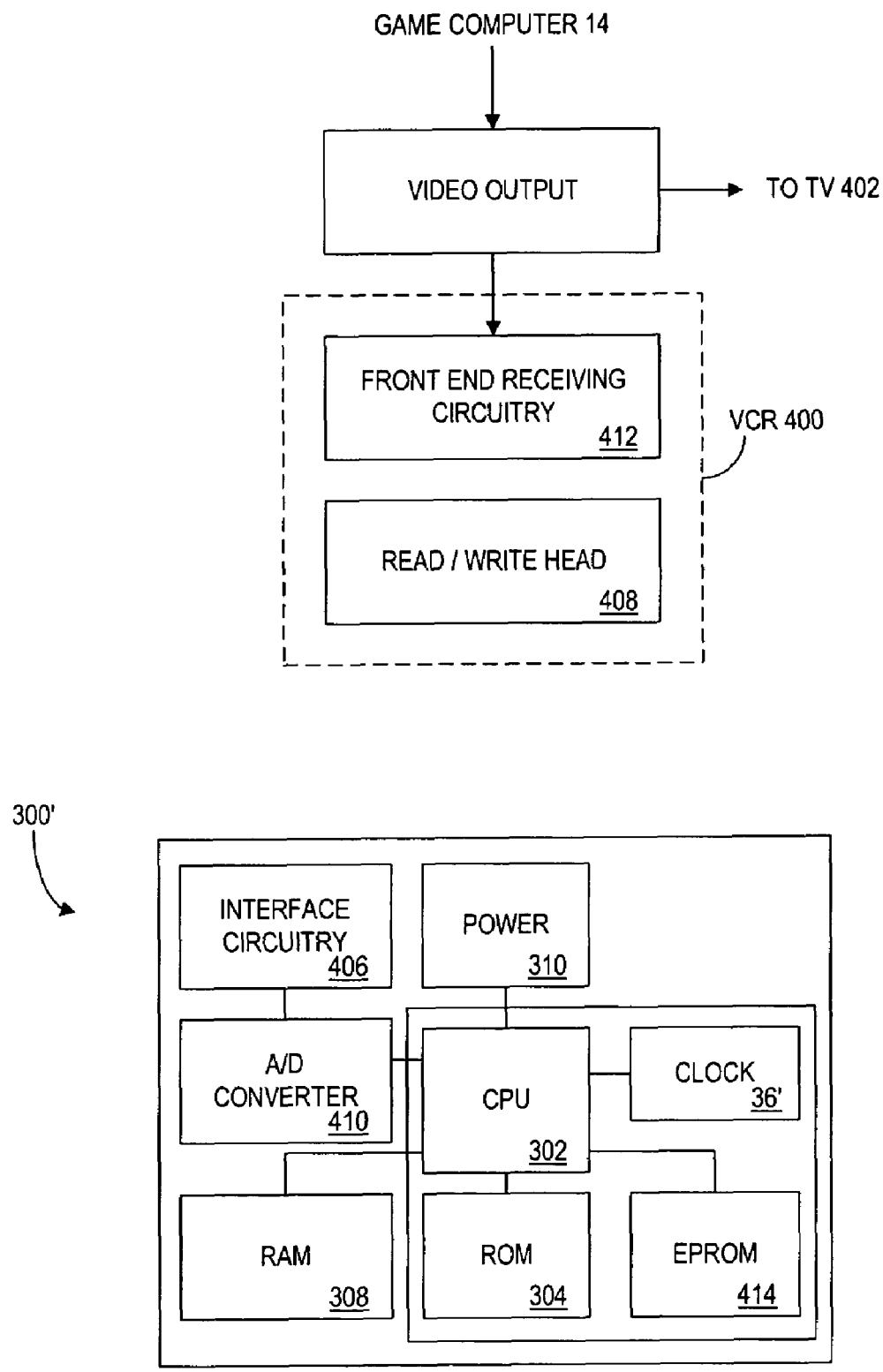
FIG. 4H is a schematic of the secure perimeter/VCR interface.

For game console applications, a secure CPU 302 within a secure perimeter 3001 may be adapted to interface with a VCR unit 400 as shown schematically in FIGS. 4G and 4H, to enable cryptographically protected recording and playback of games generated on the game computer 14. In this embodiment, the video output signal from the game computer 14 is communicated to a video input on the VCR 400, and a video output signal from the VCR 400 is communicated to a television 402 in a conventional manner. The secure CPU 302 and associated hardware within secure perimeter 3001 are configured to fit into a standard VCR slot 404. In addition to the secure CPU 302, the secure perimeter 300' includes ROM 304 containing encryption algorithms, a real-time clock 306 and an interface with an off-chip battery (310) backed RAM 308 which holds encryption data and key information. The secure perimeter 3001 further includes interface circuitry 406 for communicating signals from the read/write head 408 of the VCR 400 via an analog/digital ("AID") converter 410 to the secure CPU 302. Video information is typically communicated to the television 402 in an RF format. The RF video signal may be processed in the VCR 400 by the front-end receiving circuitry 412, which demodulates the video signal to a base-band signal as is well-known in the art. Normally, the demodulated information is what is recorded on a VCR tape cassette. In the inventive application, the base-band video signal data is converted to digital format by the A/D converter 410, encrypted with a private key, and stored in the non-volatile memory such as an EPROM 414. For playback, the secure CPU 302 authenticates the game data, for example by decrypting the data with the corresponding public key, and the authenticated game data is then processed to generate a video signal. The secure perimeter 3001 may also contain software instructions in ROM for generating an Authenticatable Outcome Message AOM to be used as described hereinbelow. This Authenticatable Outcome Message AOM may be included in the video signal to appear on the television screen at the end of the game.

Referring now to FIG. 4B, there is shown a schematic of a game cartridge 21 for use with the system of the present invention. The game cartridge 21 includes a housing 19 that contains the game software 15 in a ROM 23a built into the cartridge, and the ROM 23a interfaces with the game computer 14 via an I/O interface 25 in a conventional manner. The software serial number SSN may be displayed on the exterior of the cartridge housing 19 as shown. The game software 15 in the case of typical games such as those offered by Sega and Nintendo, includes a game program 26 which offers the player a choice of a tournament enabled game or a non-tournament enabled (regular) game. Tournament enabled games may be generated with the "cheat codes," typically used by developers in testing the game, disabled in the game program 26. In addition, certain play aspects of the game which usually occur in some known sequence or have some known characteristics (such as the location of bonuses or certain challenges), may be changed in the tournament version of the game to ensure that the game is less predictable than that of the regular version. While the regular version of a computer golf game may have only a few sand traps, the tournament version may have many. Opposing pitchers may throw the ball at 80 miles per hour in a regular computer baseball game, while in the tournament version opposing pitchers throw at 100 miles per hour. Game cartridges may also contain game software 15 configured for one-time or limited time use.

Referring now to FIG. 4D, a game cartridge 21 contains the game software, 15 in volatile memory 23*b*. The volatile memory 23*b* is connected to the I/O interface 25 in a conventional fashion. The volatile memory 23*b* is also connected to a power source 27 via a tamper switch 29. The tamper switch 29 is coupled to the cartridge housing 19, at the interface shown schematically at 31, so that any attempt to break open the cartridge housing 19 causes an interruption in power from power source 27 to volatile memory 23*b*, thereby causing all program data stored in volatile memory 23*b* to be erased. The tamper switch 29 may take many forms, depending upon the configuration of the game cartridge 21. In an exemplary embodiment, the tamper switch 29 is adapted to the cartridge housing 19 such that a physical incursion simply causes the tamper switch 29 to open. Alternatively, the tamper switch 29 may consist of a photocell sensitive to a certain level of light that causes a power interruption if the cartridge housing 19 is opened. In either case, an interruption of power to the volatile memory 23*b* causes all stored program data to be erased. This procedure is well-known in the art for securing computer memory devices. The clock 36 may also be housed within the game cartridge 21 such that any attempt to alter the clock 36 results in a loss of program data stored in volatile memory 23*b*.

Referring now to FIG. 4E, all game software data (excluding the encryption/decryption module 28) is encrypted and stored in non-volatile memory 23*c*, while the encryption/decryption keys and algorithms (encryption/decryption module 28) are stored in volatile memory 23*d*. Thus, any action which triggers the tamper switch 29 causes an interruption in power and the encryption/decryption module 28 stored in the volatile memory 23*d* to be erased. Without the encryption/decryption module 28, the encrypted data stored in the non-volatile memory 23*c* is useless.

In another embodiment shown in FIG. 4F, the game software 15 resides in an electrically erasable and programmable read only memory (EEPROM) 23*e*. If the cartridge housing 19 is opened, the tamper switch 29 closes and an erase signal from power source 27 causes the data stored in the EEPROM 23*e* to be erased. The practice of erasing data in an EEPROM is well known and need not be discussed in detail here.

It will also be appreciated that special enhanced security tournament cartridges 21 may be supplied to players for advanced rounds of competition in connection with any tournament.

Referring again to FIG. 4A, as a means of obtaining information as to where games are being played for compiling various tournament statistics and/or for preventing game play when the game computer 14 resides in certain locations, the game computer 14 may communicate with or have an integral Global Positioning System ("GPS") 37. A GPS receiver derives positional information from a plurality of satellites. The GPS information may be used to prevent game play in certain locations by providing a location lockout feature in the game software 15. When the player attempts to begin a game on the game computer 14, the game software 15 queries the GPS 37 and checks whether the current location of the game computer 14 is within an allowed area. This allowed area may be incorporated into the game software 15. If the game computer 14 is found to be outside of an allowed area, the game software 15 directs the game computer to deny player access to the game. In a different application, the positional information may be incorporated into the Authenticatable Outcome Message AOM and uploaded to the central computer 12 when a player submits his or her game outcome. In this regard, the central computer 12 can use the positional information for ranking/rating players without requiring submission of the player's specific location (i.e., the home address), and/or for compiling statistical location data. The central computer 12 can ascertain which state, municipality or even town where the game computer 14 was located or, if the player was mobile, all areas where the player was located when the player played the game, either by uploading the information from the game computer or by accessing a database containing such information. Most GPS receivers have the capability to store a sizable amount of data. Typical handheld GPS receivers used in aviation applications can store enough information to save positional data for an entire flight. Although current GPS satellites are subject to having their GPS signals degraded by the military without notice, future civilian systems that are currently under development will be capable of providing consistently accurate-positional information to within a few feet.

To preclude player substitution, biometric identification devices such as a fingerprint reader, voice recognition system, retinal scanner and the like, may be used to provide absolute player identity verification at the game computer 14. An example of such a device is the FC100 FINGERPRINT VERIFIER 31 available from Startek, a Taiwanese company. The FC100 is readily adaptable to any PC via an interface card 39. The fingerprint verifier 31 utilizes an optical scanning lens. The player places his or her finger on the lens, and the resulting image is scanned, digitized, and the data compressed and stored in memory location 35. Typically, a 256 byte file is all that is required. Each live-scan fingerprint is compared against the previously enrolled/stored template. If the prints do not match, access to the system can be denied. This procedure may be implemented before the initiation of a tournament game, during the game in response to prompts from the game software 15 at some predetermined or random times, or continuously by incorporating the scanning lens into a joystick on the game computer 14 such that the player is required to maintain his or her finger on the lens at all times during the game for continuous verification. The fingerprint data may also be registered and stored in the central computer 12 (either in its compressed form or as hash value) in a player information database for player identity verification during various protocols, and/or used as a key as described below.

A voice verification system which utilizes a person's "voice-print" may also be used to provide player identity verification at either or both the central computer 12 and the game computer 14. The process of obtaining a voice-print and subsequently using it to verify a person's identity is well-known in the art, and therefore need not be described in detail herein. One of ordinary skill in the art may refer to SpeakEZ, Inc. for voice identification/verification technology. Specifically, speaker identification software is utilized to take a sample of the player's voice. This sample is stored in the central computer 12 in the player information database. Each time the player calls the central computer 12, it prompts the player to speak his or her name into the telephone 18. The speaker identification software then directs the central computer 12 to check the player's current voice-print against the voice-print stored in memory. If there is a match, the procedure continues. This is described in more detail below. The voice-print may also be stored in a database in the game computer 14, to verify the player's identity at that location prior to allowing game play without the central computer 12. This is also described in more detail below.

Figure 5:
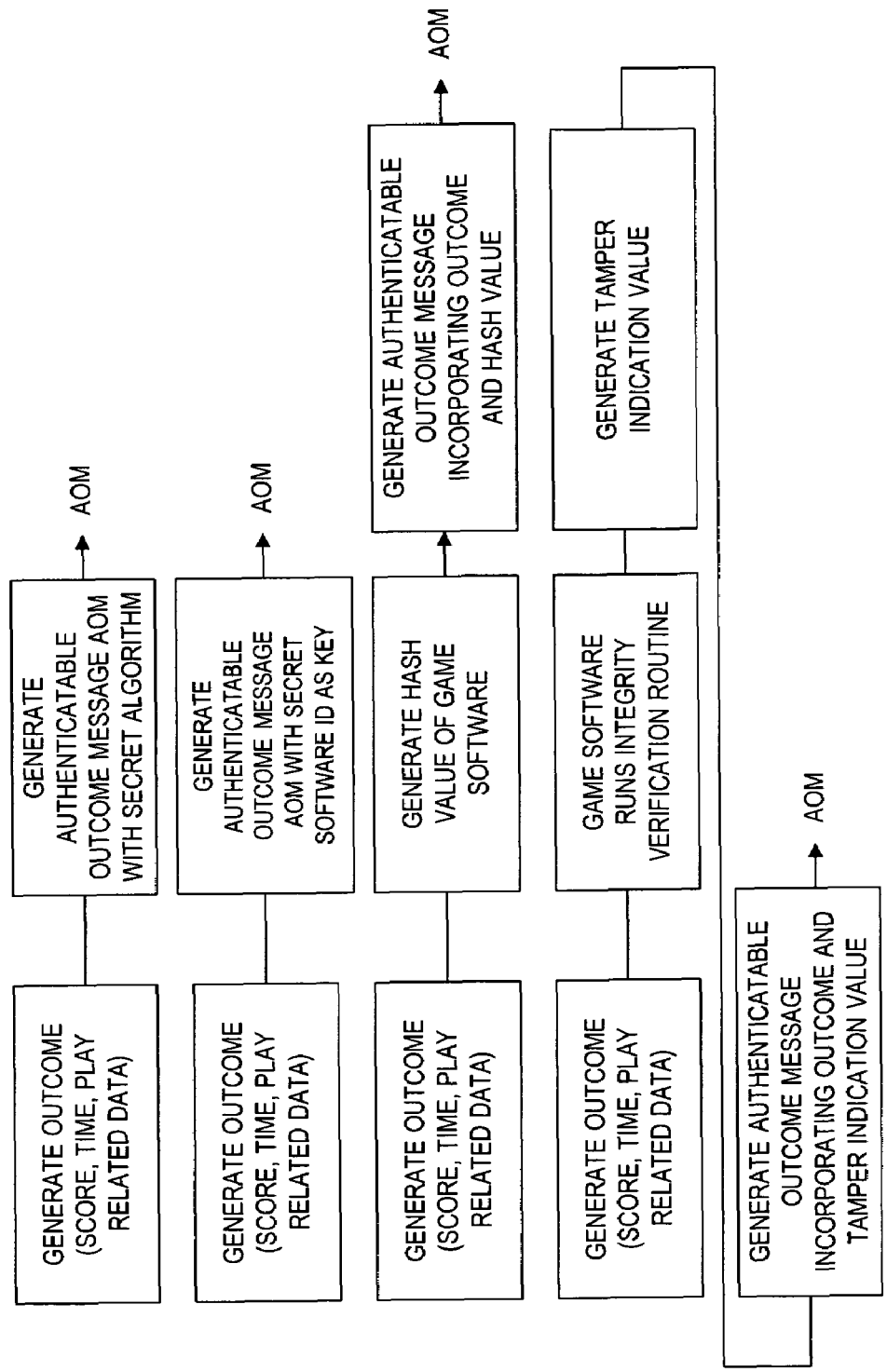
FIG. 5 is a flow-chart of various Authenticatable Outcome Message generation protocols.

Referring now to FIG. 5, there are shown several exemplary ways in which the game computer 14 can generate an Authenticatable Outcome Message AOM. At the conclusion of the game, an outcome (e.g., a score) is displayed.

In one embodiment, the outcome may simply be embodied in a code generated using any secret algorithm. This algorithm is not readily ascertainable or known by the player. It resides in the game software 15 or in a separate encryption/decryption module 28, and in the central computer 12. Accordingly, when the player seeks to register an outcome of, for example, 1,000,000 points for game XYZ, the game computer 14 generates an Authenticatable Outcome Message AOM, for example, 21328585, with the secret algorithm. The central computer 12, the same game computer 14, or any other game computer 14 applies an inverse of the secret algorithm to the Authenticatable Outcome Message 21328585, or the same algorithm to the score of 1,000,000 points for that game, and if the results match, the authenticity of the outcome is verified. Thus, an outcome cannot be created or guessed without actually playing a game on a game computer 14 containing the secret algorithm. In a preferred embodiment, the encryption/decryption module 28 generates an Authenticatable Outcome Message incorporating the outcome (and any play-related data) using the SSCID as an encryption key. This encryption of the outcome (and play related data) with the SSCID enables authentication of the outcome with respect to the particular game software 15 or game computer 14. Alternatively, the SSCID is combined with the outcome and the combination is incorporated into an authenticatable message with a different key. In this regard, the encryption of the outcome and SSCID may utilize the biometric data scanned with the fingerprint verifier 31 or obtained from the voice print system as described above as a key. In this manner, the player's identity may be verified in the authentication process. While the secret game software or computer ID, SSCID, is not made known to the player, it is possible to generate a known serial number based upon the secret number. In this connection, after the player powers up the game computer 14 for the first time, it implements a registration process. The SSCID is encrypted by the encryption/decryption module 28 and displayed on screen. The player calls the central computer 12, and enters the SSCID, along with his or her name and/or PIN. The central computer 12 then decrypts the SSCID and associates it with the player's registration information. The central computer 12 then generates a unique random number RS which is tied to the SSCID. The player writes this number down, and can use the same to identify his or her game computer 14 when authentication is not required. The same procedure can also be used to generate known serial numbers for secret software numbers. Software can also be tied to hardware. A player can be forced to register his new software before he plays the first game. In this regard, the game computer 14 displays the SSCID in encrypted form. The player calls the central computer 12 prior to initiating play. The SSCID is added to the player information database 48, and is then used in the authentication process of any outcome as described herein. This ensures that the player can only submit an outcome for authentication/certification when using his or her game computer and/or game software 15. Use of another player's game software 15 and/or game computer 14 will cause the authentication process to fail.

In yet another implementation, an outcome may be represented by other data or symbols which are intelligible only to the central computer 12, but not to the player. For example, the score 5000 is represented by symbol data comprised of three green dots, four brown squares and two purple triangles. After communicating the score to the central computer 12, the player is required to send this data for confirmation of the outcome. The player is unable to determine whether this combination corresponds to the same score, a higher score or a lower score. But the central computer 12 is able to decipher these symbols to determine if, in fact, they represent the same outcome submitted for certification in accordance with some secret coding protocol. Alternatively, the player is not provided with an actual score. The score is secret, and is revealed to the player by the central computer only after it interprets the symbol data. This is similar to encrypting or encoding the outcome.

In the case of tournaments, the Authenticatable Outcome Message AOM may prove tournament validity, by including data representing that the outcome was the result of a valid tournament game. This data may constitute a subliminal message within the Authenticatable Outcome Message AOM. Alternatively, the Authenticatable Outcome Message AOM may include all or part of the Authenticatable Start Message ASTM for initiating tournament play for this purpose.

Authenticatable Outcome Messages AOMs may also contain statistical data for enabling the sanctioning authority to compile market research information. This data may be compressed by the game computer 14, and decompressed by the central computer 12.

The game software 15 may be adapted to instruct the game computer 14 to save game play up to a certain point in a game, and to resume play from that point at a subsequent time. In this regard, a "resume code" may be generated, which enables a player to pick up a game from where he left off. The game play to a specific point may be stored entirely in non-volatile memory. This would allow golf tournaments in which players could stop after a number of holes had been completed, picking up play at a later time or date. Alternatively, the game computer 14 may generate an Authenticatable Outcome Message AOM that represents the game outcome to this point. This allows for a first player to "hand off" the AOM to the next player who continues the game. Such an arrangement is analogous to a relay-race scenario where a player runs a certain distance and then hands off an object to the next runner. It also enables the same player to resume game play without having to store the large amount of data representing the game play to the point of termination. Since game programs generate games that are typically segregated into various levels, where the player advances from level to level as the game proceeds, this "code" may be used to instruct the game software 15 to continue from any given point. When the player selects a "quit" or "end game" option, if the player desires to continue the same game at a subsequent time, he inputs the Authenticatable Outcome Message AOM into the game computer 14. If it is authenticated, then game play proceeds from the prior termination point.

To prove integrity of the game software 15 through the outcome certification process (i.e., that it has not been tampered with), digital signature protocols may be utilized. In this regard, a digital signature algorithm with a private key is employed to "sign" a message. This message may be a hash value of the software generated with a function, a compressed value of the software code produced by a compression algorithm, and the like. The signed message is then verified using the digital signature algorithm with a public key at the central computer 12, the same game computer 14 or any other game computer 14 in the system. The secret key may reside in the encryption/decryption module 28, and preferably, the encryption/decryption module 28 resides in a secure perimeter 300 as discussed above. The secret key may be the SSCID, and/or a hash or compressed value of the digitized biometric fingerprint data or voice print described above. The public keys may be contained in the KDC at the central computer 12 as mentioned above, to enable players to verify the digital signature of the software at their respective game computers 14.

In an exemplary embodiment, the encryption/decryption module 28 generates a hash value of the software instructions which make up all or part of (i.e., game program 26) the game software 15. This hash value is incorporated into the Authenticatable Outcome Message AOM. The hash value is generated using a one-way hash function which operates on a numerical representation of the game software 15. An example of a one-way hash function is the Secure Hash Algorithm ("SHA"). SHA is a U.S. government standard, and is specified in FIPS PUB 180 of the National Institute of Standards and Technology. Other examples of hash algorithms include MD4, MD5, RIPE-MD, Haval, etc. One skilled in the art may refer to APPLIED CRYPTOGRAPHY. As a specific example, each character of the game software 15 may be converted to ASCII values and then into a binary series of 1s and 0s. An exemplary one-way hash function may operate on this series as follows: (1) exchange the positions of all 1s and 0s; (2) group the digits into blocks of 64 digits each; (3) raise each block to the 5th power and then truncate the result to 64 digits; (4) take the final complete number and square it; (5) convert this binary number to base ten; and (6) take the last 24 digits as the hash value. The initial hash value for any given copy of the game software 15 is created prior to sale or distribution, and may be stored in the central computer 12, or even publicly known. This hash value may be derived from a different one-way hash function for each copy of game software 15 sold. If the player attempts to alter the game software 15 by tampering with the software instructions to produce a more favorable game outcome (i.e., a higher score or faster time to completion), such modifications to the game software 15 will be evidenced by the mismatch between the newly generated hash value and the initial hash value stored in the central computer 12.

Figure 6A:
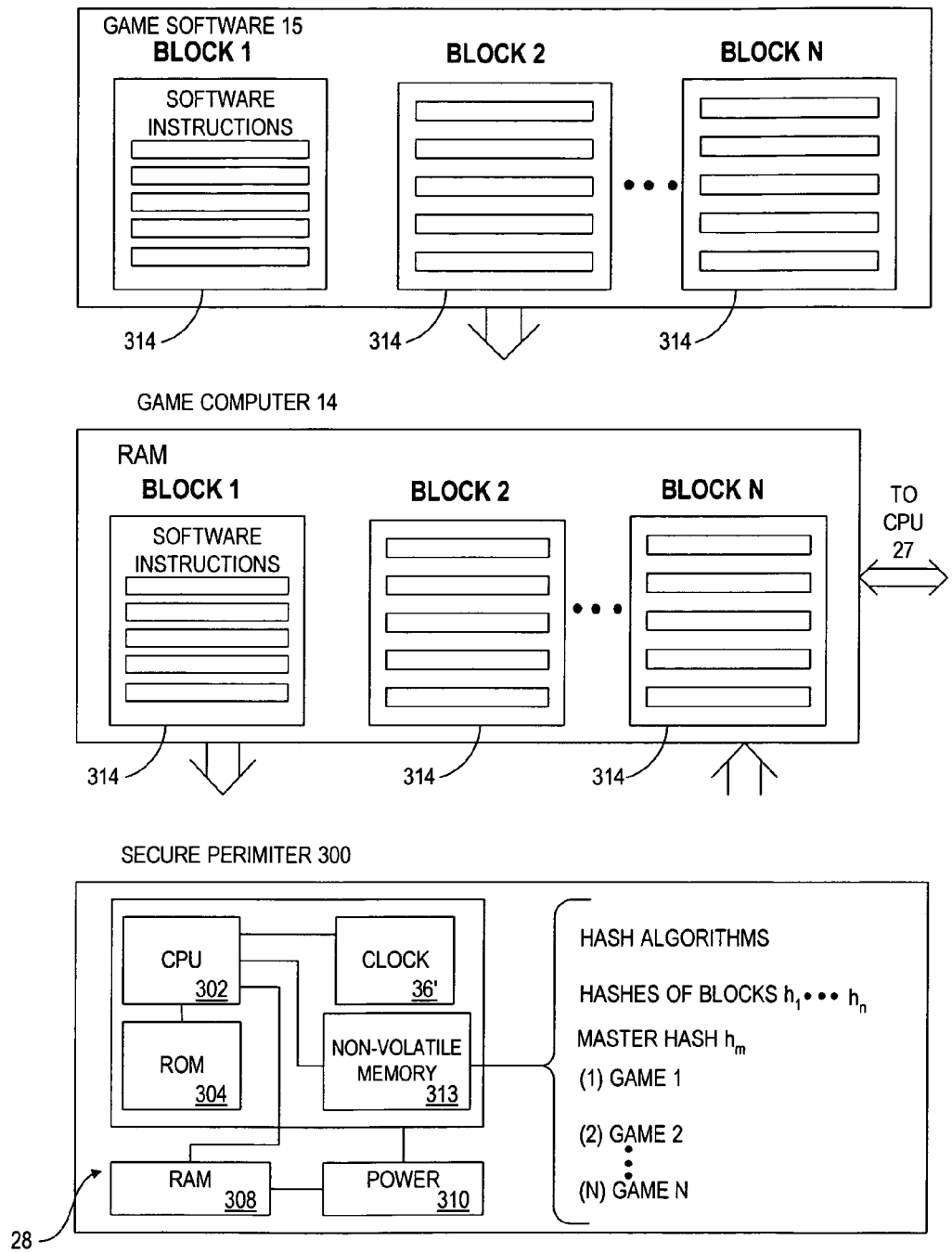
FIG. 6A is a schematic of an exemplary software integrity check.
Figure 6B:
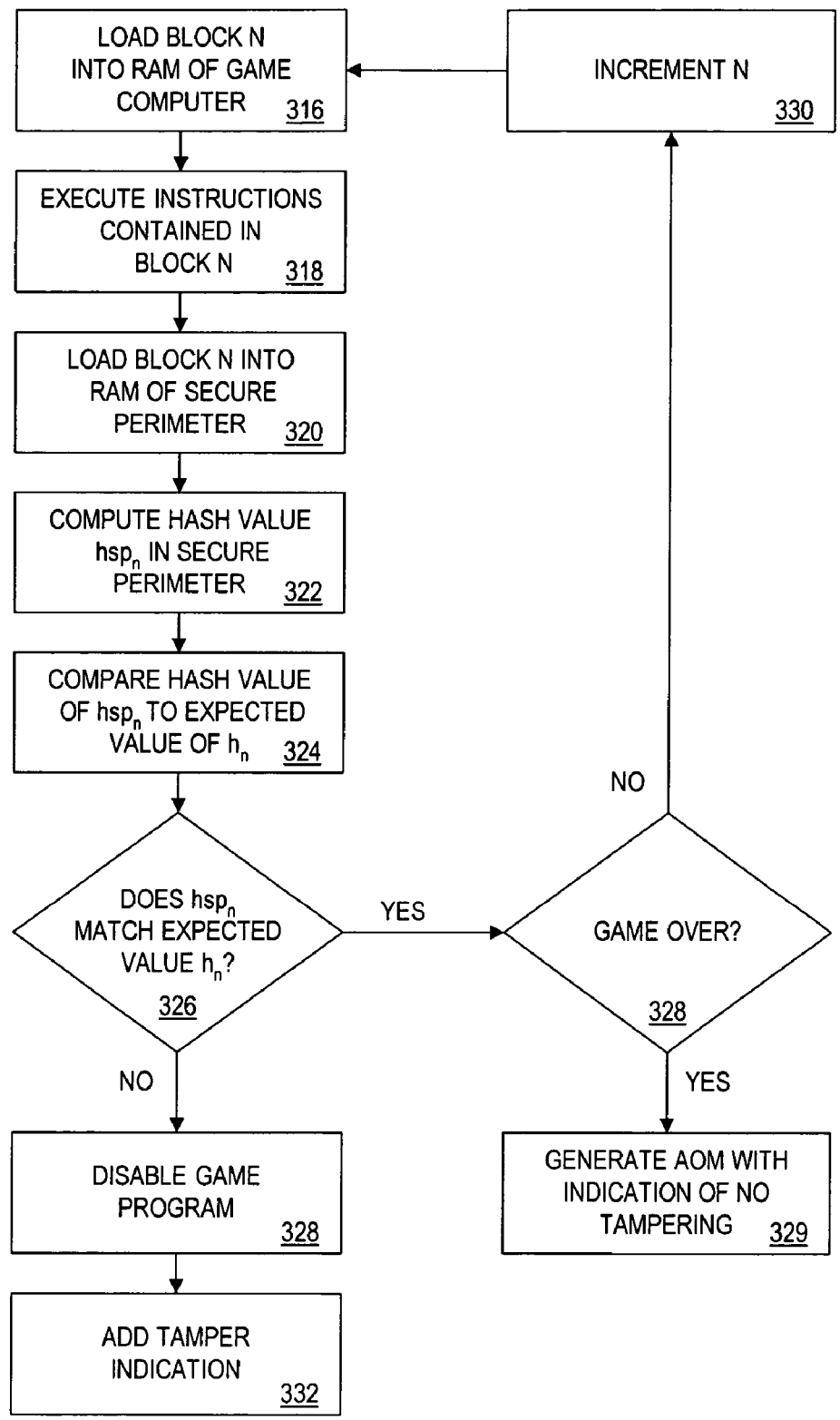
FIG. 6B is a flow chart of the software integrity check in the embodiment depicted in FIG. 6A.

Since the game software 15 may be tampered with while the software instructions reside in the volatile read-write memory (i.e., RAM) of the game computer 14, tampering may not be detected by just generating a hash value of the entire game software 15 at the end of a game. One way to detect and provide evidence of tampering of the game software 15 while it resides in RAM, is to have the secure CPU 302 of the secure perimeter 300 periodically check blocks of the game software 15. In this connection, referring now to FIGS. 6A and 6B, the game software 15 may be configured with n blocks 314 of instructions, where each block 314 has an associated hash value h1 . . . $h_n$ determined by using a one-way hash function. Similarly, a master hash value $h_m$ of all the block hash values $h_1$ . . . $h_n$ is also determined using a one-way hash function. These values may be stored in the secure memory (ROM 304 or other non-volatile memory 313) of the secure perimeter 300. The secure memory of the secure perimeter 300 may store such values for many different games. At step 316, a block is loaded into the RAM of the game computer 14, and its instructions are executed at step 318. When the block 314 of software instructions is to be replaced in the RAM of the game computer 14, that block 314 is read by and loaded into the secure RAM 308 of the secure perimeter 300 at step 320. The secure CPU 302 calculates a hash value $hsp_n$ of that block 314 using the one-way hash function at step 322, and the computed hash value $hsp_n$ is compared to the known hash value $h_n$ for that block 314 stored in the secure memory of the secure perimeter 300 at step 324. If the computed block hash value $hsp_n$ matches the expected value $h_n$, and the game is not over at step 328, the next block of instructions 314 that replaces the previous block, represented by incrementing n at step 330, is loaded into the RAM of the game computer 14. If a block hash value $hsp_n$ does not match $h_n$ at step 326, the secure CPU 302 can do several things. It can send a message to the game computer 14 to disable the game program 26 at step 328. Alternatively, the secure CPU 302 generate a tamper indication which is included at the end of the game in the Authenticatable Outcome Message AOM at step 332, or, if no tampering is detected, it can generate a non-tampering indication which is included in the Authenticatable Outcome Message AOM at step 329. Thus, when the player attempts to submit an outcome for certification which was obtained with tampered game software 15 as evidenced by the tamper indication, the central computer 12 can reject the outcome. The secure CPU 302 in the secure perimeter 300 may alternatively calculate a master hash value $hsp_m$ based upon all of the individual block hash values $h_1$ . . . $hsp_n$ that were calculated as each block 314 was examined. This master hash value $hsp_m$ may then be compared to the expected master hash value $h_m$ stored in the ROM of the secure perimeter 300. If the master hash values do not match, the secure CPU 302 in the secure perimeter 300 can generate a tampering indication which is incorporated into the Authenticatable Outcome Message AOM. Alternatively, the master hash value $hsp_m$ itself may be incorporated into the Authenticatable Outcome Message AOM, and subsequently verified at the central computer 12 as described above.

In the case of a;dedicated game computer 14 (i.e., a game console), where it is more difficult to access and alter software instructions while loaded in RAM, or where the requisite level of security is not great, the secure perimeter 300 may not be required. However, there exists a problem unique to game consoles in the form of the GAME GENIE video game enhancing device. The GAME GENIE is an interposing device that connects between a game cartridge 21 and the game computer 14. In a game console application, the game software 15 resides in the ROM of a dedicated game cartridge 21. The interposing device enables a player to temporarily change certain game play-features by altering program instructions that are loaded from the ROM of the game cartridge 21 into the RAM of the game computer 14. These changes are not permanent, and disappear when the power to the game computer 14 is turned off. This provides a unique challenge in the context of the present invention, where the certification aspects rely, in part, on verifying the integrity of the game software 15. The present invention overcomes the interposing device problem by utilizing one-way hash functions and encryption in authentication protocols.

As in the above example incorporating one-way hash functions, the game software contains n blocks 314 of software instructions, where each block 314 has an associated hash value h1 . . . hn and the entire set of instructions has a master hash value $h_m$ computed by applying the individual hash values h1 . . . hn to a one-way hash function. The hash value of each block may be determined with the same or a different one-way hash function. One of the blocks 314 may contain a list of all hash values for the other blocks, the master hash value $h_m$, and the hash function or functions used for calculating each block hash value and the master hash value. As described above, the master hash value $h_m$ may be stored in the game software instructions, or can be input by the player into the game computer 14 at the start of a game. Thus, the master hash value $h_m$ is checked at game start by initially computing the master hash value $hnew_m$ from the values h1 . . . hn to determine whether it matches the value which is either stored in the instructions or input by the player. If the interposing device was used to modify any of the instructions, the computed master hash value $hnew_m$ will not match the input master hash value at the game start. To ensure that the interposing device does not subsequently alter software instructions as they are loaded into RAM, the game software 15 contains instructions that direct the CPU 27 to compute the hash value hnewj of each block j as it is to be replaced in RAM, and a recalculated master hash value $hnew_m$ based upon the new hash value for block j and the known hash values of all the other blocks. The calculated master hash value $hnew_m$ is then compared to the known master hash value $h_m$ in the hash block. If at any time a discrepancy is found, the game software 15 may instruct the game computer 14 to disable the game software 15, or generate a tampering indication that is included in the Authenticatable Outcome Message AOM. In this connection, the hash values h1 . . . $h_n$ and $h_m$, the one-way hash functions, and the instructions for checking the game software instructions in this manner may reside in a ROM chip internally associated with the game computer 14. Thus, although the protocol is essentially the same, no "security" instructions are executed from the game software 15 itself.

Another solution to the interposing device problem resides in the use of an authentication protocol to enable the game software to run in the game computer 14. In this connection, the game software instructions stored in the ROM of the game cartridge may be made authenticatable where the game computer 14 authenticates the instructions prior to executing the program. This can be implemented by encrypting the software instructions with a private key by the game developer, thereby requiring that the game computer 14 decrypt the encrypted game software instructions with the corresponding public key prior to execution of the game program. The instructions and algorithm(s) for performing the decryption process reside in a ROM chip (not shown) in the game computer 14. The game software instructions are encrypted in blocks. Before each block is executed in the RAM of the game computer 14, it is decrypted by the CPU 27 with the algorithm(s) and keys stored in the ROM chip. If an interposing device is used to make changes to the game software instructions, the authentication process implemented by decrypting the encrypted game software instructions with the public key will reveal unintelligible commands and the game program will be altered. This alteration may be detected by a security program in the ROM chip and used to disable the game software 15 and/or incorporated into the Authenticatable Outcome Message AOM to indicate tampering.

In addition to cryptographic techniques for defeating GAME GENIE-type devices, there are other methods that can be equally effective. One technique is to authenticate not only the score of the game but several key characteristics of the game. A GAME GENIE, for example, might allow a player to be completely invulnerable to the attacks of opponents. If the game he or she were playing required, for example, defeating a dragon at the end, the GAME GENIE enhanced player would have no trouble quickly defeating the dragon. Most players would take a longer amount of time and would likely sustain more damage as a result. This information (e.g., number of seconds elapsed and units of damage sustained) could be included in the Authenticatable Outcome Message AOM so that the central computer 12 can compare it to known information to determine whether it was within "normal" bounds. If it was outside normal bounds, the central computer 12 may initiate a challenge/response protocol involving the game computer 14, including certain register values (such as invulnerability status) in the reply message. Rather than detecting the presence of a GAME GENIE directly, this protocol detects the end-effects of a GAME GENIE. Software obfuscation techniques can also be used to effectively hide how the game software 15 works, as is well known in the art. Reverse engineering obfuscated software requires considerable time, delaying the creation of GAME GENIE produced cheat codes. Since CD-ROMs must be re-mastered every ten thousand or so pressings, it is possible to create many different versions of the game software. Thus, a GAME GENIE device would have to generate cheat codes for every possible software variation.

*Another solution is to monitor the time interval between the time the game computer 14 loads the game program 26 and the time that the game actually starts. If a GAME GENIE device were being used, the game would not start immediately since the player has to enter the cheat codes into the game computer 14 prior to game start.

In yet another embodiment, storing all the game data on removable memory media may enable the central authority to subsequently determine if the game was created with cheat codes input by a GAME GENIE device. This data may be "recorded" as described in detail herein.

The above described tampering indications may be incorporated into the Authenticatable Outcome Message AOM as "subliminal channels" of information, i.e., information which is difficult to decipher. In addition to the hash value and encryption authentication protocols described above, the game software 15 may run an integrity check on itself consisting of, for example, performing a one-way hash of the current memory registers to obtain a hash value. It then determines whether this hash value is within an allowable range of possible hash values stored as a line of code in the game program. If the determined hash value is within the allowable range, it returns a tamper indication value of 0 (i.e., no tampering made or attempted). If the determined hash value is outside the allowable range, it returns a tamper indication value of 1 (i.e., tampering made or attempted). This tamper indication value 0 or 1 is appended to the outcome and incorporated into the Authenticatable Outcome Message AOM. When the Authenticatable Outcome Message AOM is authenticated by the central computer 12, the tamper indication digit is interpreted to indicate whether that copy of the game software 15 has been altered or modified. These messages may be arranged so as to render them very difficult for a hacker to interpret their meaning. For example, in the string 13000087457, the last digit "7" is a pointer to the seventh digit in the string—"8", where the fact that this digit is an even number indicates that tampering was attempted. Similarly, the game software 15 may generate scores in specified multiples, e.g., five, such that any score not ending in a five or a zero is invalid. Furthermore, the game software 15 may vary one digit in the score to indicate tampering therewith in accordance with a self-integrity check as described above. For example, a score of 3905 is valid, but if the score is 3905+1=3906, the score is rejected because the addition of the numeral 1 indicates tampering.

The natural random variations in the magnetic memory media on which the game software 15 is made available, may be detected and used as a secret or private key in the cryptographic protocols described herein. These characteristics include variations in coercivity, granularity, coating thickness, surface profile, and the like. Thus, each specimen of memory media has a unique "memory media signature" that is dependent upon these characteristics. One method of detecting this unique memory media signature is disclosed in U.S. Pat. No. 5,235,166 to Fernandez. The Fernandez Patent teaches detection of the relative position of specific features of signals derived from the output of a transducer, and then measuring the deviation between the precise location of peak points, known as "jitter." The jitter is dependent upon the media itself, and the associated data stored thereon. The jitter may be represented as a digital mapping, i.e., a table of all the values of the jitter, or a sample of the jitter; a checksum of quantities derived from a number of jitter quantities or a one-way function (to produce a hash value); or multiple checksum quantities corresponding to jitter in different regions of the media. An initial memory media signature may be stored in the central computer 12 in the tournament database 46 in memory area 80 (see FIG. 7) prior to sale or distribution of the game software 15. Thus, during the outcome registration process described below, this information may be read from the memory media such as the game cartridge 21, using hardware such as that disclosed in the Fernandez Patent. This information may be included in the Authenticatable Outcome Message such that the central computer 12 can compare the initial memory media signature to the current memory media signature at the time an outcome is submitted to the central computer 12 for certification. Alternatively, the memory media signature may be used as an encryption key for authentication. In the case of the former, if the newly computed memory media signature does not match the initial memory media signature, the game software 15 has been altered and/or an unauthorized copy has been made. If the memory media signature is used as an encryption key, the outcome can be authenticated with respect to that copy of the game software 15. Another unique key that may be utilized in the cryptographic protocols herein is the unique identification number built into some central processing units. Intel, for example, assigns a unique number to each of its processors. This number may be read by the encryption/decryption module 28 each time an authenticatable message is to be generated. This unique number may also be referred to as the SSCID in accordance with the definition thereof as described above.

Figure 7:
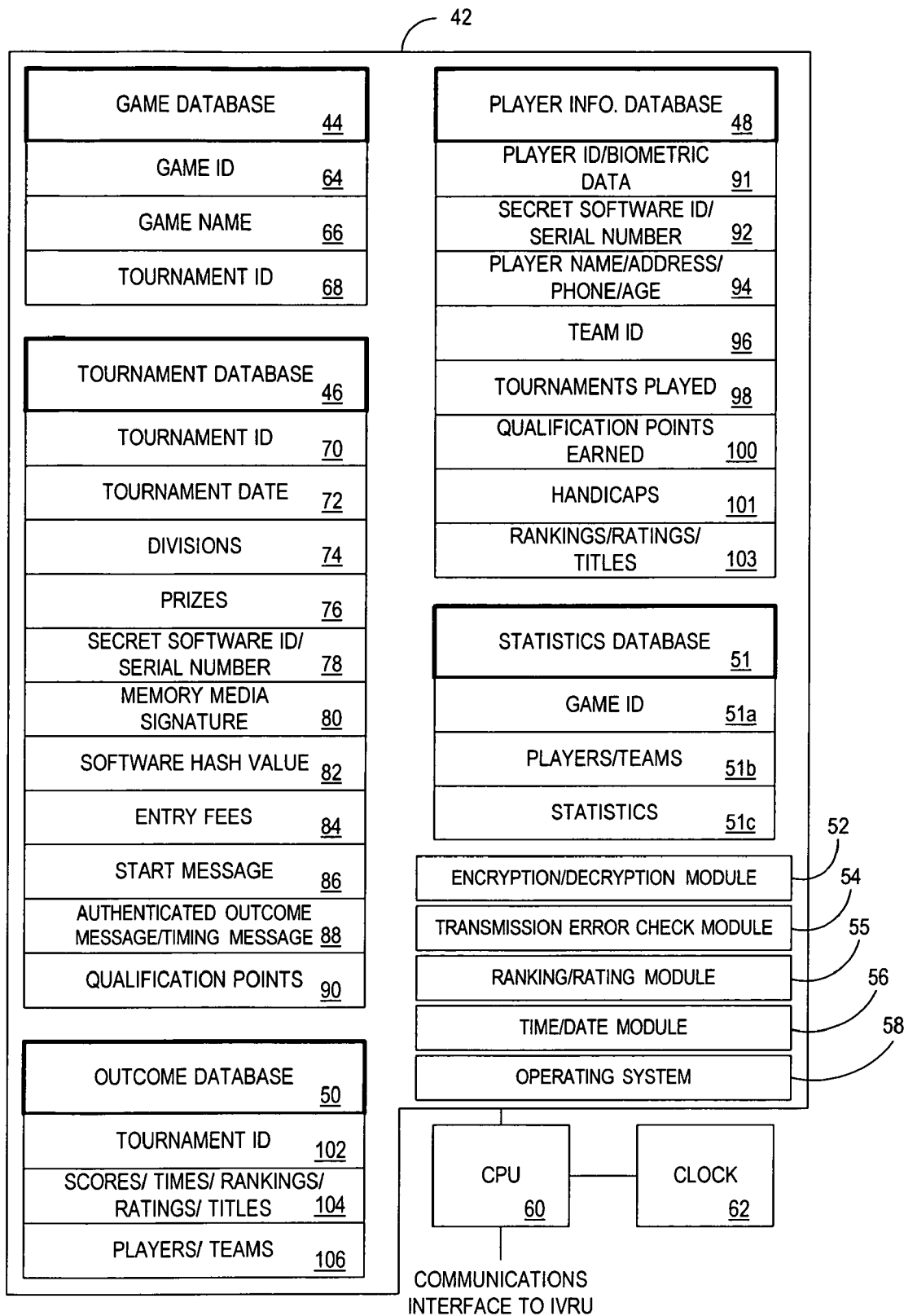
FIG. 7 is a schematic of an exemplary memory arrangement and some hardware for the central computer.

Referring now, to FIG. 7, there is depicted an exemplary memory arrangement for the central computer 12. Here again, although the central computer 12 is shown as a single unit, it may be comprised of a network of computers. Specifically, the central computer 12 includes a memory 42 containing several relational databases. These include a game database 44, tournament database 46, player information database 48, outcome database 50 and a statistics database 51. The central computer memory 42 also includes an encryption/decryption module 52, transmission error check module 54, rating/ranking module 55, time/date module 56 and an operating system 58. The transmission error check module 54 functions to detect inputting errors, corruption of transmitted data due to communication problems such as line noise and the like, to enable a resend command or request to be made as described above with respect to the game computer 14 and as is well known in the art. The operating system 58 controls the central processing unit 60 of the central computer 12. A clock 62 provides signals to the central processing unit 60 in a conventional manner and is also used by the time/date module 56 for time-stamping incoming messages as required. Alternatively, a trusted digital time stamping service may be used for this function.

The game database 44 includes game ID data in memory area 64, a game name in memory area 66 and tournament ID data in memory area 68.

The tournament database 46 includes a tournament ID number which uniquely identifies each tournament in memory area 70, the corresponding tournament date or range of dates over which the tournament is in effect in memory area 72, the division levels for a given tournament (tournaments may contain multiple levels such as beginner, intermediate and/or advanced), in memory area 74, information with respect to prizes to be paid out for a given tournament or fixed prizes for certain high scores for any game in memory area 76, the SSCIDs and software serial numbers SSNs in memory area 78, an initial memory media signature in memory area 80, an initial hash value of the game software 15 in memory area 82, entry fees paid or pre-paid for a given tournament in memory area 84, a start message for enabling a given tournament to begin in memory area 86, outcome messages received from the game computers 14 in memory area 88, and a list of qualification points earned to enable certain players to enter future tournaments in memory area 90.

A player follows a registration process whereby personal information such as his or her name, address, phone number, age, etc., is provided to the central computer 12 and stored in the player information database 48. The player may return a registration card included with the game software 15. This registration card contains the player's identification data and the serial number SSN of the game software 15. The registration card may contain security indicia such as a hologram and/or secret ID which is difficult to forge. This may allow the central authority in the case of game software 15 for use on a home PC or which resides in a game cartridge for use with a game console, to ensure that the game software 15 is associated with a specified player. The player is assigned a player ID which is used to register for tournaments and in the outcome registration process, either in connection with a tournament or independent thereof. The player may also be required to provide biometric data from the biometric device 31 (such as the digitized, compressed or hashed fingerprint data obtained from a fingerprint scanner, a voice-print obtained from a voice verification system, or the like). The player information database 48 includes the player ID and/or biometric data in memory area 91, the SSCID in memory area 92, the player's name/address/phone number/age in memory area 94, team ID number for team affiliation in the case of team tournaments in memory area 96, a list of tournaments in which the player has competed in memory area 98 and qualification points earned to enable the player to engage in future tournaments in memory area 100. Furthermore, memory area 101 stores player handicap values which may be used to adjust a player's outcome for a given tournament game or to modify the difficulty of a game generated by the game software 15 by communicating the game difficulty level in an Authenticatable Start Message described below. Handicap values may change in accordance with that player's demonstrated skill level for a particular game. In a golf tournament, for example, handicap values based on prior tournament results would be used for subsequent tournaments. Weak players may have strokes deducted from their final score while strong players had strokes added to their score. Instead of having strokes added or subtracted from the score, the handicap could also take the form of a set number of "mulligans", which allow the player to take back a poor shot and try again. Player rankings, ratings and titles may be stored in memory area 103, as well as in the outcome database 50.

The outcome database 50 includes the tournament ID in memory area 102, a listing of outcomes (i.e., scores, times of completion, or other special characteristics of the game) for any certified or tournament game and the corresponding player rating/ranking/title in memory area 104, and the player's name or team affiliation(s) in memory area 106.

The statistics database 51 may include game ID data in memory area 51*a*, player and team data in memory area 51*b*, and various statistical information in memory area 51*c*. The statistics database may be accessed over the telephone, or through an on-line service. It may or may not be password protected.

Figure 3:
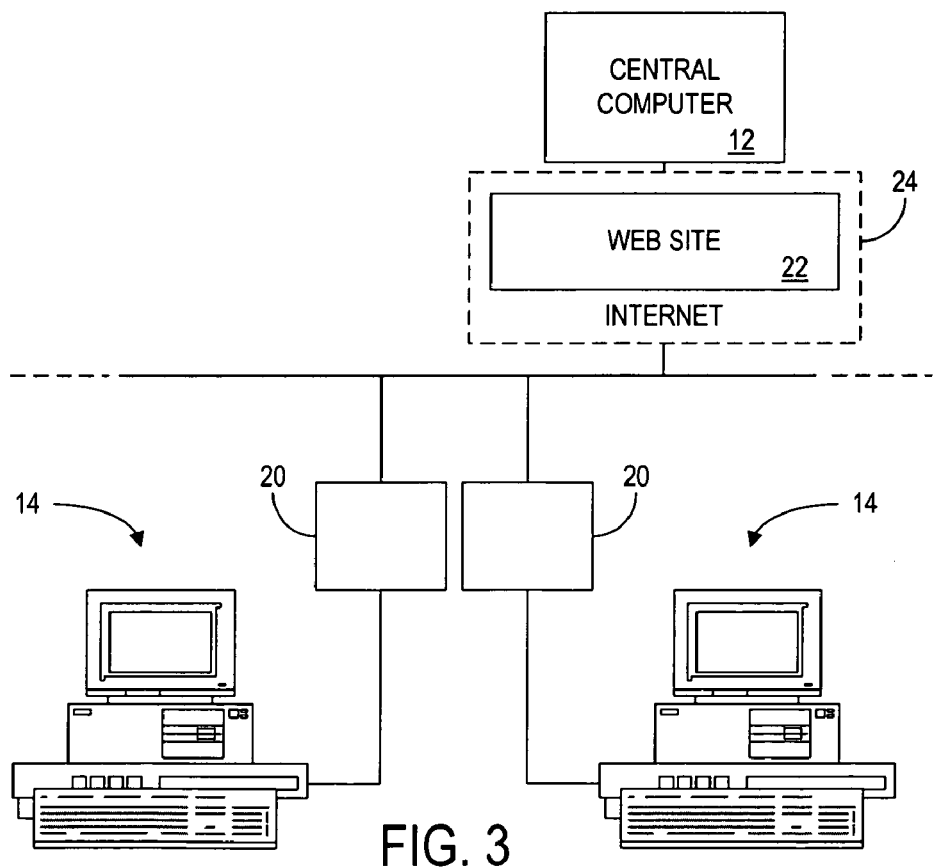
FIG. 3 is an overall schematic of the inventive system in still another embodiment.
Figure 8A:
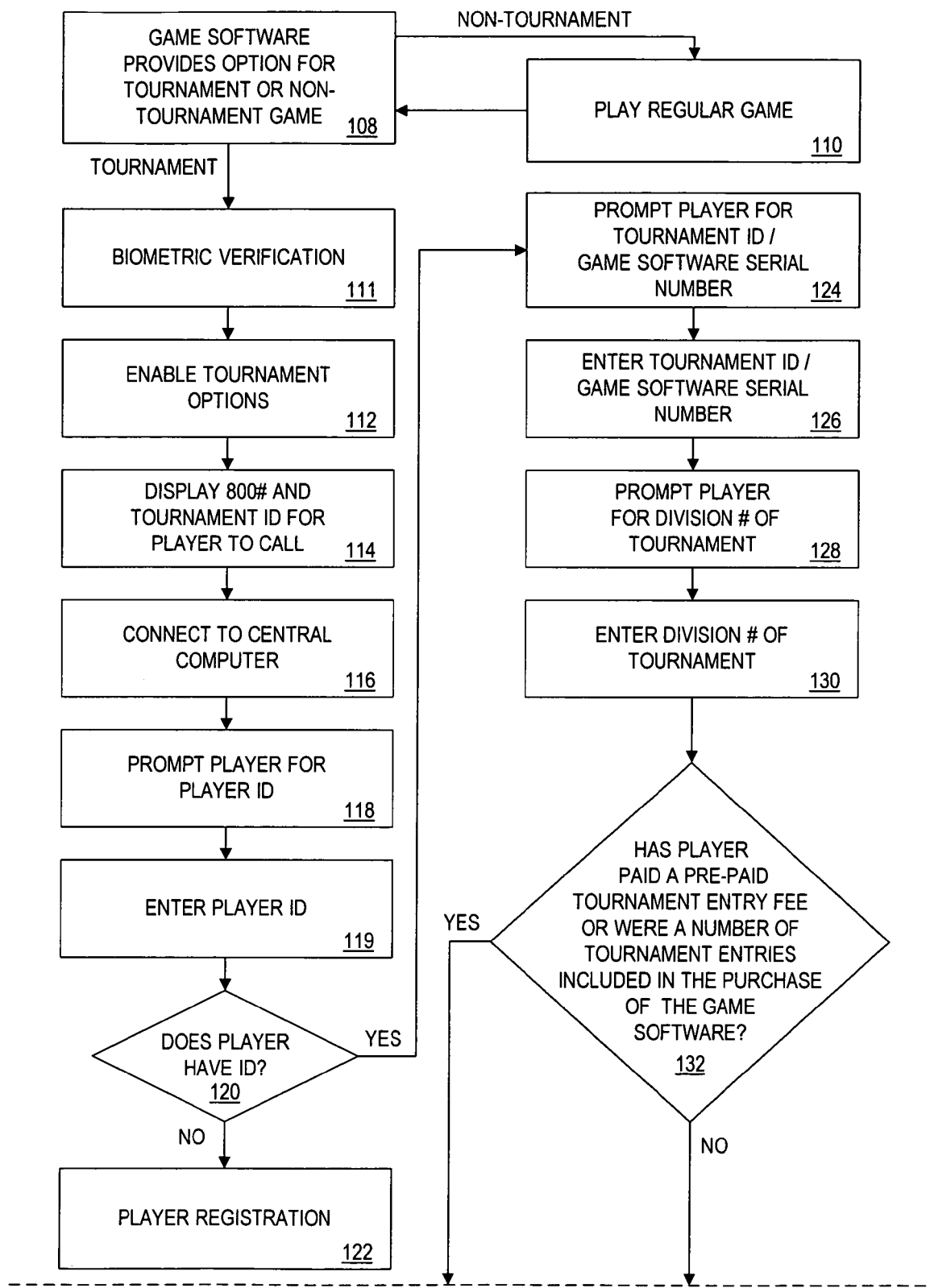
FIG. 8A is a flow-chart of an exemplary tournament entry procedure.

Referring now to FIG. 8A, there is depicted a flow-chart of an exemplary tournament entry procedure in the present invention. For the purpose of illustration, the flow-chart refers to a system where the player manually or verbally (through voice responsive hardware/software) enters messages, into the telephone 18 in response to prompts from an IVRU as shown in FIG. 1. However, it will be appreciated by persons skilled in the art that messages may be communicated between the game computer 14 itself and the central computer 12 by establishing a direct link or on-line connection as shown in FIGS. 2 and 3. In one embodiment, all games are tournament games. In another embodiment (shown in FIG. 8A), when a player activates the game computer 14 to play a game in the usual manner, the game software 15 directs the game computer 14 to generate an option to either enter a tournament or to play a regular game at step 108. If the player chooses to play a regular game, the game computer will generate a game in a conventional manner at step 110. If the player selects the option to engage in a tournament, the player may be required to proceed with a biometric verification procedure at step 111, using for example, the fingerprint verifier 31 or a voice-print check. The game software 15 will enable the tournament options at step 112. These may include disabling cheat codes as well as other modifications to the game parameters in the game software 15. The game software 15 also directs the game computer to display a tournament ID for a given tournament, and a toll free 800# for the player to call at, step 114. The use of an 800# is intended to be exemplary. Different tournaments may utilize 900#s which charge a prescribed toll fee, some or all of which may be applied to a tournament entry fee. In the case of 900#s, a blocking system to prevent children from calling may be utilized. This can be implemented by setting up a special blocking phone number operably connected to the central computer 12 that provides for blocking access from a given originating telephone number or by a person with a specific PIN. In the case of the former, the central computer 12 can deny (block) tournament entry requests for calls made from a specific telephone number that is identified in a database as "blocked." Identification of the originator of the 900# call may be made using an Automated Number Identification ("ANI") system of the type well known in the art. If the block is by PIN, the central computer 12 can identify blocked PINs by storing a list thereof in a PIN-blocking database. It is also anticipated that the 800# and tournament ID may be contained in separate literature accompanying the game software 15, and therefore need not be displayed by the game computer 14. However, for the purpose of illustration, the following description describes a system where the 800# is displayed by the game computer 14. The player then dials the 800# and connects to the central computer 12 via the IVRU 16 at step 116. The IVRU 16 prompts the player for the player's ID at step 118. The player enters his or her player ID into the keypad of the telephone 18 in a conventional manner at step 119. The player ID is communicated to the central computer 14, which checks the player information database 48 to determine whether the player has a valid player ID at step 120. If not, the player registers with the central computer 14 at step 122 as described above. If the player ID is verified, the IVRU 16 prompts the player for the tournament ID, and the software serial number SSN for the game software 15 at step 124.

The player enters the tournament ID and game software serial number SSN into the telephone 18 at step 126. Since a given tournament may have different divisions (e.g., beginner, intermediate and/or advanced), the player may have the option to choose the appropriate level of competition for his or her skill level. If the player has the option, the IVRU 16 prompts the player for the division number of the particular tournament at step 128. At step 130, the player then enters the division level or number into the telephone 18. Alternatively, if the player already has a rating stored in the outcome database 50, the division level may be determined by the central computer 12. The tournament database 46 maintains a record of the divisions for a given tournament in memory area 74. The central computer 12 may limit the number of entries in a tournament, and may thus verify that space is still available when a player seeks entry in that tournament. If space is available, the central computer 12 checks whether the player has pre-paid for tournament entries or whether a pre-paid number of tournament entries were included in the purchase of the game software 15 at step 132. It is anticipated that payment for tournament entries may also be made through an account arrangement where the player pays a certain fee on some prescribed basis. Entry fees for the tournaments are stored in memory area 84 in the central computer 12. If no entry fees have been paid, the IVRU 16 prompts the player for a credit card number at step 134 if an entry fee is required. The player enters the credit card number into the telephone at step 136. The credit card validity is checked on-line in a conventional manner. Of course, credit card use and authorization could be made by swiping the credit card through a credit card reader, in lieu of manually entering the credit card number into the telephone 18. In an alternative embodiment, entry in a tournament may neither require payment of any fees, nor a start message to enable tournament play. At step 138, the central computer 12 then generates an Authenticatable Start Message ASTM for the player's tournament game and specific game software 15 using the encryption/decryption module 52. The Authenticatable Start Message ASTM may be encrypted so that only the intended game computer and/or game software can use that message when decrypted with the required key. The Authenticatable Start Message ASTM is communicated to the player over the telephone 18, and then entered into the game computer 14 by the player at step 140 (e.g., through the computer keyboard or a joystick). In this connection, the Authenticatable Start Message ASTM can enable tournament play based upon public sources of randomness. In such an implementation, the player is required to enter both the Authenticatable Start Message ASTM and a separate input available from some public source such as television, radio, newspapers and the like. Thus, tournament play starts when players are able to obtain an initialization code from, for example, the lottery Pick "4"

numbers broadcast on the 10 o'clock news on channel Z. This random information must be entered prior to game play and becomes part of the Authenticatable Outcome Message AOM. Thus, this information verifies that the game started subsequent to the occurrence of the triggering event. The game computer utilizes the encryption/decryption module 28 to authenticate the Authenticatable Start Message ASTM at step 142. The authenticated start message signals the game program 26 to enable play of the tournament game at step 144. The start message signals the game software 15 that this is a valid tournament game. It may also contain instructions for the game software 15 to generate specified or random initialization parameters for that tournament game, such as, for example, its challenge level. In this connection, it is anticipated that start messages may be broadcast over mass communications channels such as television, radio, the Internet, etc., at a specified time to start a given tournament or to start player competition in a race of skill. That implementation will be described in more detail below.

The start messages may be used to facilitate game play on a pay-per-game basis. For example, a player calls the central computer 12, pays a specified fee, and obtains a start message good for one game or a number of games. Thus, a game computer 14 in a home environment can be made to operate much like an arcade machine. In this application, the start message functions as a key; without it, the game software 15 cannot generate a game. By incorporating a timing element into the start message, it can be made "time-limited" (i.e., valid for some predetermined period of time), assuming that the game computer 14 communicates with a clock, preferably one that is tamper-resistant. A variation of the pay-per game concept is described in another aspect of the invention in more detail hereinbelow.

The start messages may also be used for other applications. A start message may contain compressed advertising information, which is decompressed by and displayed on the game computer 14.

Figure 8B:
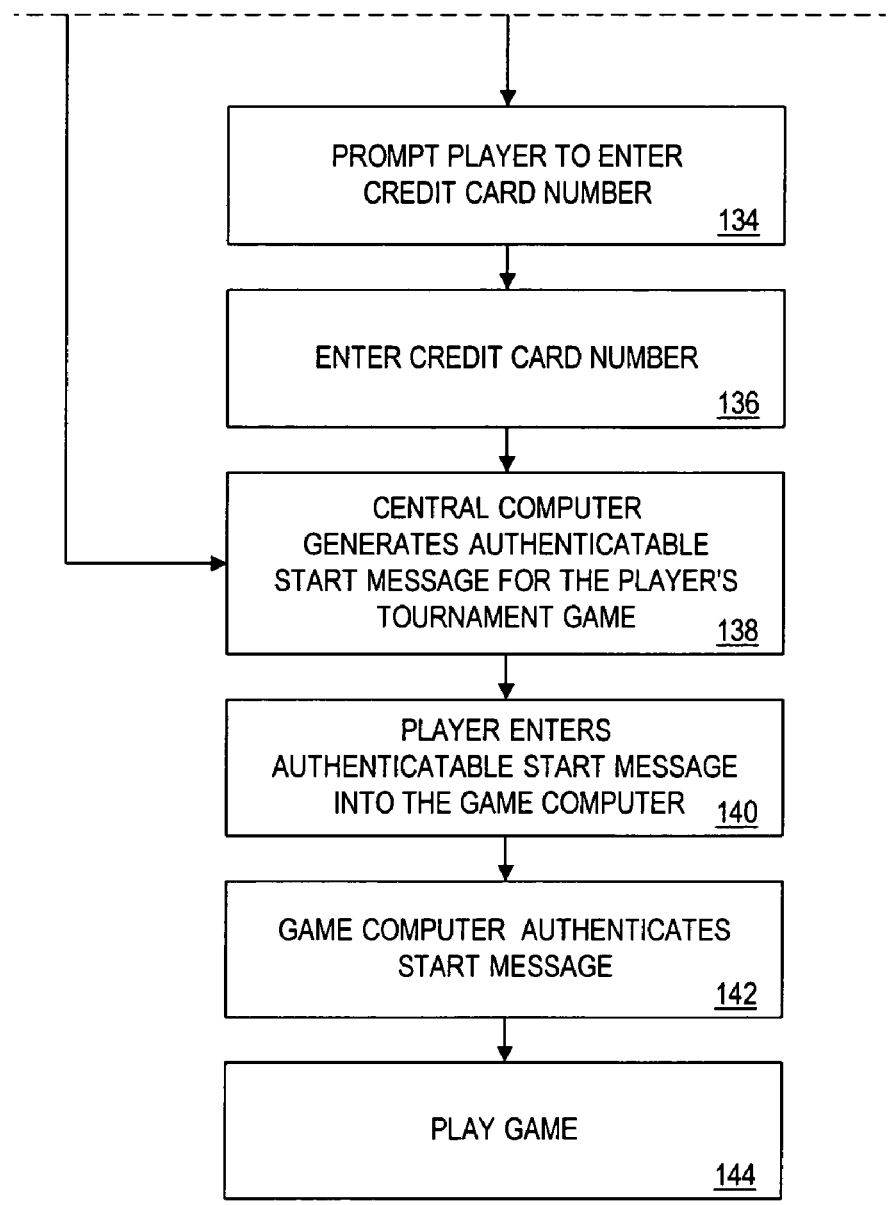
FIG. 8B is a schematic of an arcade implementation.
Figure 9:
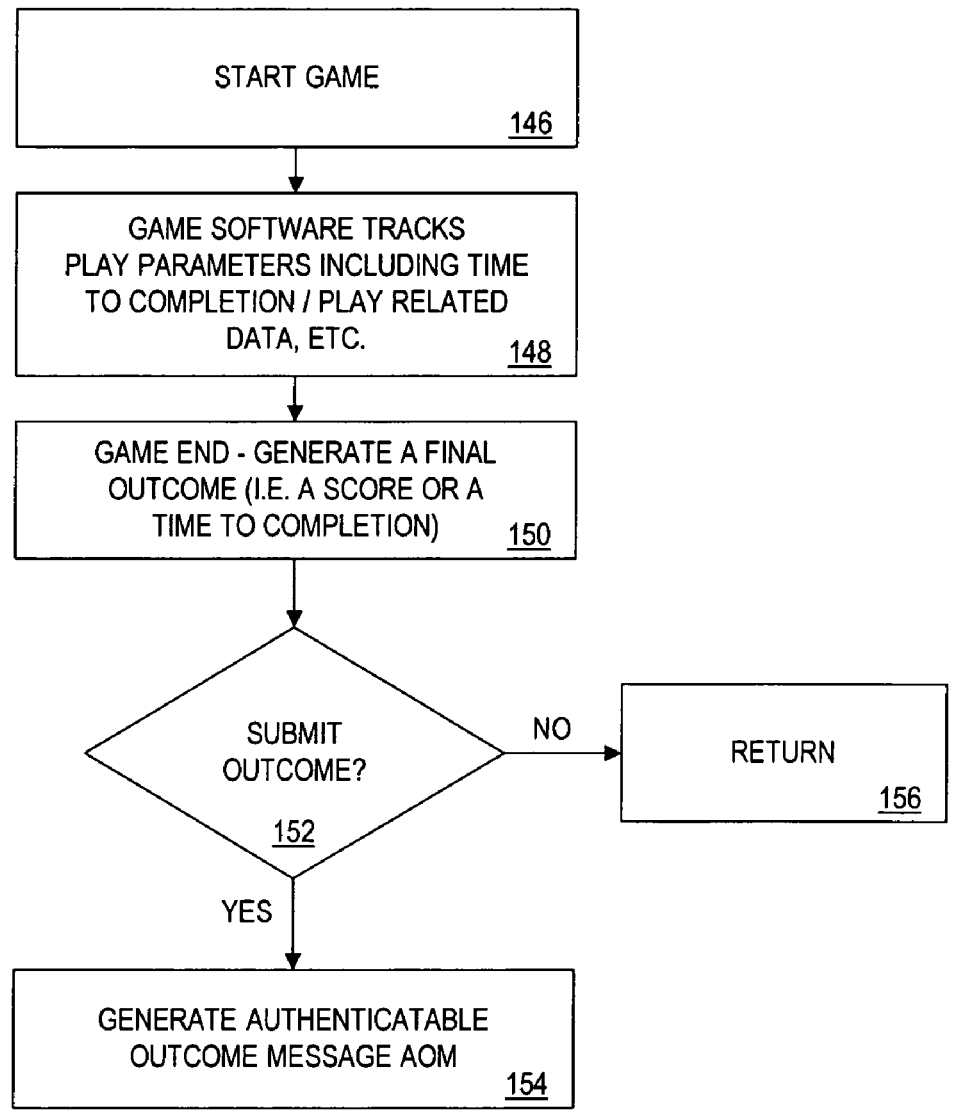
FIG. 9 is a flow-chart of game play.

Referring now to FIG. 8B, in a coin-operated arcade environment, a player may purchase a number of tournament entries embodied in a pre-paid card 216. The card 216, may include memory media such as a magnetic strip. The game computer 14 in the case of an arcade machine, for example, has a card reader 218 communicating with the CPU 27 of the game computer via an interface in a conventional manner. The card 216 is obtained from a tournament operator station 220 having a card encoder 222 communicating with the central computer 12. The tournament operator station 220 may have a tournament operator or may itself consist of an automated apparatus which accepts payment and tournament entry requests. The player pays the tournament operator by credit card or cash. If payment is made by credit card, the tournament operator obtains on-line authorization in a conventional manner, and then sends a tournament entry request to the central computer 12. If payment is made by cash, the tournament operator simply sends a tournament entry request to the central computer 12. Upon receipt of a requested number of tournament entries, the central computer 12 generates a corresponding number of Authenticatable Start Messages ASTMs and communicates the same to the operator station 220 where the start messages may be encoded in the magnetic strip of card 216. The word "message" in this context is used to identify each tournament entry instruction or code. It is anticipated that a single message may contain a plurality of entry codes for a corresponding number of tournaments. Thus, the reference here to Authenticatable Start Messages ASTMs means multiple tournament entries. When the player swipes the card 216 through the card reader 218, the Authenticatable Start Message ASTM associated with that tournament is read by the game computer 14 and enables tournament play as described above. The Authenticatable Start Message ASTM may be customized to enable tournament play on a particular game computer 14 or its game software 15 that is identified (e.g., using the SSCID) in the Authenticatable Start Message ASTM. In another application, the Authenticatable Start Message ASTM may contain unique identification information to be incorporated into the Authenticatable Outcome Message AOM such that the right to submit an outcome represented by a given Authenticatable Outcome Message AOM can take place only once. Thus, a player cannot steal an Authenticatable Outcome Message AOM representing a high score obtained on another game computer 14, because the central computer can determine that the Authenticatable Outcome Message AOM representing that specific score from a given game computer 14 was already used. To facilitate the application of the present invention to the arcade environment, an arcade machine (the game computer 14) may include a printer that prints out the Authenticatable Outcome Message AOM to make it easier for the player to register an outcome where access to a telephone may be limited. By printing a receipt with the Authenticatable Outcome Message AOM, the player may access the system from a telephone at a convenient location, and no hardware for an on-line connection between the arcade machine and the central computer is necessary. Referring now to FIG. 9, a game sequence flow-chart is depicted. In step 146, the game computer 14 generates a game in a conventional manner. If it is a tournament game as described above, the game software 15 may disable cheat codes, alter the game such that the game play characteristics may be randomized in comparison to a non-tournament version, make the game easier or more difficult to play, and/or unlock hidden levels of challenge in comparison to non-tournament versions of the game. At step 148, the game software 15 tracks the time to completion and special play-related information pertaining to that game such as number of lives lost, amount of time spent per level, number of hidden treasures found, etc. At step 150, the player finishes the game and the game software 15 generates an outcome. In certain embodiments, the game computer 14 may then generate an option for the player to choose whether or not to submit the outcome for certification at step 152. If the player desires to have an authenticatable outcome generated for submission to the central computer (in the case of a tournament), or to subsequently prove to friends that a certain score was achieved, the Authenticatable Outcome Message AOM (or Authenticatable Timing Message ATM for races of skill) discussed above is generated at step 154. If not, the player may return to play another game at step 156. In the case of a tournament, the player may not be provided with the option of whether to submit an outcome for certification.

Figure 10A:
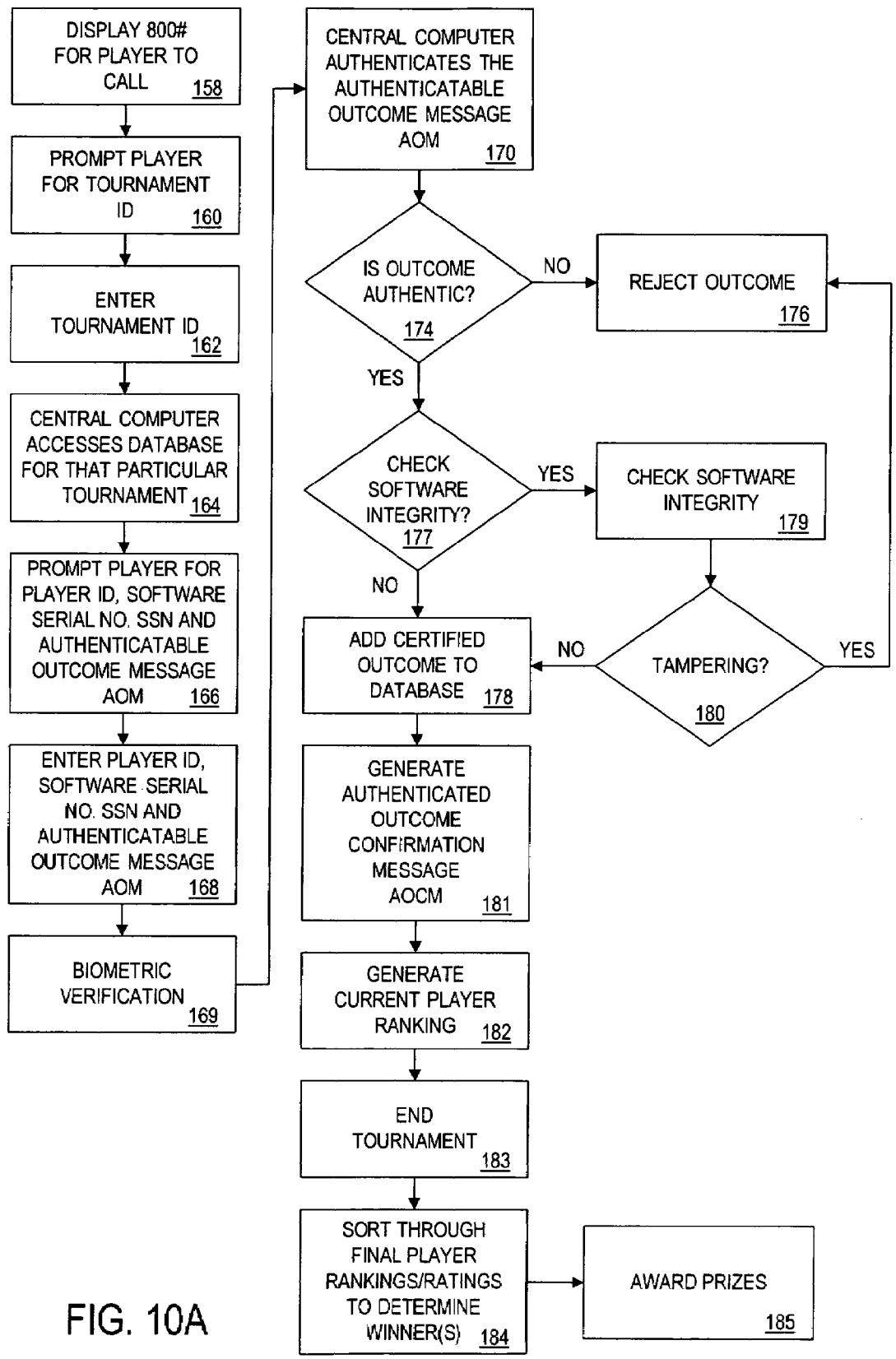
FIG. 10A is a flow-chart of an illustrative outcome submission and certification sequence.
Figure 10B:
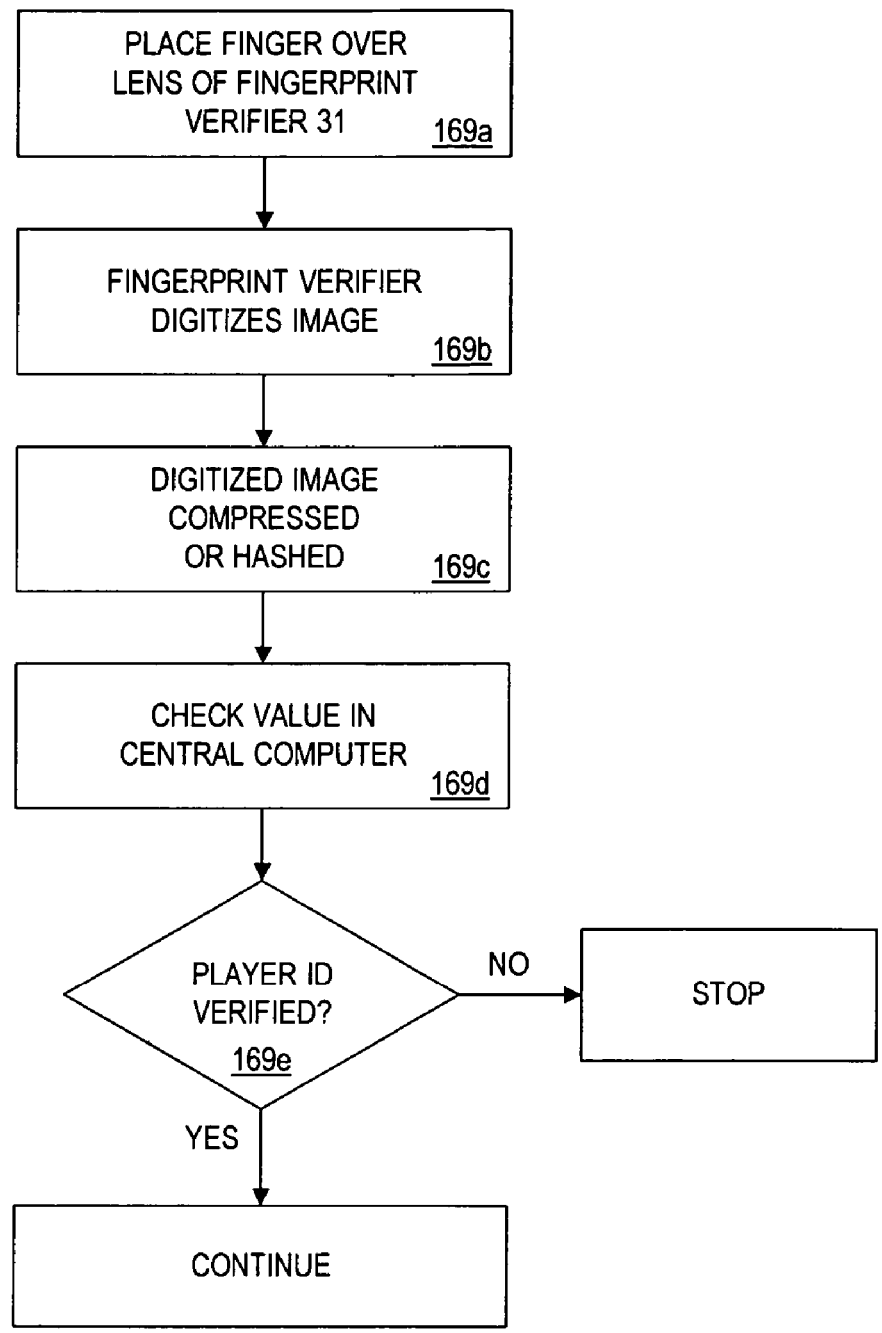
FIG. 10B is a flow-chart of an illustrative biometric verification procedure.

Referring now to FIG. 10A, there is depicted a flow-chart of an outcome certification sequence in a tournament embodiment. In this example, the outcomes are submitted to the central computer 12. However, a similar procedure may be employed for just certifying outcomes independent of any tournament. In that case, the central computer 12 generates an updateable database of player scores and statistics, which may be accessed by players through an on-line service, over the telephone or the like. Statistics could include lists of past prize winners, or lists of the top players in the current tournament. To initiate the outcome submission process for a tournament game, the game software 15 directs the game computer 14 to display the 800# for the player to call at step 158 as described above. The player is prompted by the IVRU 16 to enter the tournament ID at step 160, which the player enters into the telephone 18 at step 162. The central computer 12 then accesses the tournament database 46 for the particular tournament identified by the tournament ID at step 164. The IVRU 16 then prompts the player for his or her player ID, software serial number SSN, and the Authenticatable Outcome Message AOM at step 166. The player enters the player ID, software serial number SSN and Authenticatable Outcome Message AOM into the telephone 18 at step 168. This step may include entering multiple Authenticatable Outcome Messages AOMs, or a single Authenticatable Outcome Message AOM may represent several outcomes. The central computer 12 may request a biometric verification of the player's identity using, for example, the fingerprint verifier 31 at step 169. The biometric verification procedure using the fingerprint verifier 31 is depicted in a flow chart in FIG. 10B. In step 169a, the fingerprint verifier 31 does a live scan of the player's fingerprint, which is digitized at step 169b, and the digitized data is then compressed or hashed by the game software 15 at step 169c. The compressed or hashed data is communicated to the central computer 12, which compares the current data to that stored in memory in the player information database 48 in memory area 91 at step 169d. If the compressed or hashed data from the current scan of the player's fingerprint matches that stored in the player information database 48, the player's identity is verified and the outcome submission procedure continues to step 170. If not, the outcome submission procedure terminates. The same biometric player identity verification procedure may be implemented with a voice print verification at the central computer 12. The central computer 12 authenticates the Authenticatable Outcome Message AOM using the encryption/decryption module 52 at step 170, using any one of the protocols described above. Authentication ensures either identity and/or integrity, depending on the specific cryptographic protocols selected. The use of keyless hashing of the outcome, for example, would ensure outcome integrity, while encryption of the outcome with a sender's private key would ensure identity of the player submitting that outcome. A digital signature (a hash encrypted with the sender's private key) would ensure both integrity of the outcome and identity of the sender. The central computer 12 may time stamp the message, or it may communicate with a trusted third party such as a digital time stamping service to perform this function. Digital time stamping is known in the art and details thereof may be found in U.S. Pat. Nos. 5,136,646 and 5,136,647. The Authenticated Outcome Message AOM is stored in memory area 88 of the tournament database 46. If the outcome is not authentic at step 174, it is rejected at step 176. If the outcome is authentic, the central computer proceeds to step 177. The central computer may check the integrity of the game software as described above at step 179, or proceed directly to step 178. If the software integrity check at step 179 reveals tampering at step 180, the outcome is rejected. After the outcome is authenticated and the integrity of the game software 15 verified, the central computer 12 adds the certified outcome to the outcome database 50 in memory area 104 at step 178. In the illustrative embodiment, the certified outcome is referenced by the corresponding tournament ID in memory area 102, and the player's name in memory area 106. At step 181, the central computer 12 may generate an Authenticated Outcome Confirmation Message AOCM which, when communicated to the game computer 14, can be used by the game software 15 to cause the game computer 14 to display a certified scoreboard with language to the effect that a particular outcome (e.g., score) was certified by the central computer 12. The same Authenticated Outcome Confirmation Message AOCM can be utilized by the game software 15 to direct the game computer 14 to generate special symbols or medallions as a result of an established level of competence. These may be made to appear on the screen with an identification of the player during subsequent game play. In view of the competitive nature of video games, this feature greatly enhances their play value games by providing for recognition of the player's achievements.

At step 182, the central computer 12 generates a current player ranking in the tournament utilizing the rating/ranking module. The player rankings in the outcome database 50 may include subsidiary rankings delineated by state, school, age group, etc. If the tournament is still ongoing, players may be provided with their current ranking so far. The tournament ends at some predetermined time at step 183. At step 184, after the conclusion of the tournament, the central computer 12 sorts through all the scores to determine a winner from the final rankings. These may be segregated by division level such that the beginner, intermediate and advanced levels each have a separate winner with associated rankings and ratings. At step 185, prizes are awarded in a conventional manner.

Prizes or awards can also be offered on an exclusive basis to players who achieve certain skill levels. For example, becoming a "Two Star" SONIC THE HEDGEHOG player may require the certification of two scores of 50,000 points or more. Players reaching this level of achievement may be offered prizes, or the ability to purchase goods at self-liquidating prices. There may be a catalog for "Two Star" players and a separate catalog for "Three Star" players. An award for achieving a certified level of play may include the incorporation into the game software 15 the player's name in background graffiti on the actual game screens renaming game characters, or the modification of the game play or visuals in some other subtle manner until a new higher scoring player is allowed to change these altered characteristics. The player information database 48 is also updated to reflect the tournament played and any qualification points earned towards future tournaments in memory area 100.

It is also anticipated that "instant prizes" could be awarded to players based upon exceeding some predetermined threshold level (e.g., a player scoring over a million points for any MORTAL KOMBAT game receives a $50 instant prize). This prize could be implemented, for example, in the form of a $50 credit to the player's credit card. In a golf game embodiment, an instant prize can be offered for a hole-in-one on each hole, supplementing a normal tournament prize structure for the lowest score. Alternatively, if the tournament is being conducted in an arcade environment, the player could receive an instant cash prize from an agent at the arcade. These instant prizes could be awarded mutually exclusive and prior to the conclusion of a given tournament. The arcade is then reimbursed for all or part of the prize awards by the central authority. Other awards may include coupons good for discounted or free entries in future tournaments, frequent flyer miles or hotel points, and/or for special cheat codes (which cannot be used, however, in connection with a certified game).

In accordance with another aspect of the invention, the game software 15 may contain a certificate printing routine which contains templates for generating different certificates for players who reach a certain score and/or who attain a certain title (e.g., "Master," "Grandmaster," etc.). Such certificates may be printed out by the game computer 14, upon reading an Authenticated Outcome Confirmation Message AOCM from the central computer 12, and represent that a player has attained a given level of achievement. The Authenticated Outcome Confirmation Message AOCM "unlocks" the printing instructions in the game software 15. The player enters his or her name and/or password into the game computer 14. These certificates may be customized for each game and even for different levels of achievement. A player bragging about his or her certified score to his or her friends may now proffer visual proof. A certificate could offer tangible evidence of a hole-in-one, for example. To prevent fraud, these certificates may be provided with certain security indicia such as holograms and the like. If an unauthorized copy of the certificate is made, the security indicia becomes visible and thereby indicates that it is counterfeit. The certificate may also contain the Authenticatable Outcome Message AOM and/or Authenticated Outcome Confirmation Message AOCM printed on the face thereof so that the achievement can be verified by calling the central computer 12.

The Authenticated Outcome Confirmation Message AOCM may also be utilized to unlock certain attributes of a game that are only encountered by high scoring players. For example, a top scoring player who receives a certified score, may be provided with an Authenticated Outcome Confirmation Message AOCM that, when read by any game computer 14 with the game software 15, allows players on that game computer 14 to view special hidden characters or final stages of the game, which are not normally encountered until a certain level or score is attained. In this regard, such an Authenticated Outcome Confirmation Message AOCM may include specific game software identification information such as the software serial number SSN to restrict its use to a specified game computer or number of game computers. Thus, the high scoring player provides the identity of those players and/or their game software serial numbers SSNs to the central computer, which incorporates the same into the Authenticated Outcome Confirmation Message AOCM. In this manner, the Authenticated Outcome Confirmation Message AOCM enables only those game computers 14 having game software 15 identified by those software serial numbers SSNs to reveal the hidden characters or final stages of the game. It is also anticipated that the central computer 12 may be utilized only to certify outcomes. Thus, a third party may be provided with the Authenticated Outcome Confirmation Message AOCM representing a certified outcome, where that third party then handles tournament rankings, ratings and prize distribution. For convenience, however, all such functions are schematically shown to take place with one central computer 12.

In all tournament embodiments, a final playoff protocol may be established for top players, which takes place in a central location under the supervision of a tournament director(s). Thus, where prizes for large sums of money are at stake, this final playoff may be used to ensure that no undetected substitution of players takes place during play or when reporting game outcomes.

Figure 11:
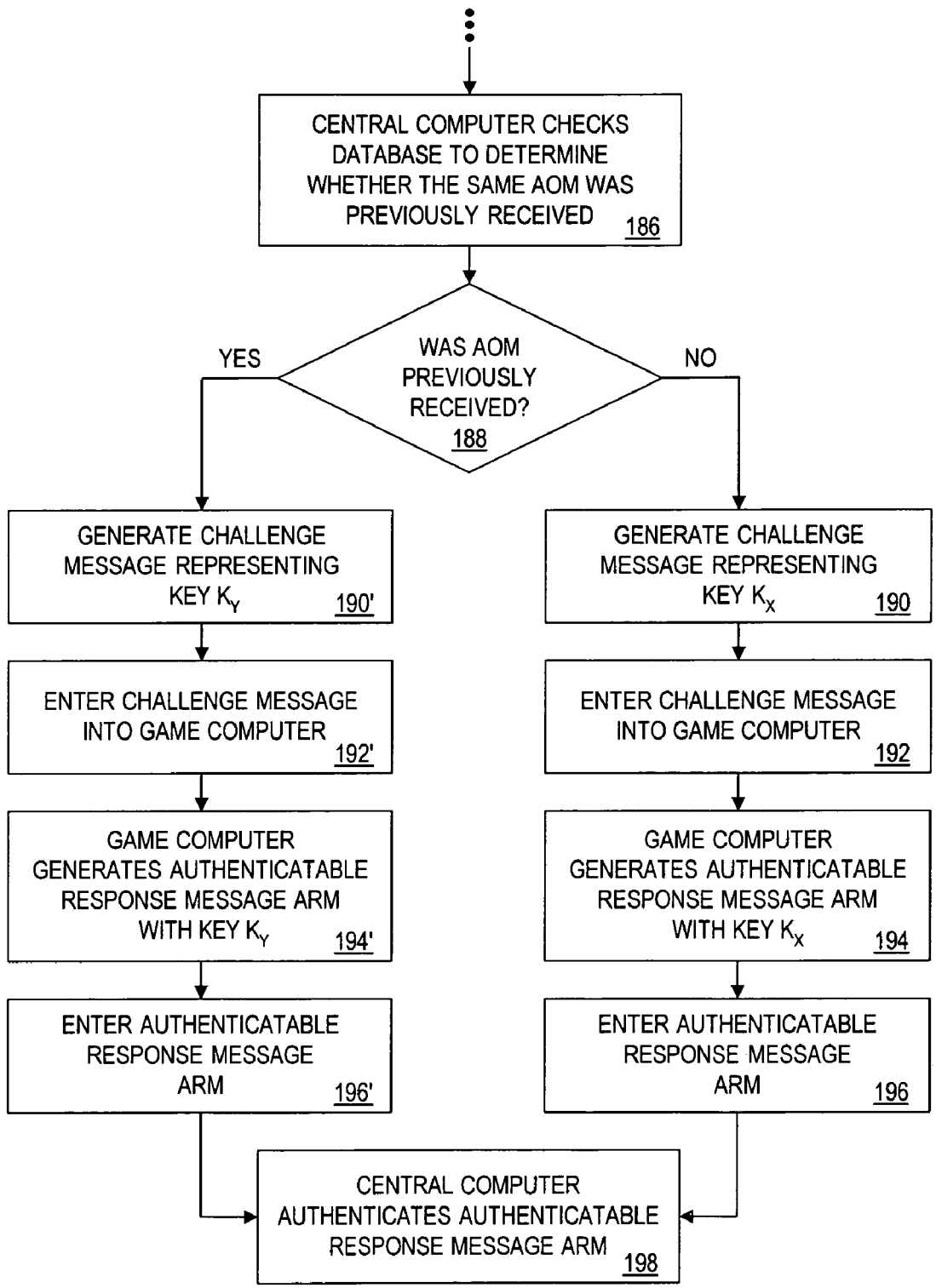
FIG. 11 is a flow-chart of a challenge/response protocol.

Referring now to FIG. 11, an embodiment of the invention utilizing a challenge/response protocol is depicted. Steps 158-174 are identical to those shown in FIG. 10A and described above, and therefore need not be repeated. At step 186, the central computer 12 checks the tournament database 46 to determine whether the same Authenticatable Outcome Message AOM has been previously received, by checking memory area 88. If the Authenticatable Outcome Message AOM presently communicated in this outcome submission sequence is not the same as a previous Authenticatable Outcome Message AOM, the central computer 12 generates an Authenticatable Challenge Message ACM for that player's game computer 14 representing a key $k_x$ at step 190. This representation may be the actual key $k_x$ itself, or an instruction for the encryption/decryption module 28 to retrieve the specific key $k_x$ based upon a certain command (i.e., the command encrypt X means use encryption key $k_x$). The Authenticatable Challenge Message ACM is communicated to the player and entered into the game computer 14 at step 192. The encryption/decryption module 28 authenticates the Authenticatable Challenge Message ACM and generates an Authenticatable Response Message ARM based upon the outcome with key $k_x$ at step 194. The player enters the Authenticatable Response Message ARM into the telephone 18 at step 196. The Authenticatable Response Message ARM is communicated to the central computer 12 and authenticated by the encryption/decryption module 52 at step 198. If the outcome represented in the Authenticatable Response Message ARM is not authentic (where a player has stolen another player's AOM), the outcome is rejected. A player cannot make up an outcome because he cannot guess the key $k_x$ in advance. If the outcome is accepted, the process proceeds in accordance with the sequence shown in FIG. 9A. Referring back to step 188, if the central computer detects a duplicate Authenticatable Outcome Message AOM (i.e., indicating that a player may have stolen a message), it generates an Authenticatable Challenge Message ACM representing key $k_y$ (a different key than $k_x$ that was used to challenge the earlier Authenticatable Outcome Message AOM) at step 190. The Authenticatable Challenge Message ACM is communicated to the player and entered into the game computer 12 at step 192. The encryption/decryption module 28 authenticates the Authenticatable Challenge Message ACM and generates an Authenticatable Response Message ARM based upon the outcome with key $k_y$ at step 194. The player enters the Authenticatable Response Message ARM into the telephone 18 at step 196. The Authenticatable Response Message ARM is communicated to the central computer 12 and authenticated by the encryption/decryption module 52 at step 198. The rest of the process proceeds as described above. This protocol prevents someone from using another player's Authenticatable Outcome Message AOM to register a false score unless they also have access to the game computer 14 which generated the AOM.

In another embodiment, the challenge/response protocol utilizes random numbers in lieu of multiple cryptographic keys. In this implementation, the Authenticatable Outcome Message AOM includes a random number R1 generated by the encryption/decryption module 28. This makes each Authenticatable Outcome Message AOM unique, irrespective of identical outcomes on different game computers 14. If duplicate Authenticatable Outcome Messages AOMs are detected, the last Authenticatable Outcome Message AOM which is identical to a previous submission is rejected by the central computer 12. Non-duplicate Authenticatable Outcome Messages AOMs are processed as described above, to ensure that the player submitting the same is in possession of the actual game software 15 and/or game computer 14. This prevents a player from stealing another's Authenticatable Outcome Message AOM and claiming it as their own. In this protocol, the central computer 12 generates a second random number R2, which is included in the Authenticatable Challenge Message ACM. The ACM is authenticated by the encryption/decryption module 28 associated with the game computer 14, and then concatenated with the original outcome message into the Authenticatable Response Message (ARM). The ARM is communicated to the central computer 12 and authenticated. The central computer 12 then checks whether R1 and R2 are identical. If they are, then the outcome message is verified as having been generated by the player's game software 15/game computer 14.

The challenge response protocol may be implemented by the central computer 12 on a random basis, or based upon current scores, previous scores, or some other game related factors, to streamline the score submission process. For example, every time an Authenticatable Outcome Message AOM is submitted to the central computer 12, it may generate a random number between 0 and n. If the random number is less than j (a number between 0 and n), the challenge/response protocol is initiated. If the random number is greater than or equal to j, the Authenticatable Outcome Message AOM is simply processed as depicted in FIGS. 7-11. This procedure saves time, as the player is only required to enter one message per outcome submission. And, if cheating is detected, it can be used to deny the player certification of future outcomes, and to invalidate any outcomes certified in the past as a penalty.

In another protocol, the Authenticatable Start Message ASTM as described above and illustrated in the tournament entry flow chart of FIG. 8A, includes a unique key for generating the Authenticatable Outcome Message AOM. Thus, every Authenticatable Outcome Message AOM is unique, regardless of whether multiple players have the exact same scores. Since every player is provided with a different key, the same outcome from different players would necessarily have to be represented by different Authenticatable Outcome Messages AOMs. This prevents a second player from stealing the Authenticatable Outcome Message AOM of a first player in an attempt to submit a false score. This is assured because the key sent with each Authenticatable Start Message ASTM is different, and the key for authenticating the message is different as well. If player X steals the Authenticatable Outcome Message AOM from player Y, player X will be caught cheating when the central computer 12 applies player X's key to the Authenticatable Outcome Message AOM that was encrypted with player Y's key (i.e., the message will be unintelligible). The Authenticatable Outcome Message AOM may also include the SSCID as discussed above to enable the central computer 12 to authenticate the message with respect to the specific game software/game computer as well.

Figure 12:
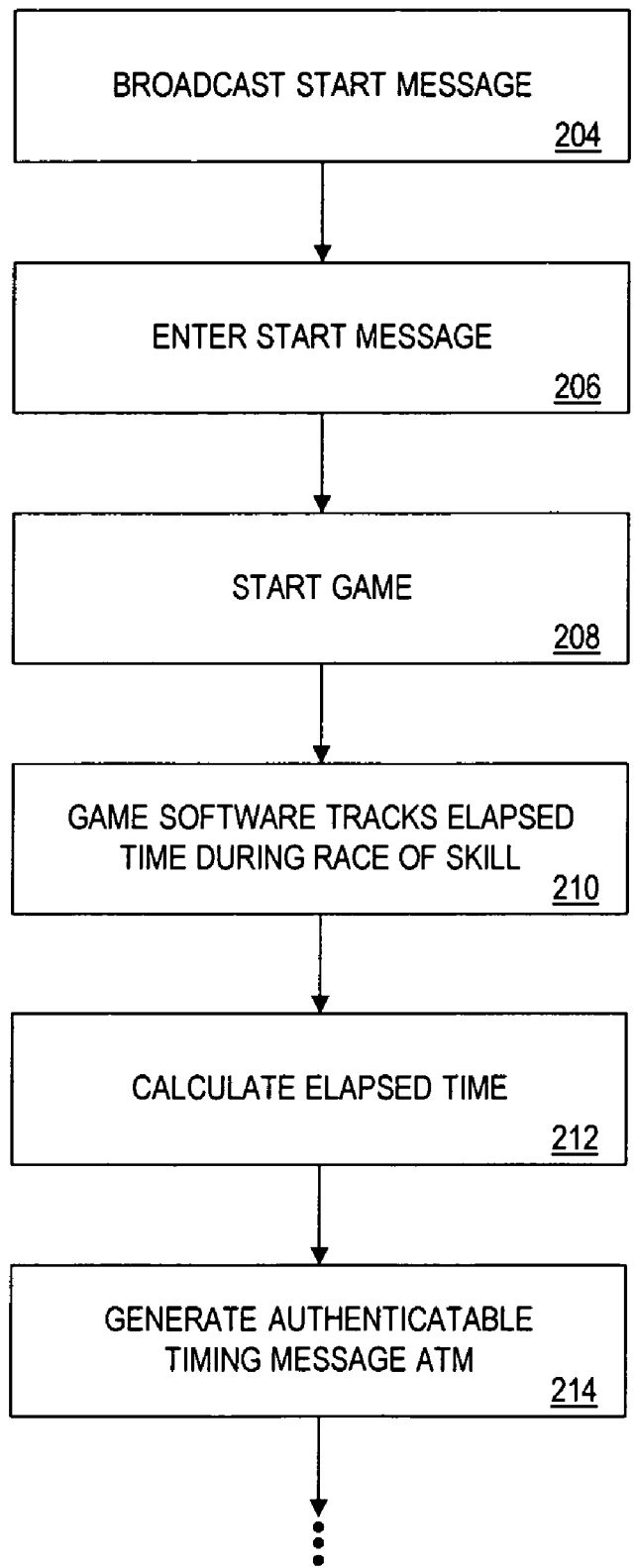
FIG. 12 is a flow-chart of a Broadcast Start Message sequence in one exemplary embodiment for races of skill.

Referring now to FIG. 12, in an embodiment for tournament races of skill, the above-described protocols may be used. There are two kinds of races of skill, one where all players start at a designated time, and another where players start at different times with the game software 15 time-stamping or tracking the elapsed time to completion for a given game. Where all players start at a designated time, a start message BSTM for a particular tournament may be broadcast over a mass communication channel such as radio, television or the Internet at step 204. There may have already been a registration process for the tournament as generally depicted in FIG. 8A and described above. The start message BSTM is entered into the game computer 14 at step 206, which enables the game software 15 to make a race of skill available for play. The game is started at step 208, and the time/date module 33 is initiated, using signals from the clock 36. The time/date module 33 tracks the elapsed time during the race of skill played at step 210. The time/date module 33 may accept signals from a secure clock that resides within a token such as the aforementioned iPower card or TOUCH MEMORY device. When the player has completed the race of skill, the time/date module 33 calculates the total time elapsed at step 212. At step 214, the encryption/decryption module 28 generates an Authenticatable Timing Message ATM (analogous to the AOM) representing the elapsed time. The Authenticatable Timing Message ATM is communicated to the central computer 12, which then authenticates the Authenticatable Timing Message ATM. For added security, the central computer 12 may time-stamp the ATM and any play-related data with the time/date module 56. If the player's time to completion is certified, a ranking, rating, title is then generated at the central computer 12 using any of the above-described processes. In an embodiment where races of skill start at variable times for a given tournament, the central computer 12 does not have to time-stamp the Authenticatable Timing Message ATM when it is received. The start message BSTM is used to enable a particular tournament, but does not start the time running for the competition (there may still exist a fixed period of time over which the tournament will be in effect). Instead, the time/date module 33, using signals from the clock 36 (which preferably resides within a secure perimeter), tracks the elapsed time during the race of skill from the time that the player begins the game (at his or her leisure) as described above, and the authenticatable time message ATM itself represents the time to completion.

Figure 13:
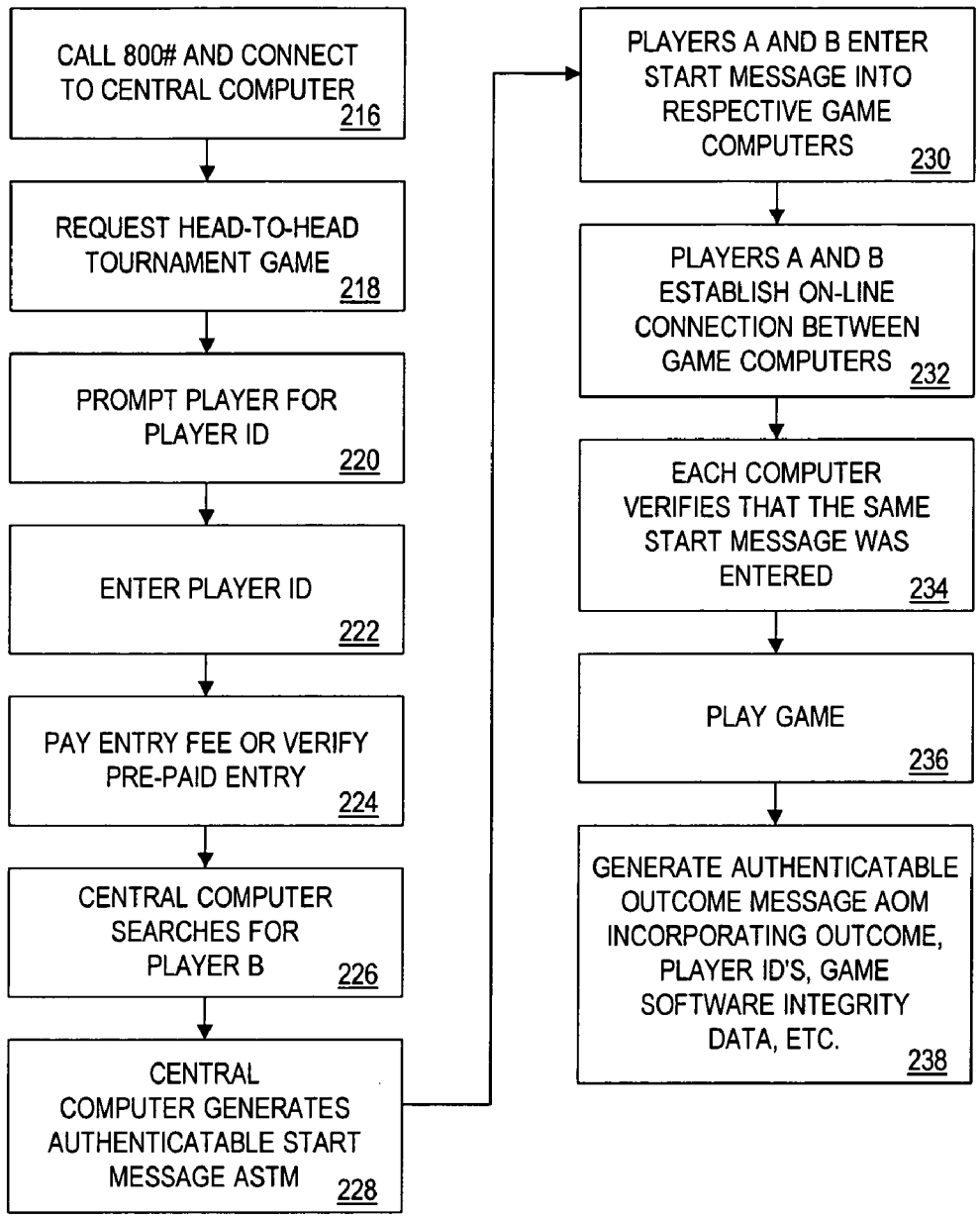
FIG. 13 is a flow-chart of an exemplary tournament sequence for head-to-head games.

Referring now to FIG. 13, there is depicted a flow-chart of an embodiment where players compete in a head-to-head tournament. This may occur in several ways. For illustration, the first player is identified as player "A" and the second as player "B." These players may compete against each other on a single game computer 14, or via an on-line connection between their respective game computers 14. If they play on the same game computer 14, the outcome of the game is simply incorporated into an Authenticatable Outcome Message AOM as described above. The player's respective PIN numbers may be included for identification purposes.

In an on-line head-to-head embodiment, at step 216, player A calls the 800# and connects to the central computer 12. The IVRU 16 provides an option for a head-to-head tournament game at step 218. Player A is prompted for his or her player ID at step 220, which is entered into the telephone 18 at step 222. Step 224 represents payment of an entry fee or verification of a pre-paid entry fee as described above with regard to the other embodiments. After fee payment is verified, the central computer 12 searches for another player at step 226, player B, who has requested entry in the same head-to-head tournament by completing steps 216-224. The central computer 12 then generates an Authenticatable Start Message ASTM based in part upon the player IDs for player A and player B at step 228. The Authenticatable Start Message ASTM is communicated to players A and B, and entered into their respective game computers 14 at step 230. One of the players then establishes an on-line connection to the other at step 232, and each game computer 14 verifies that the proper Authenticatable Start Message ASTM was entered at step 234. At step 236, players A and B proceed to play the game in accordance with conventional practice. It is known in the art to play many computer games in a head-to-head manner via an on-line connection. When the game is over, the game computer 14 of the winning player generates an Authenticatable Outcome Message AOM representing the outcome and the player IDs for players A and B, and the game software integrity information at step 238. The outcome submission process operates in essentially the same maimer as described above, but includes player win and loss data to enable players to continue to compete in further elimination rounds.

An entire tournament for a group of players may be held on a single game computer 14. In this connection, the game software 15 may have the capability to set up a tournament schedule for multiple head-to-head matches. Players purchase machine readable codes or messages that, when entered into the game computer 14, are employed by the game software 15 to direct the game computer 14 to set up the tournament. The tournament format may be "round robin," where each player plays everyone else in the group, a "Swiss system," where a limited number of rounds are established with the players having the best scores being matched against each other (i.e., an elimination protocol), or some other format well known in the art. All players competing in the tournament enter their name and player ID into the game computer 14. The game software 15 generates the tournament schedule, and after each head-to-head match, records the outcome. At the conclusion of the tournament, a winner is declared and the tournament standings are printed on the computer display. The final outcome of the tournament may be certified by the central computer 12 utilizing any of the above-described protocols. Alternatively, each head-to-head game outcome may be certified by the central computer 12 in the same fashion.

Computation of player ratings is implemented by the rating/ranking module 55 in the central computer 12 using known principles. Alternatively, ratings may be calculated on the player's game computer 14. These ratings are dependent upon past player and opponent performance and skill. For example, player "A" may have achieved 5 wins and 5 losses against relatively weak competitors, while player B has 3 wins and 20 losses against world-class competitors. This makes comparison between players difficult. The player's respective ratings take the relative skill of the competitors into account. Chess ratings are a good example. In accordance with well-known rating protocols, such as those developed by the statistician Dr. Arpad Elo, chess ratings range from 0 to 3000 with a mean of 1500. Every 200 points represent one standard deviation from the mean. Thus, a rating of 2100 represents three standard deviations above the mean. The larger the rating differential between the stronger player and the weaker player, the greater the probability of the stronger player winning the match. A player rated 200 points higher than another player, for example, may be expected to win 75 games out of 100, while a player rated 400 points higher than another may be expected to win 90 games out of 100. After each game, points are added to the winner's rating and subtracted from the loser's rating. The number of points won or lost is dependent upon the rating differential. Therefore, defeating a "weaker" player in lieu of a "better" player causes relatively fewer points to be added to the winner's rating. The present invention provides for generating ratings for players of computer games. The player's new rating is calculated after the outcome of the head-to-head game is certified. An exemplary rating formula may be characterized as follows: Winner's new rating =old rating+(x*rating difference)+y. If, for example, x=0.04 and y=16, and assuming a 2000 player beats a 1700 player, the 2000 player's new rating is computed as 2000+(04*(−300))+16=2004. The loser's rating becomes 1696. If a 1300 player beats a 1500 player, the 1300 player's new rating becomes 1300+(0.04*200)+16=1324. The loser's new rating becomes 1476. Thus, the greater the rating differential between players, the larger the rating changes after the games if the underdog wins. If the stronger player wins, his or her rating increases by a relatively smaller value. After new ratings are computed, the rating/ranking module directs the central computer 12 to update the player information database 48 and/or outcome database 50 to reflect the changes.

In any head to-head embodiment, it is possible to equalize the playing conditions for players of differing ability by utilizing player handicaps to generate game initialization variables that provide the lesser rated player of the game with more lives, more ammunition and the like, or conversely, which reduce the number of lives, ammunition and the like for the higher rated player. These initialization variables may be included in the start message as discussed above for tournament games. Alternatively, they may be obtained from the game computer 14 itself or a separate handicap device 217 (i.e., preferably a hand-held computer comprising a central processing unit, memory, display and power source). The handicap device 217 may store various titles corresponding to different levels of achievement in its memory. A MORTAL KOMBAT game may have players classified as one star, two star, three star and the like. If player "A" is a two star player and player "B" is a four star player, the handicap device 217 calculates an equivalent rating for each player based upon these player's classifications. A two star player may have an equivalent rating of 1200 while a four star player may have an equivalent rating of 1700. Using these values, the handicap device calculates a rating differential of 500 points (1700–1200), and queries a database for that game that contains various handicap values and their rating point equivalents. Where a 1900 player competes with a 1600 player, the 300 rating point differential, for example, may disable the ability of the stronger 1900 player to "throw his or her opponent" (the weaker 1600 player). Doubling the amount of damage produced by "kicks" from the weaker player may be equivalent to a 500 rating point differential (e.g., the stronger player is handicapped by allowing the weaker player to double the damage and associated score with each kick). The handicap device 217 generates and displays a machine readable code compatible with the game software 15 that directs the game program 26 to set up the game with non-symmetrically altered characteristics. The methodology for altering game programs with manually input codes is well known in the art. The GAME GENIE device discussed above, and the use of cheat codes are good examples. In the case of the present invention, however, a similar protocol may be used in a novel application to equalize playing conditions by non-symmetrically varying the game in accordance with the differential between player ability. It is also anticipated that codes for handicapping the games may be obtained from printed materials that accompany the game software 15. These materials may have charts with rating ranges, handicaps and their corresponding codes. Alternatively, the game software 15 may include a handicap program that functions in the same manner as the handicap device 217. In that case, the players simply enter their respective levels or even ratings into the game computer 14, and the game software 15 directs the game computer 14 to automatically equalize the playing conditions in the game pursuant to the associated player handicaps. Another way to equalize players of differing skill levels is to reduce the duration of the competition. Over the course of a dozen fights, the better player will almost always emerge victorious over the weaker player. Although he may lose a few fights, the better player will win the majority. If the competition is restricted to just one fight, the weaker player has a greater chance of winning.

Players may also be rated for games which are played not head-to-head, but against the game computer 14. In this regard, each computer opponent in the game software 15 is provided with a base-line rating. In MORTAL KOMBAT, for example, the computer opponent for the first level fight is relatively weak. As players win fights and proceed to higher levels, the opponents become increasingly powerful. Ratings can be assigned to each of these computer opponents. The first level opponent might be assigned a rating of 900, the second 1050 and the third 1300. These ratings may be determined in several different ways. In one embodiment, the computer opponents within the game software 15 are provided with arbitrary ratings. Players having known ratings from previous head-to-head competitions then play against these computer opponents. As a result of these matches, the ratings of the computer opponents within the game software 15 change in accordance with the rating formulas described above. The greater the number of matches played, the more accurate the ratings for the computer opponents. The player's Authenticatable Outcome Message AOM generated at the end of a match identifies which levels of the game were played and which opponents were defeated. Thus, the player's rating may be accurately calculated at the central computer 12 by taking the play related data into account. If, using the hypothetical software rating numbers in the above-identified example, the player's Authenticatable Outcome Message AOM contains information that the player managed to defeat the first two opponents, but lost to the third, the player's new rating is calculated taking into account the player's previous rating, and result against the game software's rated opponents. This is analogous to defeating a 900 rated player, defeating a 1050 player, and losing to a 1300 player. This procedure may also be implemented for games that do not have such quantifiable levels.

Ratings can also be assigned to overall measures of difficulty. In DONKEY KONG COUNTRY, for example, the game may have three difficulty levels such as beginner, intermediate and advanced. Finishing the game at the beginner level may add five (5) points to the player's rating, while completing the game at the intermediate level may add twenty-five (25) points to the player's rating.

In any of the above-described embodiments, players may register for tournaments in teams. These teams are identified by team IDs stored in memory area 96 of the player information database 48. The certified score (or time of completion for races of skill) for a particular team in any given tournament is an aggregation of the certified scores for all of the team members. Team standings, ratings and rankings are stored in the outcome database 50. Prizes may be awarded to members of the winning team. Players may also register as teams for league play, which is analogous to participation in a tournament.

While the foregoing descriptions refer to tournaments, the same protocol may be used to simply rank scores and/or to provide ratings for particular games. As with tournaments, the game software 15 may disable the cheat codes and scramble or randomize the predictable chain of events built in to the conventional program for a given game. The player calls the 800# listed to submit a particular score, and follows the sequence illustrated in FIG. 9, for example, except where the tournament ID is now just a game identifier. Thus, the player would not have to register in advance for a particular tournament. The player provides a game identifier and the Authenticatable Outcome Message AOM to enable the central computer 12 to certify the score and generate a player standing, rating and ranking. In a simpler embodiment, players may provide scores for a particular game to the central computer 12 anonymously, such that the central computer 12 just compiles a standing of the top X scores for the game. Players can then call in to obtain the top scores achieved to date for that game.

The foregoing protocols may also be employed to make predictions on future events, or for competitions such as fantasy baseball or fantasy football. For example, the game software 15 generates a schedule of all or part of the football games for the upcoming weekend or even the season. The player makes predictions as to which teams will win, including any point-spreads which are determined by the game software 15, manually entered into the game computer 14 by the player, or received from an external source, such as via an RF signal. The player's prediction may be converted to a hash value with a hash function, signed with the player's private key for authentication, and then encrypted with the central computer's public key to generate an Authenticatable Outcome Message AOM. The Authenticatable Outcome Message AOM is authenticated and time-stamped by the central computer 12 or by the game computer 14 with a secure clock 36. The encryption of the player's predictions enables an authentication of the predictions. The time-stamp by the central computer proves that the message was actually received at a particular time. After the events have transpired, the player provides the central computer with the actual predictions, which are compared to the actual outcomes of all the games. The central computer then recalculates the hash value of the player's predictions to verify the same. Each player's performance may be compared to that of other players in a tournament scenario (i.e., player A's predictions are 85% accurate, while player B's predictions are only 60% accurate).

The protocols described herein may be used to select wagering elements for future games of chance of which the outcome is uncertain such as a Lotto game. In this connection, the game computer may generate at least one set of Lotto choices for a given Lotto drawing. The player's selections are incorporated into an Authenticatable Outcome Message AOM which is time-stamped by a secure tamper-resistant clock, for example by the clock in an iPower card. In this manner, the central authority may authenticate the player's selections and verify that the player made those selections prior to the Lotto drawing. Thus, the player need not "register" or submit his or her choices prior to a drawing.

The authentication protocols described herein are readily adapted to games of chance including blackjack, craps, roulette, slots and the like. The use of cryptographic protocols to evidence tampering with game software prevents a player from cheating the system or repudiating play. A blackjack player, for example, might pay the central authority a given fee for blackjack software that, when executed on the game computer 14, enables the player to play a number of potential hands. The final outcome of this play is incorporated into an Authenticatable Outcome Message AOM that is submitted to the central computer 12. If the central computer 12 certifies the outcome, the player is paid any winnings, either directly or, if a wagering account exists a credit may be made thereto.

The foregoing description as applied to game outcomes is equally adapted to tests taken on a testing computer 14. A test outcome may be authenticated as having been achieved on that testing computer 14 by following the same protocols. Generating the test questions on the game computer 14 is analogous to generating a game, and the test taker's answers to those questions (i.e., the outcome) is analogous to a game outcome. In addition, tests can be presented with their questions in a random fashion. Similarly, test takers may be ranked and rated by their scores in the same fashion.

Referring again to FIG. 1B, there is depicted a schematic and flow-chart of another embodiment of the invention wherein each game computer 14 is capable of self-authenticating its own outcome. In this connection, the game computer 14 may be capable of printing an outcome accompanied by the words "certified." What this means is that the outcome of that game is capable of being verified as accurately reported and fairly achieved by the game computer 14 itself. For example, after the conclusion of the game, the game computer 14 generates the Authenticatable Outcome Message AOM that constitutes the outcome of the game and a software tamper indication such as the digital signature of the game software as described above. The private or secret key, such as the SSCID, used for generating the Authenticatable Outcome Message AOM provides for uniquely associating the outcome with that game computer 14. It also enables the Authenticatable Outcome Message AOM to be subsequently verified by authenticating the AOM with the public key of a private key/public key pair, associated with the encryption/decryption module 28. If the tamper indicator such as the software hash value is publicly known, for example placed on the outside of the game cartridge (whether or not the hash function is secret), then when the Authenticatable Outcome Message AOM is authenticated, the integrity of the game software 15 can be verified by the digital signature. For example, if the hash value incorporated into the Authenticatable Outcome Message AOM matches the known hash value for that game software 15, there has been no tampering with the game software 15 and the associated outcome is certified as having been accurately reported and fairly achieved. Thus, a player who seeks to prove that his or her score is indeed certified, need only enter the Authenticatable Outcome Message AOM into the game computer 14, which reads and authenticates the Authenticatable Outcome Message AOM in accordance with the protocols described above with regard to the central computer 12.

The system also allows for mutual-authentication for an outcome from one game computer 14 to take place on any other game computer 14. As described above, if the Authenticatable Outcome Message AOM was generated with a secret or private key, a player seeking to authenticate that outcome on another game computer 14 must obtain the public key associated with the public key/private key pair. In this regard, a list of public keys may be stored on a database at the central computer 12 or with a dedicated Key Distribution Center. The other game computer 14 uses the public key to authenticate the Authenticatable Outcome Message AOM using the same protocol described above. Thus, the person seeking to authenticate the outcome simply calls the 800# and obtains the public key for the player alleging to have the outcome represented in his or her Authenticatable Outcome Message AOM. If the secure CPU 302 within the secure perimeter 300 is considered to be another "computer," the practice of certifying an outcome on the same game computer 14 that utilizes a secure CPU 302 to perform all encryption/decryption and/or authentication procedures, falls within the definition of mutual-authentication.

Referring now to FIGS. 14-28, another aspect of the invention facilitates "pay-per-use" in the home video game environment. This implementation confers several advantages. It, enables any game computer 14 to be turned into a video game arcade machine. Players simply pay per game, or for play over a specified period of time. It also allows for specialized game computers 14 (game consoles) to be, in effect, "leased" to players. This has significant commercial implications, as many of the newer game consoles 14 have relatively high acquisition costs. This "time-dependent disablement" aspect of the invention permits players to acquire such game consoles 14 for a relatively low down payment. Charges for game play may then be incurred on a daily, weekly, monthly, or some other periodic basis. There are several embodiments of this aspect of the invention as described hereinafter.

In a preferred embodiment, the pay-per-use metering system utilizes cryptographic protocols to facilitate secure operation. The preferred method whereby unauthorized use of metered software is prevented employs encryption of part or all of the subject program. This program may be considered to be either the operating system that runs the game computer 14 (if use of the game computer 14 itself is to be metered), or any particular game program 26. A game program 26 will typically reside in an insecure data source such as a game cartridge, CD-ROM, hard disk, or the like. An operating system program 702 may reside in an insecure data source such as ROM and/or a hard disk associated with the game computer 14. The insecure data source is designated generally by the reference numeral 704.

Figure 14:
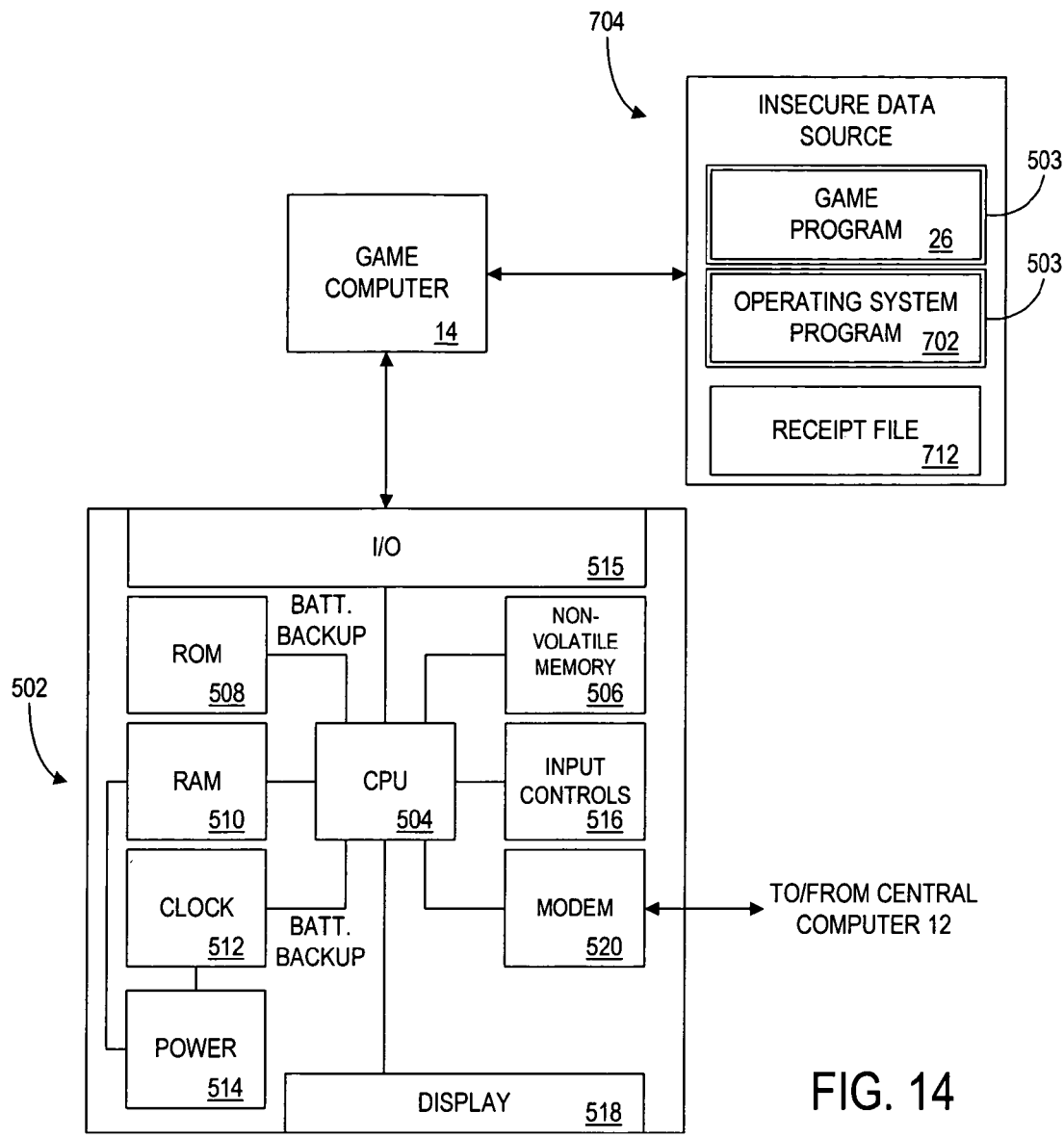
FIG. 14 is a schematic of a meter for enabling pay-per-use game play in accordance with the present invention.

The metering functions are implemented by a secure device having a secure perimeter. As described above, the secure perimeter is a defined physical area of hardware which is tamper-resistant and/or tamper evident. In this particular application, the secure device is referred to as a "meter" 502. As shown in FIG. 14, the meter 502 is a computer itself, and communicates with the game computer 14 to meter use/operation of a particular game program 26 or the game computer 14 itself via the operating system program. These types of programs are collectively referred to hereinafter as "metered programs 503", except where necessary to differentiate between them. In the inventive system, the secure portions of metered programs 503 from the insecure data source 704 are decrypted and executed on the meter 502.

The meter 502, can be configured as part of the internal structure of the game computer 14, disposed on, for example, the motherboard, an expansion slot or the like. The meter 502 can be incorporated into a PCMCIA card such as the iPower card described above. Alternatively, the meter 502 can simply be a separate box that communicates with the game computer 14 via a data cable. Interfacing between the meter 502 and the CPU 27 of the game computer 14 can be implemented in a conventional fashion. The meter 502 includes a secure CPU 504, some non-volatile memory 506 such as a hard disk or flash ROM, ROM 508, RAM 510, a real-time clock chip 512, and a power source with battery backup 514. The meter 502 further includes an I/O port 515 for attaching a data communications cable to the game computer 14. In accordance with known techniques, the pins of the I/O port 515 can be electrically isolated to prevent pin-level probes. Similarly, the hardware components can be made with mechanical and chemical protection to prevent chip-probing equipment from accessing information from the secure CPU 504 directly. The non-volatile memory 506 may be used to store program instructions for implementing the overall metering functions. The ROM 508 contains encryption algorithms. The RAM 510 contains the cryptographic data and keys required to decrypt the secure portion of the metered program 503 to enable it to run, and for generating authenticatable messages that are communicated to the central computer 12 in connection with the metering functions, or game outcome authentication. If the meter 502 is tampered with, the encryption keys and data in the RAM 510 are erased from memory.

If the meter 502 is a separate unit, it can have input controls 516 to permit the player to manually enter codes directly into the meter 502 for authorizing metered software/game computer usage as described in more detail below. The meter 502 can also be configured with a display 518 to enable assorted information to be displayed to the player, including specifics relating to metered usage such as costs, authorized time periods, messages representing information to be provided to the central computer 12 for authorization to run metered programs and/or Authenticatable Outcome Messages AOMs for games played on the game computer 14 that are manually entered into a telephone for communication over a telephone network as described above. To facilitate communications directly between the meter 502 and the central computer 12, the meter 502 may have its own modem 520. Alternatively, the meter 502 can communicate with the central computer 12 via the modem 20 associated with the game computer 14.

Generally, each metered program 503 is encrypted using a key unique to that program. Alternatively, a single key may be used to encrypt a large number of metered programs 503, but such practice increases the security risk, since knowledge of that key (if it were somehow compromised) could render an entire set of metered programs 503 which use it insecure. Therefore, it is anticipated that in most cases each metered program 503 is to be encrypted with a unique key. In order to run such a metered program 503, therefore, it is necessary for the metering system to acquire the key for that metered program 503. This step can be made part of an "Adding a New Program" protocol to be described in more detail below. At the same time, it may be convenient to acquire an updated cost table including information for the new metered program 503, in systems implementing variable costs. In this manner, the most current cost information will be available for running the new metered program 503. In some instances where it is desirable to have the convenience of running a metered program 503 for the first time without having to interact with the central computer 12, the meter 502 must already have a key for that metered program 503. This may be facilitated by having all such metered programs 503 encrypted with the same key, where that key is incorporated into all meters 502 in the system during initialization thereof. Security of the system can be further enhanced by using several different keys for the metered programs 503, with key selection based upon the Software-ID, a unique ID associated with each metered program 503 (discussed in more detail below). In this manner, the keys are equally shared across all such immediately-runable metered programs 503, reducing the value of each individual key of this type.

In the inventive system, the metered programs 503 are classified as either of two types: "immediately-runable" (and hence encrypted using one of the shared keys); or requiring interaction with the central computer 12 prior to the first time of execution on the game computer 14. In the case of the latter, the metered program 503 is encrypted with a unique key. The immediately-runable metered programs 503 utilize inherent cost information that comes from the insecure data source 704 (at least during the first billing period).

Encryption

All messages between the central computer 12 and the meter 502 are encrypted and authenticated. As discussed in the foregoing with regard to outcome authentication, among the various protocols, public-key or symmetric encryption can be used, although symmetric encryption appears to provide sufficient security for most of the protocols. Such encryption may utilize key sizes in the range of 64 to 128 bits. Examples include DES, 3DES, or IDEA. Public key encryption most commonly employs RSA. After initialization, the central computer 12 and the meter 502 share SK_Meter, which can be used with a conventional encryption system to provide for both encryption and authentication. Because the meter 502 has limited access to sources of entropy, and because the total volume of data to be communicated between meter 502 and central computer 12 is small, a few hundred bytes per month in typical usage, using SK-Meter as the key for all communications between the two systems should provide adequate security for this application. In this configuration, messages from the meter 502 are preceded by sending ID_Meter (a unique identifier specific to the meter 502 and burned into its ROM 508 during manufacture) in the clear, allowing the central computer 12 to look up the encryption key used, followed by the message itself encrypted with SK_Meter. Responses from the central computer 12 are encrypted with SK_Meter for transmission to the meter 502.

All communications between the central computer 12 and meter 502 are initiated by the meter 502, with the central computer 12 acting as a server. As described in more detail below, it is expected that the player will actually initiate such communications rather than having the meter 502 spontaneously issue requests. Messages sent by the meter 502 may include a sequence number which will increment each time a message is sent in that direction. Reply messages from the central computer 12 include that same sequence number. This allows both sides to detect message replay attacks, in which messages are captured and then replayed at a later time in order to disrupt the protocols. The packet formats shown below do not include encryption headers or the account and sequence numbers, which are included as described above except where indicated. Each packet begins with a unique identifier value describing the kind of packet it is, and is followed by data as described below.

The following is a summary of data associated with the meter 502, and with each metered program 503:

Meter Keys:

The meter 502 utilizes a plurality of cryptographic keys to implement its functions, including secure communication with the central computer 12. As described above, these keys are of generally of three types: "secret" keys such as those used with conventional cryptographic protocols (e.g., DES); and "private" keys and "public" keys that are used with public key cryptographic protocols(e.g., RSA):

SK_Meter: The meter 502's secret key, also known to the central computer 12. This key enables secret and authenticated communication between the central computer 12 and the meter 502, possibly via in insecure communications link (a typical data network). This key is also employed by the meter 502 to create secure files out of insecure non-volatile storage associated with the game computer 14, by signing the data in the files using this key. SK_Meter is generated by the meter 502 during initialization, and is then transmitted to the central computer 12 and secured with PK_CC.

PRK_Meter: The meter's private key.

PBK_Meter: The meter's public key.

PK_CC: The central computer 12's public key, known to the meter 502. This key is used for initial communications between the meter 502 and the central computer 12 prior to creation of SK_Meter, and is burned into ROM 508 during manufacture.

SK_Imm_Run: The secret key for immediately-runable metered programs 503. As described above, it may be desirable to support metered programs 503 that can be run immediately upon acquisition, without running the Adding a New Program protocol described below. In this connection, the meter 502 must already have the key for this type of metered program 503. Accordingly, all such metered programs 503 share a special Software-ID, and the meter 502 recognizes that ID and uses the SK_Imm_Run key to decrypt a secure portion of the metered program 503, as described below in the Using Metered Software protocol. As described above, a variation on this defines several Software_ID's of the immediately-runable class, each of which is associated with a different SK_Imm_Run key.

ID_Meter: An identification number unique to each meter 502, burned into its ROM 508 during manufacture.

Account_Number: A number associated with the player who is responsible for payment for metered programs 503 that are operably enabled by the meter 502. This is the identifier which the central computer billing service uses to identify the player.

PIN: The player's personal identification number.

Limit_Time: A time/date value specifying the time limit beyond which metered programs 503 cannot run until receipt by the meter 502 of an authorization message from the central computer 12 for an additional amount of time.

Software_Key_Table: A list of Software_ID, Software Key pairs. Each contains the key required to decrypt the encrypted portion of the metered program 503 with the specified Software_ID.

Meter Variables (if the Meter 502 Calculates Costs):

Limit_Cost: If the meter 502 calculates costs associated with use of the metered program 503, a cost value specifying the maximum billable amount which can be accumulated during the current billing period, above which metered programs 503 cannot be run until receipt by the meter 502 of an authorization message from the central computer 12 for additional credit.

Total_Cost: The total amount of charges during the current billing period.

Cost_Table: Format to be described below.

Meter Variables (if the Central Computer 12 Calculates Costs):

Use_Count_Table: A list of Software_ID, Use_Count pairs, recording the number of times each metered program 503 or feature of a program was used during the current billing period. Software-ID's will be described below.

Use_Time_Table: A list of Software_ID, Use_Time pairs, recording the total amount of time each software package was used during the current billing period.

Figure 15:
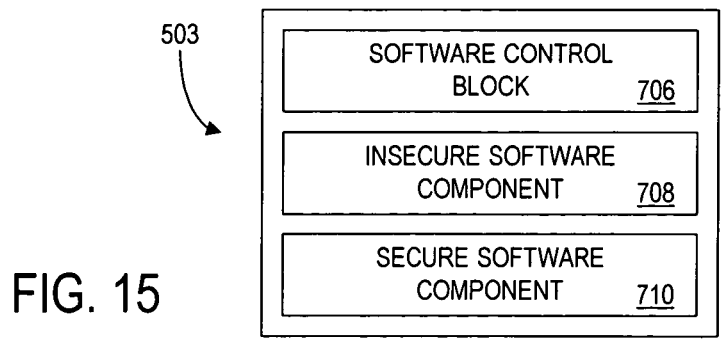
FIG. 15 is a schematic of metered software for use in a pay-per-use embodiment.
Figure 16:
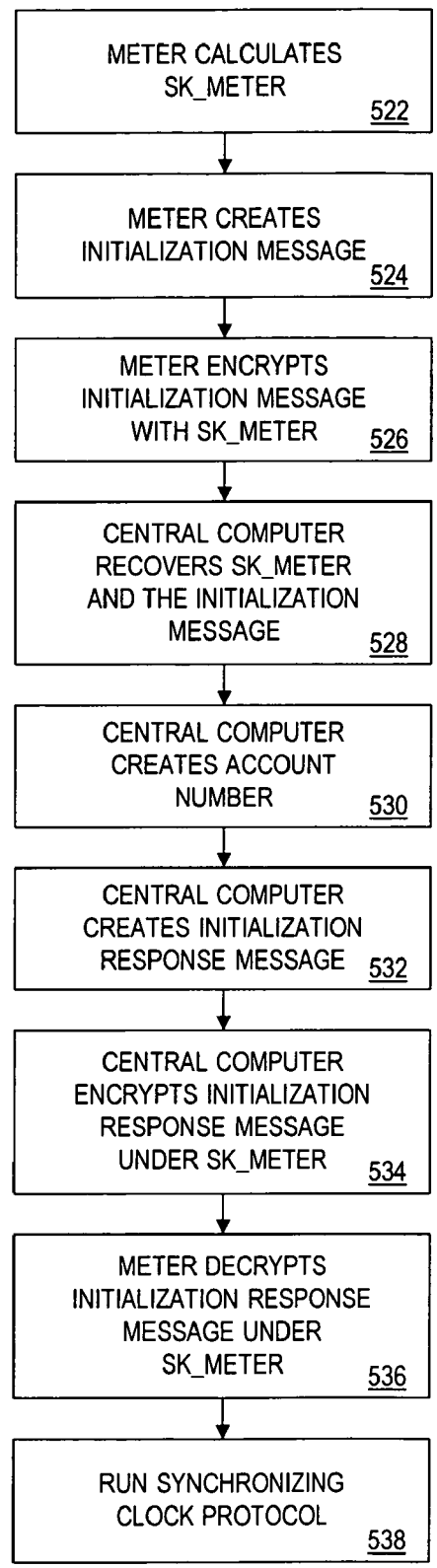
FIG. 16 is a flow chart of an initialization protocol for the meter.
Figure 17:
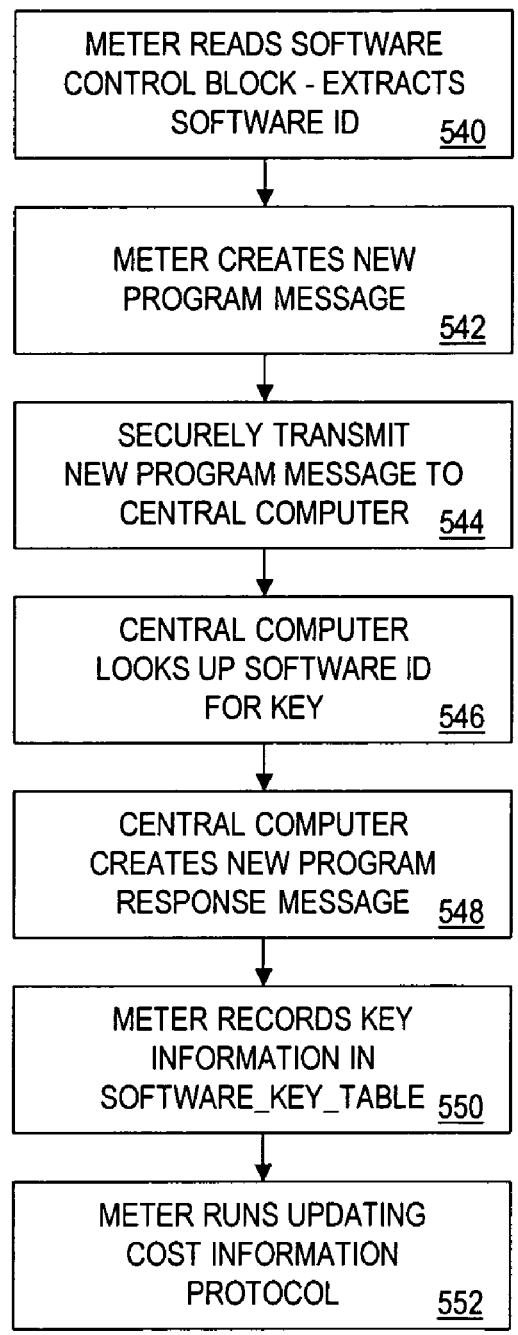
FIG. 17 is a flow chart of an adding a new program protocol for the meter.
Figure 18:
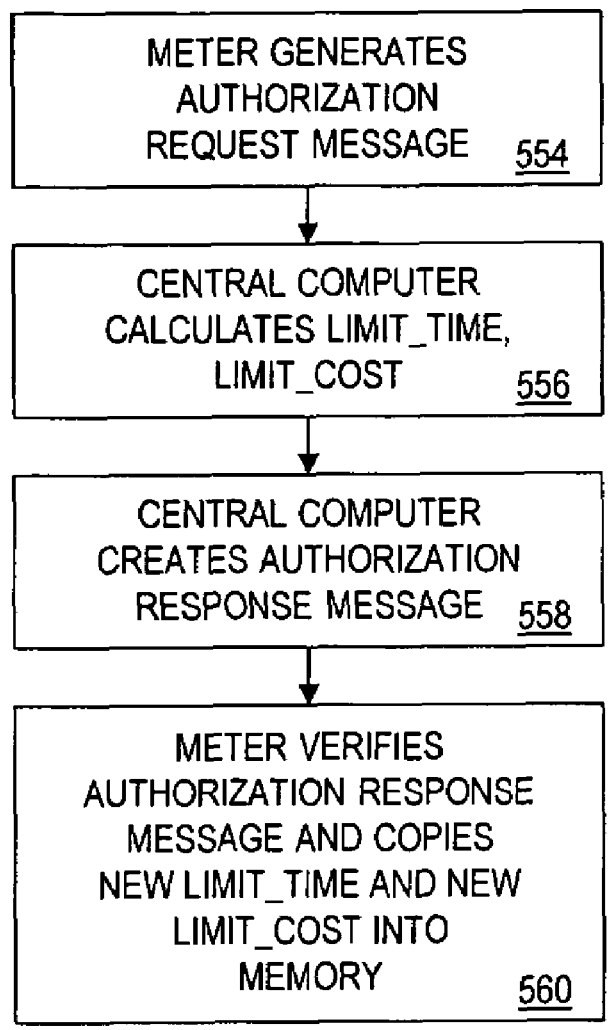
FIG. 18 is a flow chart of an authorization from the central computer protocol for the meter.
Figure 19:
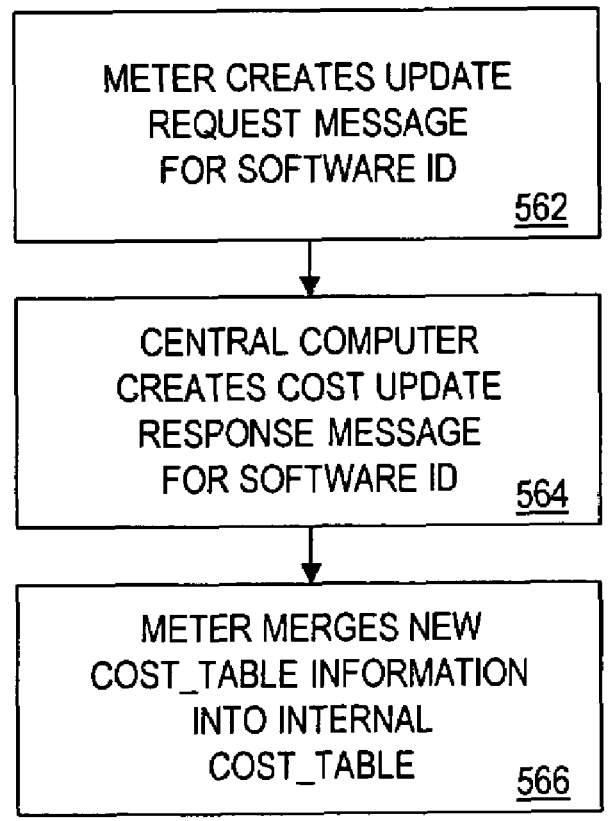
FIG. 19 is a flow chart of an updating cost information protocol for the meter.
Figure 20:
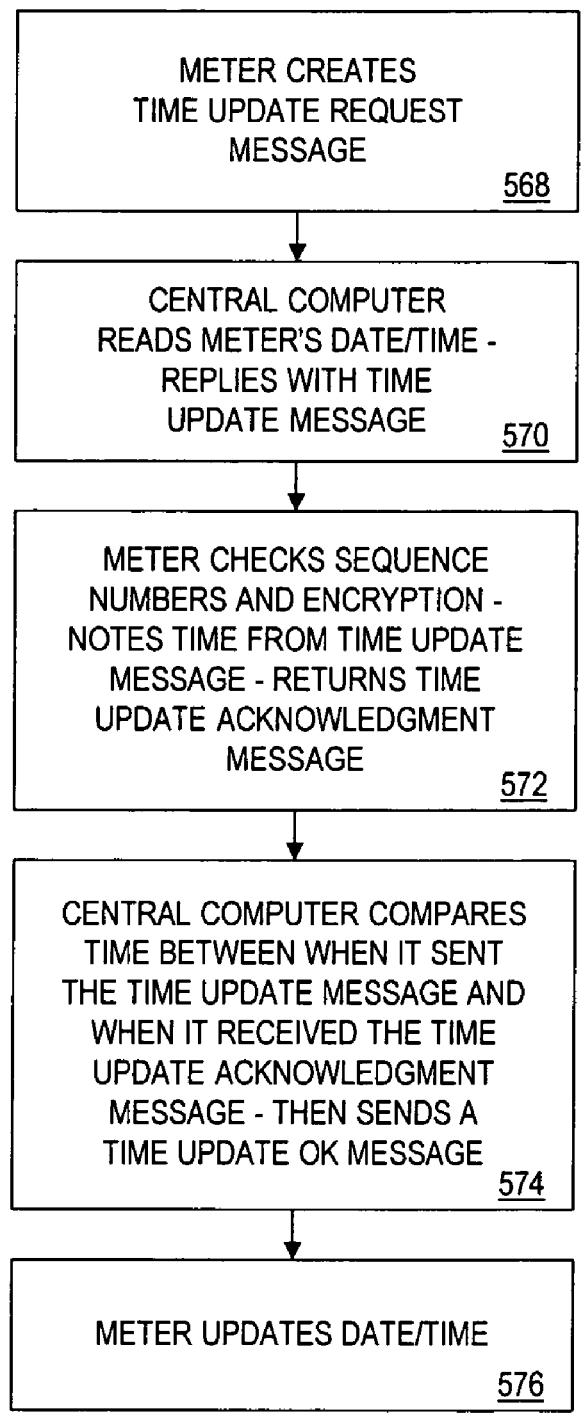
FIG. 20 is a flow chart of a synchronizing clock protocol for the meter.
Figure 21:
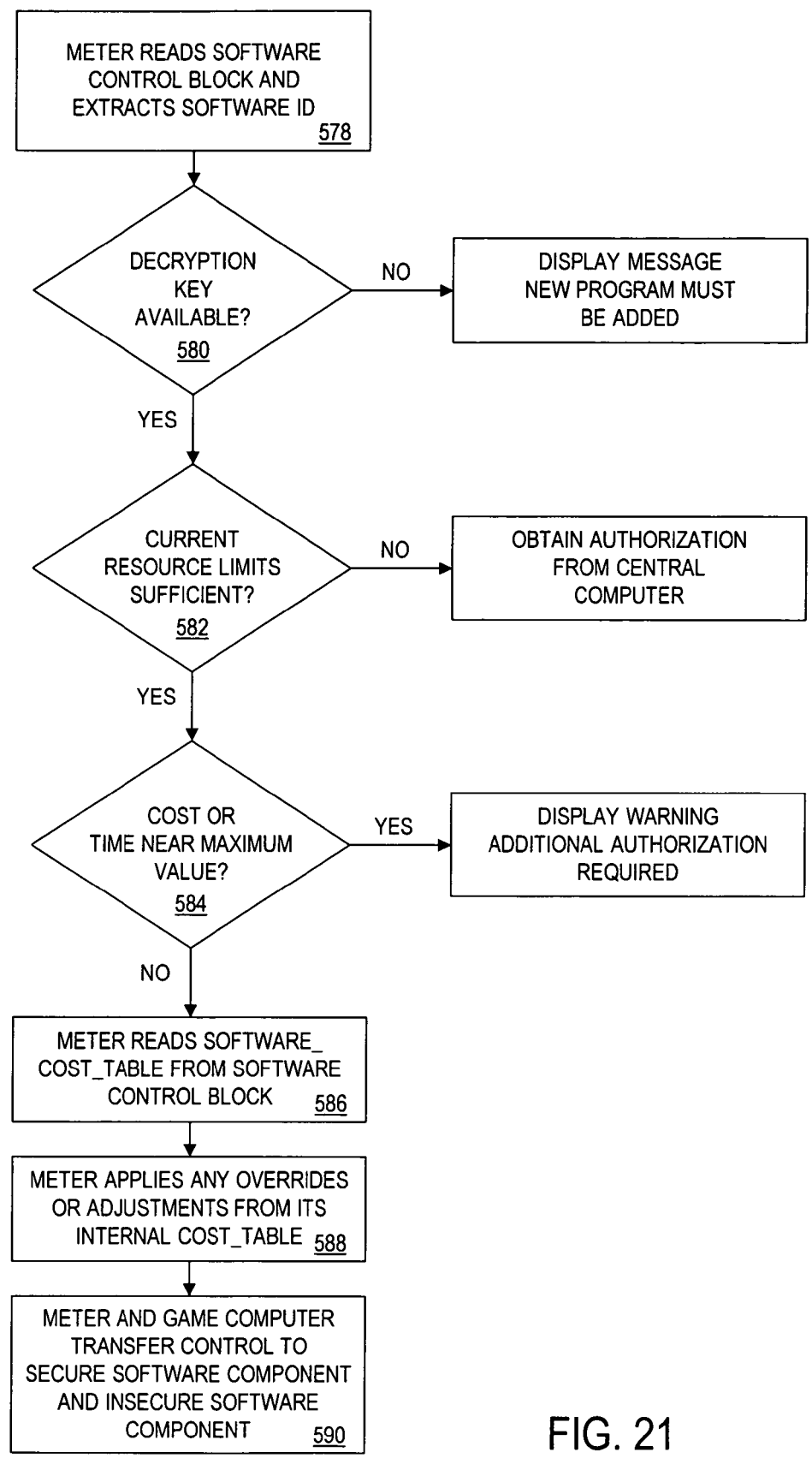
FIG. 21 is a flow chart of a starting metered software protocol for the meter.
Figure 22:
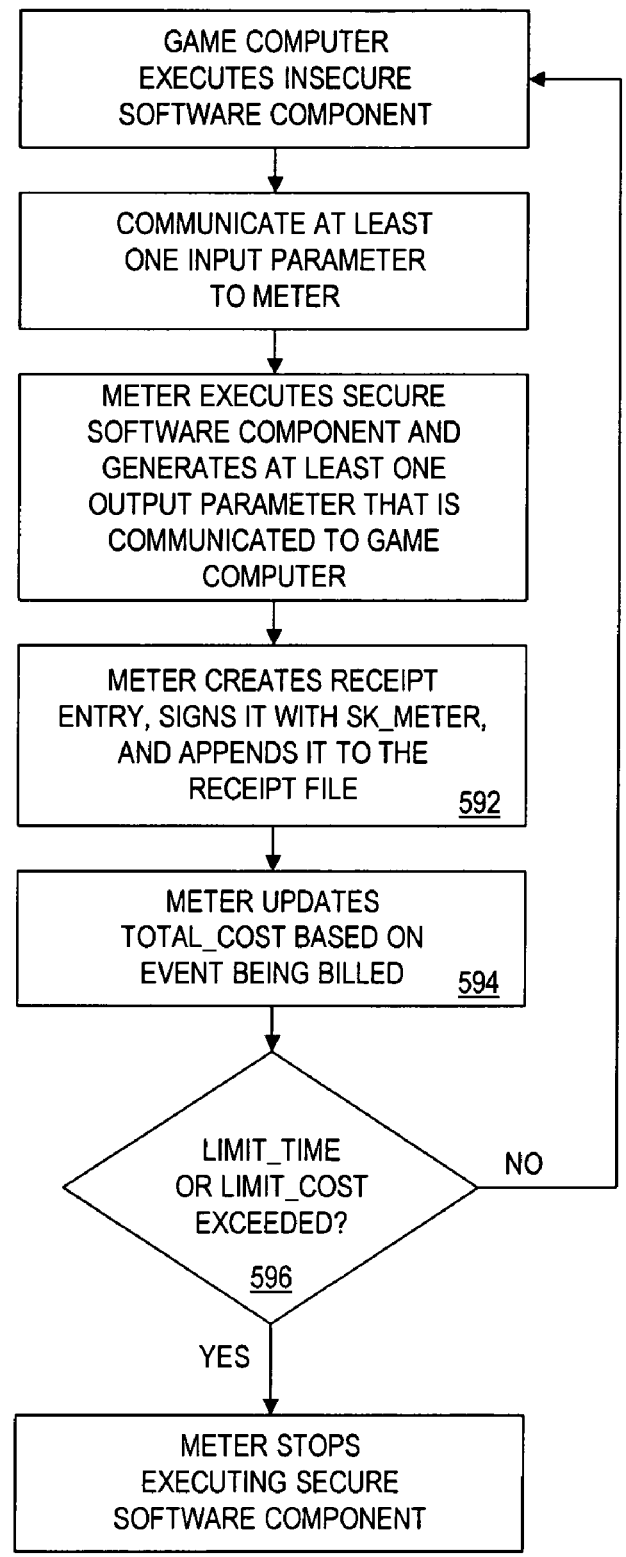
FIG. 22 is a flow chart of a running metered software protocol for the meter.
Figure 23:
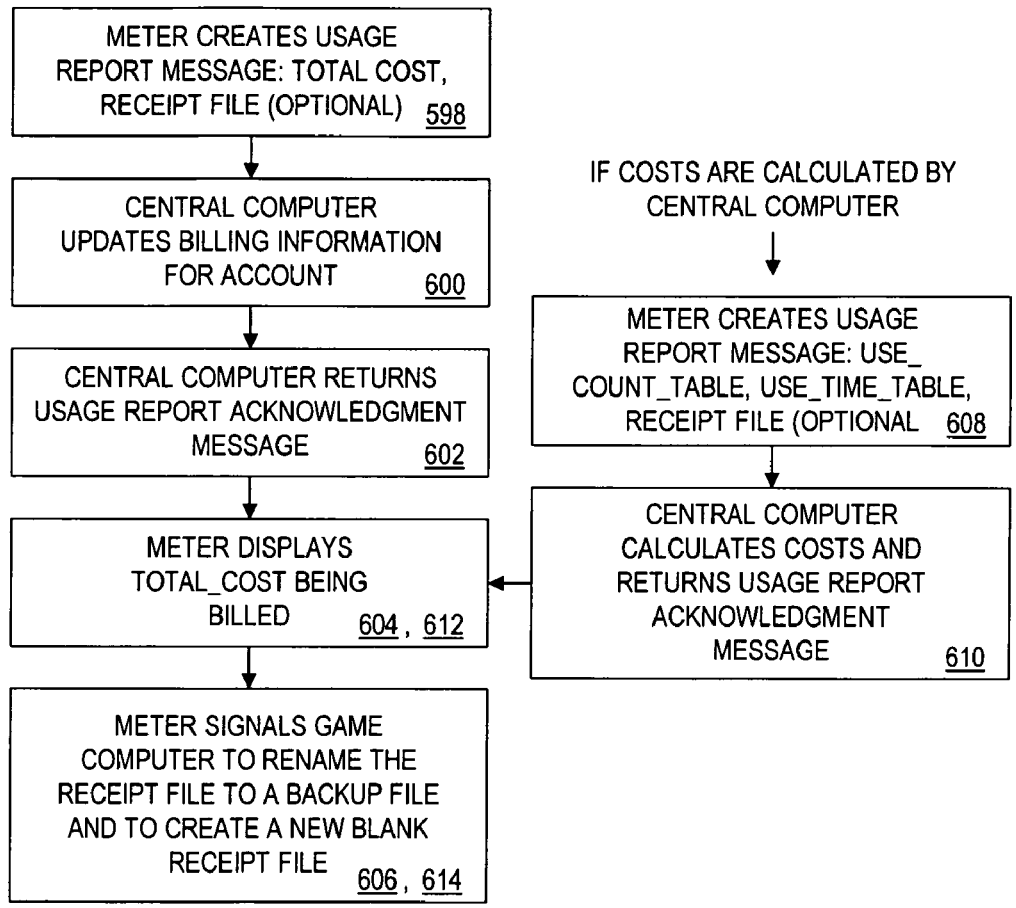
FIG. 23 is a flow chart of a reporting usage protocol for the meter.
Figure 24:
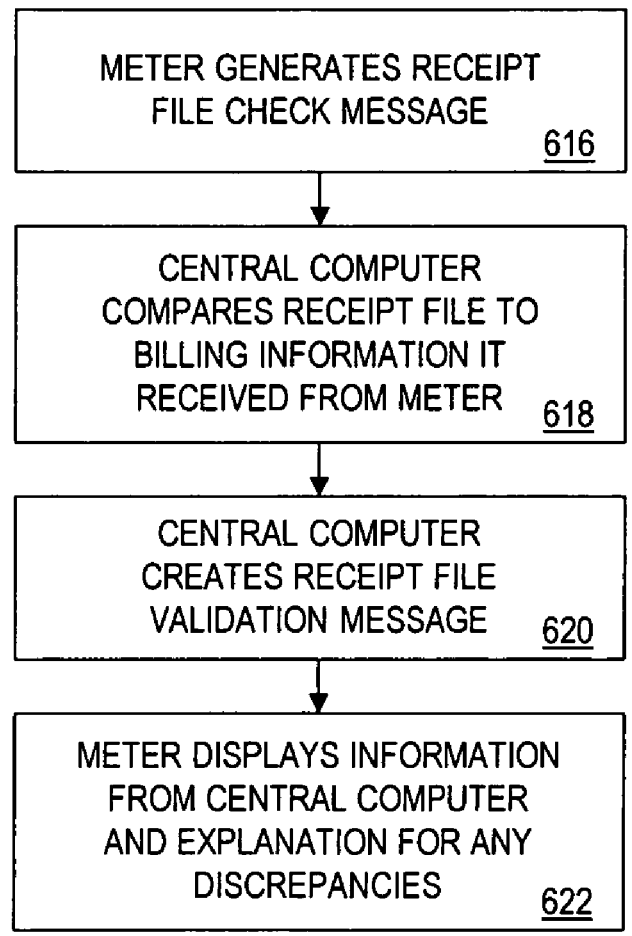
FIG. 24 is a flow chart of an auditing protocol relating to pay-per-use.
Figure 25:
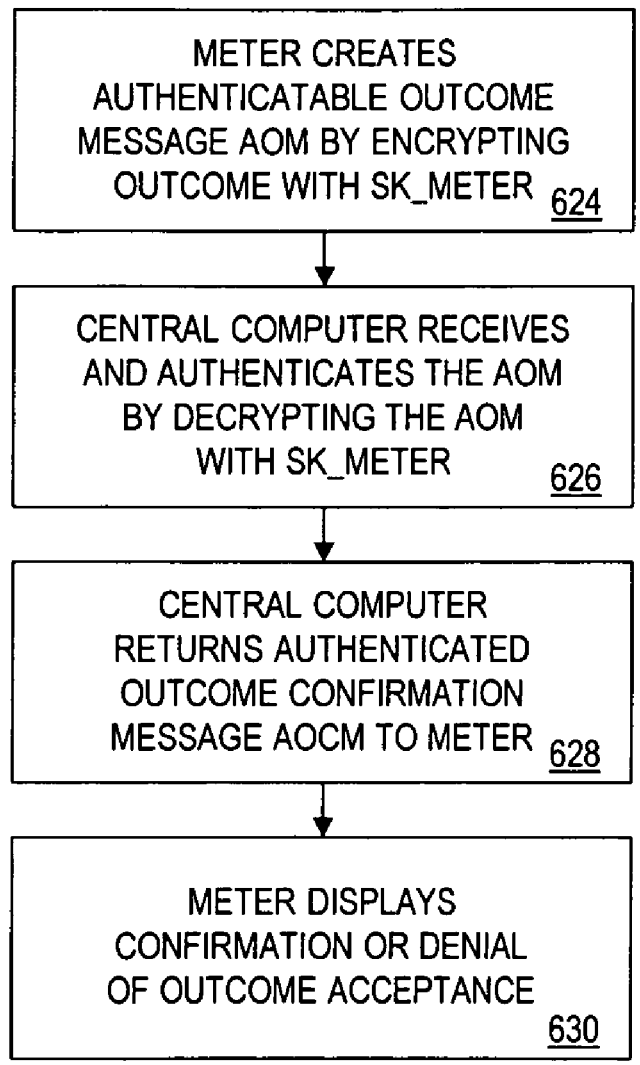
FIG. 25 is a flow chart of an outcome authentication protocol using the meter.

Software from Insecure Data Source:

In the illustrative embodiment shown in FIG. 15, each metered program 503 from the insecure data source 704 is divided into three parts: a Software Control Block 706, an Insecure Software Component 708 and a Secure Software Component 710. The Software Control Block 706 contains software specific information that identifies metered program 503 to the meter 502 to enable the latter to calculate billing costs. The executable software itself occupies the two remaining parts, where the Secure Software Component 710 is configured to run securely on the meter 502, and the Insecure Software Component 708 is designed to run in the insecure environment of the game computer 14.

Software Control Block 706: Information about the software which will be used by the metering system to run it. The Software Control Block 706 is signed with the private key of the central computer 12, and the meter 502 verifies that signature when the software is loaded. Software Control Block 706 fields include:

Software_ID: a unique number identifying the particular metered program 503. Each metered program 503 and revision thereof has a unique Software_ID. There are two general kinds of Software_ID's, "program" and "component", distinguishable by their high order bits. Program Software_ID's are used for metered programs 503 which do not charge per feature, while Component Software_ID's refer to specific features of a metered program 503 and allow charging to be incurred on the basis of those features. Component Software_ID's may include two fields, a "major" and a "minor" ID component. The Software_ID Major field identifies the metered program 503, and the Software_ID Minor field identifies the particular chargeable feature of the metered program 503.

Software_Cost: This is the "base" cost information for this software component, in the form of a cost table (cost table formats are described below). Systems which do not support variable costs will use the cost information from this table directly; those which support variable costs may have received override information from the central computer 12.

Insecure Software Component 708: The bulk of the metered program 503 that is executed by the game computer 14. It may be stored in encrypted form in the insecure data source 704, in which case the meter 502 decrypts it prior to being loaded into the RAM of the game computer 14. If this decryption step will add unacceptable delay to program loading, the Insecure Software Component 708 can be stored unencrypted at only a slight loss of security. Since the memory of the game computer 14 is (by definition) insecure, a determined attacker can gain access to the plaintext of the Insecure Software Component 708 in any case. Accordingly, the additional security added by storing it in secure form is limited in value.

Secure Software Component 710: The Secure Software Component 710 is embodied in encrypted format in the insecure data source 704, and must be loaded into and decrypted by the meter 502 when the rest of the metered program 503 is loaded into the RAM of the game computer 14. The Software Control Block 706 may also be loaded into the meter 502 at this time to facilitate charging for use of the metered program 503. As will be described below, execution of the Secure Software Component 710 in the meter 502 implements selected but crucial functional operations on which the larger body of software in the Insecure Software Component 708 depends. The Secure Software Component 710 includes a secure routine that receives at least one input parameter from the game computer 14 when the Insecure Software Component 708 is executed. The secure routine is executed on the meter 502 to produce at least one output parameter. The at least one output parameter is communicated back to the game computer 14 from the meter 502, and the Insecure Software Component 708 is then executed on the game computer 14 with the at least one output parameter. For example, a game program 26 that directs the game computer 14 to generate a golf game, may include a secure routine comprised of instructions that direct the meter 502 to compute a resultant ball position in response to a plurality of input parameters. The input parameters to this routine may be the current ball location; type of club selected; force, direction and timing of the swing; and wind speed and direction. These input parameters are communicated from the CPU 27 of the game computer 14 to the meter 502 at the appropriate time. The secure routine is then executed on the Meter 502 to produce at least one output parameter, in this instance, a new ball position. This output parameter is then communicated back to the game computer CPU 27 and utilized by the Insecure Software Component 708 to display the new ball position in accordance with conventional practice. Thus, the game program 26 cannot be completely executed on the game computer 14 without receiving the required output parameters from the meter 502. Of particular significance, the instructions that make up the secure routine never reside in unencrypted form outside the meter 502. Only the result produced by executing such instructions in the meter 502 is returned to the RAM of the game computer 14. This prevents a player from reading the unencrypted instructions in the RAM of the game computer 14, and then using those unencrypted instructions to replace the encrypted instructions stored in the insecure data source 704 to circumvent the meter 502. Thus, encrypting the Secure Software Component 710 and executing the secure routine therein on the meter 502 is the mechanism by which the overall security of the system is maintained. It prevents attackers from deducing and replacing the functionality of this software component in order to circumvent the system and execute metered software without paying for it. The meter 502 enables operation of such metered programs 503 until the Limit_Time or Limit_Cost is reached.

The foregoing arrangement may be used to meter use of the game computer 14. When the game computer 14 is turned on, the Secure Software Component 710 of the operating system program 26 is loaded into the meter and decrypted. In order to run the game computer 14, the Insecure Software Component 708 of the operating system program in the game computer 14 must receive at least one output parameter from execution of the secure routine in the Secure Software Component 710 in the meter 502 that is essential to proper functioning of the complete operating system program. Without receiving the required at least one output parameter, the game computer 14 cannot execute any programs. The at least one output parameter from the meter 502 may be required at specific times during the operation of the game computer 14. When the Limit_Time or Limit_Cost for metered usage is reached, the meter 502 disables operation of the game computer 14 by no longer providing the at least one output parameter crucial to the Insecure Software Component 708 of the operating system on the game computer 14 the next time it is required. Since the system may be designed such that the at least one output parameter from the meter 502 is required by the game computer operating system program at very short time intervals, the time delay between the meter 502 ascertaining that metered usage is to be suspended and the actual suspension of game computer operation by not providing the requisite at least one output parameter from the meter 502 the next time it is required, is effectively so small such that, for all practical purposes, operation of the game computer 14 is suspended immediately after the cost, or time limit is exceeded.

In an alternative embodiment, the Meter 502 has the Secure Software Component 710 for any game program 26 or an operating system program permanently stored in its own secure memory instead of the insecure data source 704. Thus, the Secure Software Component 710 need not be encrypted since players cannot gain access to such software instructions. Security is provided by the tamper-resistant meter configuration. As described above, attempts to tamper with the secure memory to read the Secure Software Component 710 result in a memory loss of the Secure Software Component 710. Depending upon the configuration of the meter 502, the secure memory can be adapted to store a plurality of Secure Software Components 710, each for a different metered game program 26 or operating system program, or a generic Secure Software Component 710 which can be used with a plurality of game programs 26 or operating system programs.

Cost Tables:

The cost table data structure is used by the Software_Cost element of the Software Control Block 706 to enable charges to be made for the base costs of software, and is also stored by the meter 502 in non-volatile memory for systems which support variable costs. It is a list of Cost_Table_Elements, of the following format:

Software_ID
Charging_Method
Charge_Per_Use
Charge_Per_Time
Override
Base
Multiplicative
Replacement
Charge_Value
Per-Minute or Per_Use.

Each cost element relates to a particular Software_ID. If it is a "program" Software_ID, the cost table element refers to billing for the program itself, either on a per-minute or per-use basis. If it is a "component" Software_ID, the cost table corresponds to a cost for using that particular feature or component of the software (i.e., the charge for execution of a game program may relate to certain "features" of the game that are implemented as a result of game play, such as for example, reaching a certain level or expending a given number of lives and the like). Typically this may be on a per-use basis, but in some cases special charges might apply on a per minute basis when certain components or features are used, such as when the player engages a particular enemy or uses specific weapons at his disposal.

The Charging_Method is one of the two identifiers Charge_Per_Use or Charge_Per_Time to indicate which form of charging is to be applied when the Software_ID is used.

The Override field indicates how this charge table element is to be combined with other cost tables, if they exist. If it has the value "Base" that means that this is a base cost table element, usually associated with the Software Control Block 706 in the insecure data source 704. If there are no other charge table elements for this Software_ID then this element's cost data will be used. The other two possible values are used for cost tables which are downloaded by the central computer 12 to change the cost values stored in the insecure data source 704. "Replacement" means that this cost table element overrides and replaces any base cost table element from the insecure data source 704. "Multiplicative" means that the cost values are fixed-point numbers which multiply the cost values from the Base cost table and adjust them.

Lastly, the Charge_Value is represented in units that are implementation-dependent and country-dependent, but which refer to each use or each minute of use of the feature, for the Base and Replacement Override values. For the Multiplicative case the Charge_Value is a fractional value as described above which multiplies the Base cost value.

Receipt File:

If insecure non-volatile memory (e.g., a disk drive) is associated with the game computer 14, then some of this memory can be used to record detailed information about the billing activity during a billing period. This information is referred to as a Receipt File 712, and contains a series of receipt entries, each of which reflects some billing action. Although the Receipt File 712 is stored in insecure memory, the file entries are signed by the meter 502 to ensure their integrity and accuracy. The Receipt File 712 provides detailed information to the player about his billings, and also can be used to aid in dispute resolution where the player claims that his bill from the central computer 12 does not match his usage.

Meter Game/Computer Interface:

As described above, the Insecure and Secure Software Components jointly implement the functionality of the metered program 503. The bulk of the metered program 503 is the Insecure Component, but it makes use of the Secure Component that is decrypted and executed on the meter 502 to implement the metered program 503 on the game computer 14. The meter 502 will generally be a much less powerful processor than the game computer 14. It also may not have access to the game computer's memory and internal data structures. Accordingly, data to be exchanged therebetween can utilize a message-passing or subroutine-call interface. In addition, the Secure Software Component 710 can be designed so that it performs crucial and non-trivial parts of the calculations implemented by the Insecure Software Component 708 of the metered program 503. In general, any event which may generate a billing charge must involve the cooperation of the Secure Software Component 710. The calculations done by that part must be non-trivial to prevent attackers from reverse-engineering the Insecure Software Component 708 and replacing the calls to the Secure Software Component 710 with local code that provides an equivalent function. This task is aided by the encryption of the Secure Software Component 710, which requires attackers to deduce the purpose of the code by observing its behavior from the insecure side. However, to effectively thwart such an attack, the Secure Software Component 710 must be sufficiently complex. In an embodiment where the meter 502 is disposed between a CD-ROM and the game Computer 14, access control is made easy as the metered program data must be decrypted on the fly by the meter 502. The interface between the two parts, in an exemplary embodiment, is a subroutine call interface, in effect a remote procedure call since the code is being executed on another processor. In the preferred embodiment, the Secure and Insecure Software Components operate concurrently, with the Secure Software Component 710 performing a calculation whose result will be needed by the Insecure Software Component 708 at some point in the future. One attack which must be prevented, is the player turning off power to the system at an inopportune moment. For example, if software is to be billed by the amount of time spent, and if such billing was implemented by inserting calls to the Secure Software Component 710 at the beginning and ending of the program (with the intention that the Secure Software Component 710 calculate the elapsed time by taking the difference between the time of the two calls), then billing might be avoided by always turning off the power before the program normally terminated. One way to avoid this is to record the progress of time incrementally as certain programmed events occur. Incremental charging provides fewer opportunities to evade billing by these kinds of methods. Charging by use or by feature is also less vulnerable to this attack. Another alternative, is to note in the audit logs the time when the power is cut prior to game termination. A pattern of games that have no end-of-game record signifies a player trying to evade the system.

Protocols:

The meter 502 communicates with the central computer 12 at regular intervals to report usage information, receive authorization for additional usage, receive updated cost information, and resolve disputes. Communications between the meter 502 and the central computer 12 can be automatic (without player intervention), but most players may be more comfortable with a system in which they control when such communications occur.

Several different communication protocols are utilized to facilitate operation of the metering system. Some employ communications between the game computer-meter system and the central computer 12, while others relate to purely local transmissions between the game computer 14, meter 502, and insecure data source 704. These protocols include:

Initialization of the Meter 502 (FIG. 16): This protocol is implemented when the player initializes the newly purchased meter 502 or metering system. The meter 502 performs its own internal initialization, including communicating with the central computer 12 to generate shared cryptographic keys. At this stage, the meter 502 has access to PK_CC, the central computer's public key, and ID_Meter, its own unique ID. The meter 502 is capable of generating random numbers. Unlike other protocols, these packets are not implicitly encrypted with the keys shared between central computer 12 and the meter 502. Instead, the encryption step is explicitly identified at each step of the following illustrative protocol:

At step 522, the meter 502 calculates SK_Meter, the random key for communicating data between itself and the central computer.

At step 524, the meter 502 creates an Initialization Message block of the following format:

Initialization Message
ID_Meter
Current date and time
SK_Meter.

At step 526, the meter 502 encrypts the initialization Message block with SK_Meter, then encrypts SK_Meter using PK_CC and communicates this encrypted message to the central computer 12.

At step 528, the central computer 12 recovers SK_Meter and then the Initialization Message block. It verifies that the date and time are approximately current, and records the new ID_Meter, verifying that it has not been used before. It recalls SK_Meter, and associates that value with ID_Meter.

At step 530, the central computer 12 creates an Account Number that will be associated with the player who owns the meter 502 and pays for the software.

At step 532, the central computer 12 creates an Initialization Response Message block of the following form:

Initialization Response Message
Account_Number;

At step 534, the central computer 12 encrypts the Initialization Response Message block under SK_Meter and sends it back to the meter 502.

At step 536, the meter 502 decrypts the Initialization Response Message block and stores the Account_Number. It then displays the Account_Number to the player for his records and use in communicating with the central computer billing service when he opens his account;

At step 538, if the meter 502 has an associated clock chip, the meter 502 runs the Synchronizing Clock protocol.

After the player has opened his account with the central computer billing service, go to the Authorization from Central Computer protocol described hereinbelow.

Adding a New Program (FIG. 17): This protocol is used when the player acquires a new software program that requires information from the central computer 12 in order to run. As will be described below, some programs may be runable without any new information from the central computer 12, but others may require that new cryptographic keys for those specific programs be acquired. All messages transmitted in this protocol are protected by encryption and sequence numbers as described above. An exemplary protocol operates as follows:

At step 540, the meter 502 reads new programs' Software Control Block(s) from the insecure data source 704, and extracts the Software_ID for each program.

At step 542, the meter 502 creates a New Program Message in the following format:
New Program Message
Number of programs requested
Software ID
Software-ID
. . .

At step 544, the meter 502 securely transmits the New Program Message to the central computer 12.

At step 546, the central computer 12 looks up the Software_ID's for the keys that are requested to determine the keys needed to decrypt those programs.

At step 548, the central computer 12 creates a New Program Message Response block in the following format:
New Program Message Response
Number of Programs Requested
Software_ID, Key
Software_ID, Key
. . .

At step 550, the meter 502 records the key information for each software program in its Software_Key_Table structure.

At step 552, the meter 502 runs the Updating Cost Information protocol if the variable cost option is being used.

Authorization from the Central Computer 12 (FIG. 18): The central computer 12 transmits authorization data to the meter 502 to enable operation for a specified time period Limit_Time or until a specified amount of money Limit_Cost is reached, as discussed above.

Normally this is implemented at the end of the billing period, immediately after running the Reporting Usage protocol. Alternatively, this may be done to obtain a specified amount of credit, after the exhaustion of which the meter 502 requires additional authorization. It is also done after the account is set up for the first time. Here again, all messages communicated in this protocol are protected by encryption and sequence numbers as described above. An illustrative protocol operates as follows:

At step 554, the meter 502 generates an Authorization Request Message, of the following format, which is sent securely to the central computer 12:
Authorization Request
Current Date/Time
Limit_Time
Limit_Cost (if meter 502 calculates costs)
Total_Cost (if meter 502 calculates costs).

At step 556, the central computer 12 records the time and cost information for statistical purposes. It then determines whether the current account (based on the Account_Number) is paid up pursuant to whatever billing conventions are being utilized to authorize continued use of the game computer 14 and/or software via the meter 502. Based on this, it then calculates new values for Limit_Time and Limit_Cost. If no additional authorization is approved, then the values in Limit_Time and Limit_Cost are left unchanged.

At step 558, the central computer 12 creates and sends an Authorization Response Message block to the meter 502 in the following format:
Authorization Response
Current Date/Time from previous message
New Limit_Time value
New Limit_Cost value (if meter 502 calculates costs).

At step 560, the meter 502 verifies that this Authorization Response Message is not a replay (i.e., the message is "fresh") by checking the time stamp. It then copies the new Limit_Time and Limit_Cost values into its non-volatile memory.

Updating Cost Information (Optional—Variable Costs) (FIG. 19): This protocol is used when the meter 502 requires updated cost information from the central computer 12 for metered programs 503 that the player is currently using. It is only employed if the variable cost option is selected, and is run after the Adding a New Program protocol, as well as during the regular set of protocols run at the end of each billing cycle (with the Authorization from Central Computer and Reporting Usage protocols). All messages communicated in this protocol are protected by encryption and sequence numbers as described above. An illustrative protocol is described in the following:

At step 562, the meter 502 creates a Cost Update Request message and sends it to central computer 12 in the following format:
Cost Update Request
Software_ID
. . .
Software_ID At step 564, the central computer 12 creates a Cost Update Response Message containing cost information for the requested Software_ID's. For those Software_ID's which include per-feature billing, cost information for such individual features are also included. This information is provided in the form of a Cost Table as described above:
Cost Update Response
Cost-Table.

At step 566, the meter 502 merges the new Cost_Table information into its internal Cost_Table, replacing internal data for matching Software_ID's.

Synchronizing Clock (FIG. 20): This protocol is run at regular intervals to synchronize the clock 512 in the meter 502 with the one in the central computer 12. Typically, this may occur at the end of every billing period. In this manner, the two (2) components are in agreement on the time limits at which authorizations will expire. (This protocol can be designed to handle propagation delays if it is expected to work on asynchronous data network systems like the Internet.) An exemplary protocol follows:

At step 568, the meter 502 creates a Time Update Request Message, of the following format, which is then securely communicated to the central computer 12;
Time Update Request
Current Date/Time from Meter.

At step 570, the central computer 12 reads the meter 502's date/time, which is provided for statistical analysis purposes. It then replies with a Time Update Message to the meter 502, which includes the current time in the packet format:
Time Update
Date/Time from Meter (taken from previous message)
Current Date/Time from Central Computer;

At step 572, the meter 502 receives the Time Update packet, checks the sequence numbers and encryption, and notes the time, but does not yet update it. It also records the time this data packet was received, based on its own clock. It also verifies the date/time from what it communicated to the central computer, and then returns a Time Update Acknowledgment Message to the central computer, of the format:
Time Update Acknowledgment
Current Date/Time from Central Computer.

At step 574, the central computer 12 compares the time between when it sent the Time Update packet and when it received the Time Update Acknowledgment packet. If the time is within a specified period of accuracy, it then sends a Time Update OK Message, of the form:

Time Update OK
Repeat of Original Date/Time from Central Computer.

At step 576, upon receipt of the Time Update OK Message, the meter 502 updates its time, based on the time in the Time Update Message and its own calculation of the elapsed time between the receipt of the two (2) Messages from the central computer 12. The value it sets its own time base to is the Date/Time value from the central computer 12 plus the difference in time between the arrival of the Time Update and Time Update OK Messages.

Starting Metered Software (FIG. 21): This protocol involves the meter 502, game computer 14, and insecure data source 704, and their interaction when a metered program is loaded for execution.

As described above, a metered program 503 that resides in the insecure data source 704 contains a Software Control Block 706 and two executable components, an Insecure Software Component 708 which executes on the game computer 14 and a Secure Software Component 710 which is decrypted and executed on the meter 502. At least the Secure Software Component 710 is encrypted, although the Insecure Software Component 708 and the Software Control Block 706 may be encrypted as well. The protocol operates as follows in a sample embodiment where the Software Control Block 706 is signed by the meter 502 and the Secure Software Component 710 is encrypted:

At step 578, the meter 502 reads the Software Control Block from the insecure data source 704, verifies the signature of the Software Control Block, and extracts the Software-ID for that metered program 503.

At step 580, the meter 502 determines whether the required key is available to decrypt the Secure Software Component 710 of the metered program 503. This key is found either, by looking up the Software_ID from the Software Control Block 706 in the Software_Key_Table, or may consist of SK_Imm_Run for immediately-runable programs (recognized by the associated Software_ID). If the key is unavailable, the meter 502 displays a message informing the player that the new program must be added to the current software list, and that communication with the central computer 12 is required to obtain the necessary keys (and this protocol terminates).

At step 582, if the required key is found, the meter 502 then determines whether the current resource limits are sufficient to run the metered program 503. If Limit_Time or Limit_Cost exceeds a predetermined value, then a message is displayed that advises the player that he must communicate with central computer 12 to authorize additional usage of metered software (and this protocol terminates).

At step 584, if either the Limit_Cost or Limit_Time are in a certain range near the maximum predetermined value, the meter 502 can display a warning before proceeding, informing the player that he may lose authorization during the course of running the metered program 503, and requiring confirmation by the player to continue, otherwise this protocol terminates.

At step 586, the meter 502 reads the Software_Cost_Table from the Software Control Block 706, and applies any overrides or adjustments from its internal Cost_Table, saving the resulting data in its internal RAM 510.

At step 588, the meter 502 and game computer 14 read the Secure Software Component 710 and the Insecure Secure Software Component 708, respectively, from the insecure data source 704. The meter 502 decrypts the Secure Software Component 710.

At step 590, the meter 502 and game computer 14 then transfer control to the newly read software components, with the meter 502 running the Secure Software Component 710 and game computer 14 running the Insecure Software Component 708.

Running Metered Software (FIG. 22): The following discussion relates to the interaction between the meter 502 and game computer 14 in connection with billing during execution of the program.

As described above, the meter 502 and the game computer 14 respectively execute the Secure Software Component 710 and the Insecure Software Component 708 of the metered program 503. In order to ensure accurate billing, the dependencies between the two components must be designed so that all events which are billable require the active cooperation of the Secure Software Component 710. When one of these events occurs, this protocol is run. Furthermore, if non-volatile storage is available on the game computer 14, the meter 502 can use this storage to maintain the Receipt File 712, which provides detailed itemization of billing activity. The Receipt File 712 constitutes a record of the player's activity and, since it is signed by the meter 502, it can be used in resolving any disputes. The following is an illustrative protocol; note that Steps 592 and 594 thereof are executed only in case a Receipt File 712 is available:

At step 592, the meter 502 creates a Receipt Entry consisting of the following information: the software being used, the amount charged (if available), the current time, and information to identify the charged event. This is signed with the meter 502's secret key (i.e., SK_Meter if conventional cryptography is used, or via public key techniques). The meter 502 then sends the Receipt Entry to insecure storage, where it is appended to the Receipt File 712.

At step 594, the meter 502 updates the Total_Cost based on which event is being billed and the current cost information calculated during the Starting Metered Software protocol.

At step 596, if at any time during operation of the metered program 503, either the Limit_Time or Limit_Cost are exceeded, the meter 502 no longer executes the Secure Software Component 710 to produce the at least one output parameter required by the Insecure Software Component, thereby interrupting execution of the program on the game computer 14, and displays a message advising the player that he must contact the central computer 12 to obtain further authorization;

If appending a signature to each entry in the Receipt File 712 is deemed too labor intensive, Step 592 above can be replaced by the following sequence:

At step 592*a,* the meter 502 reads the current Receipt File 712 from insecure storage. The Receipt File 712 consists of receipt records as described above (however the individual records are unsigned in this case), followed by a signature relating to the file as a whole;

At step 592*b,* the meter 502 verifies the signature on the Receipt File 712. As described above, this may be implemented by using conventional cryptography using SK_Meter or public key techniques;

At step 592*c,* if the signature is valid, the meter 502 adds the new Receipt Entry to the Receipt File 712 and signs the entire file. The Receipt File 712 is then returned to insecure storage; If the signature is invalid, At step 592*d,* the meter 502 adds a line signifying that the above information is corrupted. It then appends the current Receipt Entry and signs the entire file. A message is displayed to the player indicating that the Receipt File 712 is corrupted.

Reporting Usage (FIG. 23): At the end of the billing period the meter 502 reports accumulated usage information to the central computer 12. Several variations are possible, depending on which payment mechanism is in use, and the level of detail of the information to be communicated to the central computer 12. If the meter 502 is calculating the costs (in lieu of the central computer 12), the following protocol is used. As an option, a copy of the Receipt File 712 (if one is available) can be uploaded to the central computer 12. If the information is uploaded, the central computer 12 can prepare a detailed printed billing statement similar in format to a typical telephone bill. The following is a sample protocol:

At step 598, the meter 502 creates a Usage Report Message containing the following information:
Usage Report
Total_Cost
Receipt File (optional).

At step 600, the central computer 12 receives the Usage Report Message and updates the billing information for this account.

At step 602, the central computer 12 returns a Usage Report Acknowledgment Message arranged in the following format:
Usage Report Acknowledgment
Total_Cost.

At step 604, the meter 502 displays the Total Cost that is being billed.

At step 606, the meter 502 signals the game computer 14 to rename the Receipt File 712 to a sequentially numbered backup file, and creates a new blank Receipt File 712; Normally other protocols will be run at this time, including Authorization from the Central Computer, Synchronizing Clock, and Updating Cost Information.

If costs are calculated by the central computer 12 instead of the meter 502, more detailed information must be uploaded:

At step 608, the meter 502 creates a Usage Report Message containing the following information:
Usage Report
Use_Count_Table
Use_Time_Table
Receipt File (optional).

At step 610, the central computer 12, knowing the costs of various programs and program features, calculates and updates the billing information for this account. It can also use this information to prepare an itemized statement showing how the various pieces of software contributed to the billed amount. It calculates Total_Cost, the total new amount being billed, and returns a Usage Report Acknowledgment Message of the form:
Usage Report Acknowledgment
Total Cost.

At step 612, the meter 502 displays the Total_Cost that is being billed.

At step 614, the meter 502 signals the game computer 14 to rename the Receipt File 712 to a sequentially numbered backup file, and creates a new blank Receipt File 712; other protocols which would normally run at this time include Authorization from Central Computer and Synchronizing Clock.

Auditing (FIG. 24): This protocol is utilized when a disagreement regarding usage and billing arises between the player and the central authority, and is implemented with the Receipt File 712. A validly signed Receipt File 712 is an authenticatable record of all billing activity for any given billing period. If the player's bill from the central computer 12 does not match the information contained in the Receipt File 712, the following protocol may be followed:

At step 616, the meter 502 creates a Receipt File Check Message in the following format:
Receipt File Check
Receipt File (from disputed billing period).

At step 618, the central computer 12 acquires the Receipt File 712 and compares it to the billing information it received from the meter 502 for that billing period (the billing period is deduced from the dates in the Receipt File 712). Any disagreement indicates a possible malfunction in the system; possibly a faulty meter 502, erroneous software, or operator error at the central computer 12. If the Receipt File 712 confirms the accuracy of the billing data, the player may have made a mistake in verifying his Receipt File 712.

At step 620, in either case, the central computer 12 creates a Receipt File Validation Message, including the original amount billed during the billing period in question, and the validated amount. These will be the same as the original amount if no discrepancies were found, or a corrected amount if an error was detected:
Receipt File Validation
Date/Time of Start of Billing Period
Date/Time of End of Billing Period
Original Amount Billed
Validated/Corrected Amount Billed
Null-Terminated Text String (for display to player).

At step 622, the meter 502 displays this information and the text string communicated from the central computer 12, thereby providing an explanation for any discrepancies that may have been found.

Authentication (FIGS. 25 and 26):

One application of the outcome authentication system described in detail in the foregoing, is "high score" verification in the context of a dedicated game system, or entertainment software on a general purpose computer. This is the principle protocol of the system, used when a program produces some outcome which the player wants to have authenticated. We assume that the division of software between the secure and insecure components is such that the meter 502 can in fact determine that the specified outcome actually occurred. For the electronic communication implementation shown in FIG. 25, an illustrative protocol operates as follows:

At step 624, the meter 502 creates an Authenticatable Outcome Message AOM of the following form encrypted with SK Meter:
Authenticatable Outcome
Software_ID
Null Terminated Text String (describing outcome for display to player).

At step 626, the central computer 12 receives and authenticates the block by decrypting the same using SK_Meter and, if authenticated, it then accepts the outcome on that basis. As described above, the central computer 12 may then re-authenticate the outcome under its own PK_CC or implement whatever other actions are appropriate.

At step 628, the central computer 12 returns an Authenticated Outcome Confirmation Message AOCM confirming that it has accepted the Authenticatable outcome in the form:
Authenticated Outcome Confirmation
Software_ID
Null Terminated Text String (confirmation or denial of outcome acceptance for display to player).

At step 630, the meter 502 displays the confirmation or denial of outcome acceptance from the central computer 12.

Figure 26:
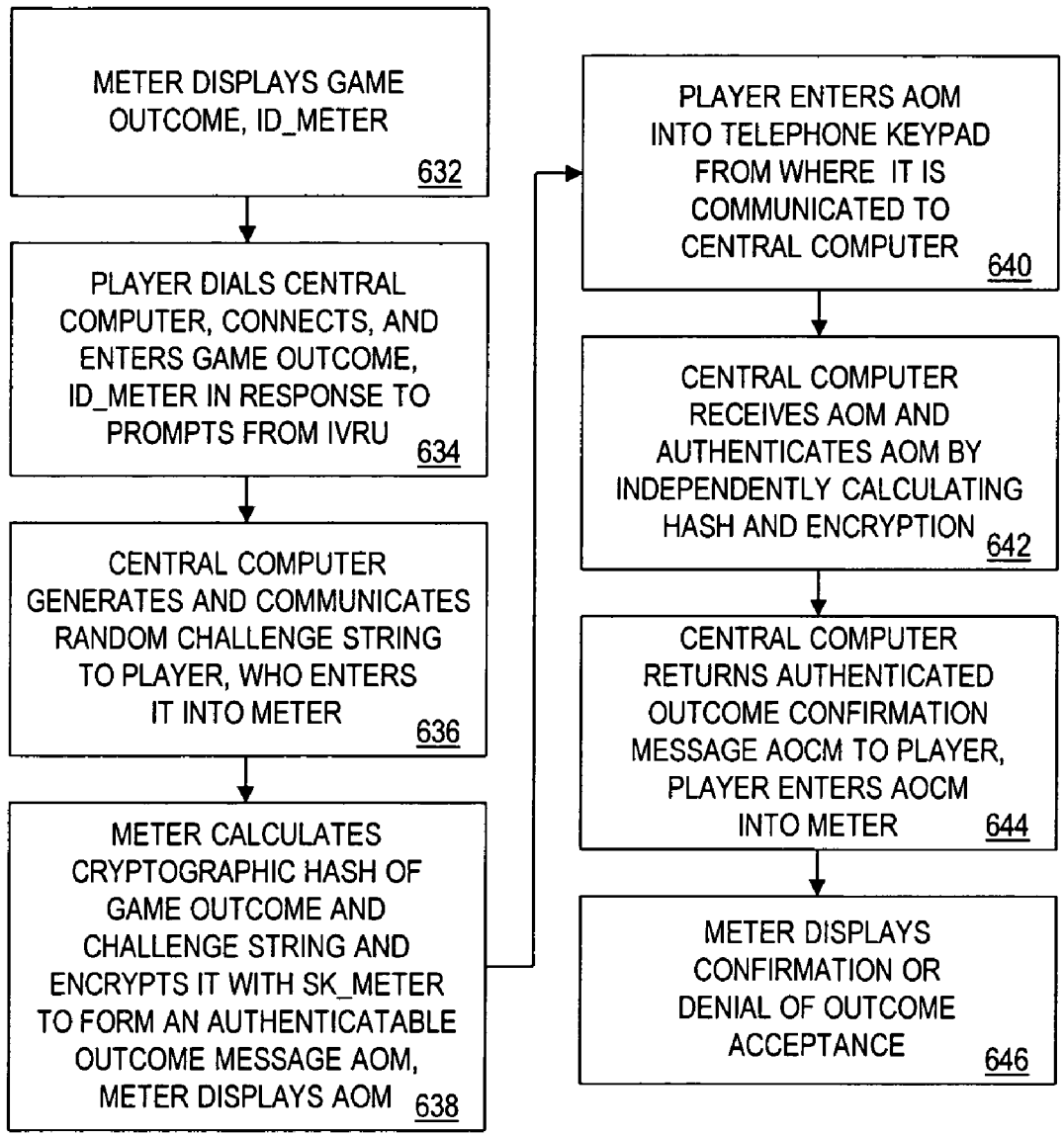
FIG. 26 is a flow chart of another outcome authentication protocol using the meter.
Figure 27:
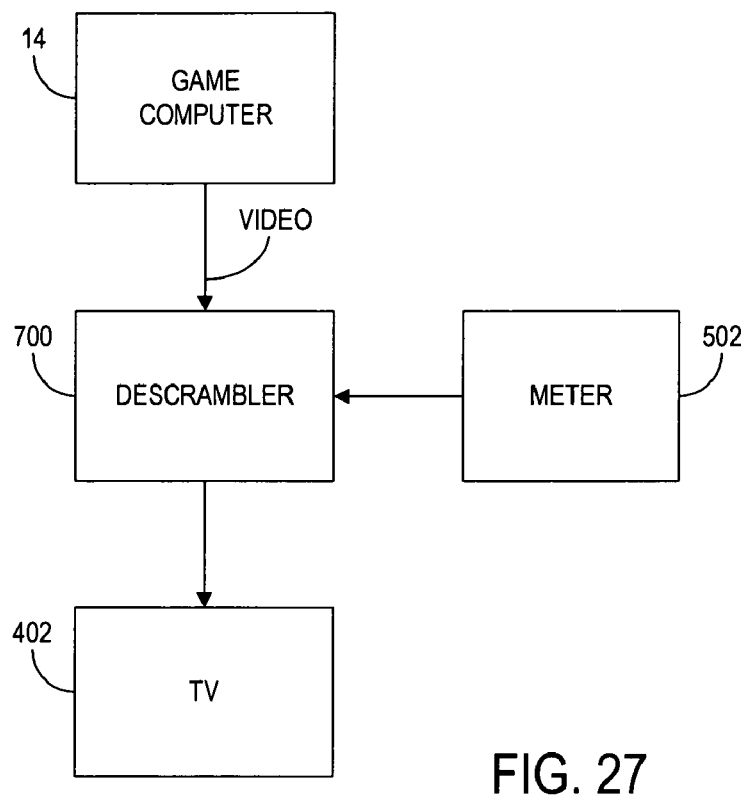
FIG. 27 is a schematic of a descrambling pay-per-use embodiment.

As described above, players can manually enter messages into a telephone keypad to facilitate communications with the central computer 12. In this situation, a different protocol may be used that is more amenable to the limited communications bandwidth associated with a manual transfer of data between the meter 502 and the central computer 12 as shown in FIG. 26:

At step 632, the meter 502 displays the game outcome on the screen, along with its ID_Meter (possibly just some fraction of the bits of ID_Meter is shown, enough to narrow down the source possibilities to no more than a handful of meters 502).

At step 634, the player dials the central computer 12 on the telephone and enters this information using his touchtone keypad in response to suitable prompts from an IVRU as described in detail above.

At step 636, the central computer 12 generates and communicates a random challenge string to the player, who then enters the same using an appropriate input device (e.g., a keypad, joystick interface or the like).

At step 638, the meter 502 calculates a cryptographic hash of the game outcome and challenge string, encrypts it with SK_Meter, and displays the result-an Authenticatable Outcome Message AOM.

At step 640, the player enters the Authenticatable Outcome Message AOM into the telephone keypad from where it is communicated to the central computer 12.

At step 642, the central computer 12 authenticates the Authenticatable Outcome Message AOM by independently calculating the hash and encryption, and confirms the value received from the player.

At step 644, the central computer 12 returns an Authenticated Outcome Confirmation Message as described above. This may be accompanied by a verbal indication of outcome acceptance or denial by the IVRU.

At step 646, the player enters the Authenticated Outcome Confirmation Message into the meter 502, which displays the confirmation or denial of outcome acceptance as described above.

Several variations of the foregoing are anticipated to improve reliability, the values communicated from the player can be padded with some redundancy to allow some level of error detection if he enters a few digits incorrectly. A variation on the above protocol employs a key other than SK_Meter, which is the same for all the meters 502 and is programmed into their ROM 510 during manufacture. This obviates the need for the meter 502 to display ID_Meter at step 632 and the player to enter it at step 634. In addition, Step 638 can be alternatively accomplished by hashing in the secret key value rather than encrypting with it.

In accordance with the foregoing, the metering protocols enable use of the game computer 14 or game program 26 to be metered in several ways, including: time-dependent disablement, credit requests to enable arcade-type play, and flat-rate pricing. Game play may be controlled by the meter 502 by not executing the Secure Software Component 710 of the game computer operating system, or not executing the Secure Software Component 710 of a game program 26 without authorization. In addition, game play can be metered using an alternative system where the game is not displayed in a usable or intended format without authorization. The latter can be accomplished by scrambling the game program instructions and/or data such that a descrambler 500 is required to descramble the game, where the descrambler 500 is enabled by an Authenticatable Unlock Message AUM. The descrambling embodiment is described separately below.

In a time-dependent disablement embodiment, the game computer 14 is adapted to function for a specified period of time, after which it requires that an "unlocking code" be input to enable play after the expiration or end date. The player obtains an unlocking code (hereinafter referred to as an Authenticatable Unlock Message AUM) in order to continue play after the end date. The Authenticatable Unlock Message AUM is obtained from the central computer 12 by implementing the Authorization from Central Computer protocol described above. The Authorization Request Message in that protocol is identified as an Authenticatable Unlock Request Message AURM, where the Limit_Time value specifies the length of the next period of use to be purchased. The player may be provided with the option to purchase time by the month, week, day, etc. The player may provide a credit card for billing, or billing can be made at the end of the specified period in the Reporting Usage protocol described above. In the Authorization from Central Computer protocol, the central computer 12 authenticates the Authenticatable Unlock Request Message AURM, checks the status of the player's account, and generates an Authenticatable Unlock Message AUM which constitutes the above-described Authorization Response Message, where New Limit_Time represents the authorized period of time. After the meter authenticates the Authenticatable Unlock Message AUM, it changes the end date for usage represented in the New Limit_Time in its non-volatile memory 506. During the authorized time period, charges may be incurred for different types of usage depending upon the Cost_Table_Elements for the game programs 26. Additional time may also be purchased by calling a 900#, or billing may be implemented by mail, or at a retail outlet. For example, an AURM could be written down, printed out or stored on portable data memory media, and provided to an authorized agent at a terminal connected to the central computer 12. With specially configured metered software S03, players may have several options, such as a limited number of minutes of play time, where every minute of play reduces the allotted play time by an equivalent value (e.g., one minute) or by some other value. When the allotted time expires, the meter 502 no longer operates to execute the Secure Software Component 710, thereby rendering the game computer 14 or a particular game program 26 inoperative. In this connection, it is anticipated that play may be restricted to certain hours of the day, weeks in the month and the like. For example, the meter 502 may prevent game play between the hours of 11 pm and 7 am to prevent children from playing late into the night. Rates for enabling play can be varied depending upon the time or day of play as well.

In an arcade-type embodiment, the player purchases "credits" to enable game play. This enables players to call the central computer 12 and obtain codes for a specified number of game plays, as in an arcade environment. The methodology is similar to the foregoing embodiment, except that the Authorization Request Message to the central computer 12 is identified as an Authenticatable Credit Request Message ACRM. The Authenticatable Credit Request Message ACRM represents a specified number of game plays that are requested from the central computer 12. In the Authorization from Central Computer protocol, the central computer 12 generates an Authenticatable Credit Authorization Message ACAM which constitutes the above-described Authorization Response Message, where New Limit_Cost represents a number of play credits. After the meter authenticates the Authenticatable Credit Authorization Message ACAM, it copies the credit amount Limit_Cost into its non-volatile memory 506. Each play results in the credit amount being decremented in the meter 502. When the purchased credit amount is exhausted, if the player desires to continue to play, he must purchase more credits from the central computer 12 via the Authorization from Central Computer protocol.

Each game to be played may decrease the total credit value by a specified amount. Popular games may be made to require two or more "credits" per play. Some games may be designed to accept additional credits once a player has lost all of his or her allotted lives (e.g., such as with video arcade machines), thereby enabling the player to continue the game. Extra credits can be required to complete restricted stages of a game. A player might be charged one credit to explore any of the first ten levels of a game, while any of the additional five bonus levels could be explored at a cost of one credit each. For example, while exploring a ten-level dungeon, the player could be charged an additional credit for the use of a special weapon, access to a map of the dungeon, or hints on avoiding traps. Such extra characteristics may be implemented in the Software Control Block 706 for the particular game program 26, and may be configured so as to require additional credits in the meter 502 to continue play at these levels. The number of credits available may also be incremented after achieving a certain level of performance in the game. For example, scoring over a million points in DONKEY KONG might result in an extra credit being added to the available credit balance. Finding a secret room within a game might add five credits. Hitting a home run may earn ten credits. This information can then be stored in the volatile memory of the meter 502 so that this five credit bonus cannot be repeated in future games. The number of credits that a player receives per dollar may also be variable. A purchase of ten credits may cost $0.50 each while a purchase of twenty credits may cost $0.30 each. Credit discounts can be offered to select players who have obtained certain certified titles. A five-star MORTAL KOMBAT player may receive a 10% discount on all credits. Each credit might also buy a certain number of lives. Games may cost a different number of credits depending upon the difficulty setting. For example, the easiest setting may cost two credits while the most difficult setting may cost one credit per play. In lieu of purchasing one game, each credit may entitle the player to play for a certain period of time. One credit may buy five minutes of play while two credits may buy twelve minutes of play. As described above, the meter 502 can determine the price per game credit from the data or instructions associated with Software Control Block 706 of the game program 26. The price per game may be stored within the meter's 502 non-volatile memory and can be manipulated with codes from the central computer 12 to alter or change the pricing structure for particular games via the Updating Cost Information protocol described above.

In lieu of charging a specified number of credits for each game play, it will be appreciated by persons skilled in the art that a flat rate for unlimited use over a fixed period of time may be implemented by requesting a flat-rate pricing option from the central computer 12. The Authorization from Central Computer protocol is implemented as described in the foregoing, except that the Authorization Request constitutes an Authenticatable Flat Rate Request Message AFRRM, where Limit_Time represents a requested fixed time period for unlimited usage. The central computer 12 authenticates the Authenticatable Flat Rate Request Message AFRRM, checks the status of the player's account, and generates an Authenticatable Flat Rate Message AFRM, which constitutes the above-described Authorization Response Message where New Limit_Time represents authorization for unlimited usage for the requested time period. To operate the game computer 14 or to run a particular game program 26, the meter simply checks the New Limit_Time prior to and during each play as it executes the Secure Software Component 710 of the operating system program or the game program 26.

As mentioned above, another method by which play can be prevented involves scrambling the game data in a particular game program 26 that causes the game computer 14 to generate the game with altered characteristics. A shown in FIG. 27, a descrambler 700 is either installed within the game computer 14 itself, or is connected to the video output cable from the game computer 14. In order to convert the scrambled game into the intended format, the descrambler 700 must be enabled by an Authenticatable Unlock Message AUM, Authenticatable Credit Authorization Message ACAM or Authenticatable Flat Rate Request Message AFRRM as described above. By way of example, an illustrative mode of operation is hereinafter described.

Data and instructions associated with computer games—typically contain a background element as well as game character data commonly referred to as sprites. A particular game may have a dozen different backgrounds representing a dozen different levels. An example of a background is a jungle scene depicting trees, plants, rivers, rocks, etc. The game character that the player controls, as well as any enemy characters encountered, are normally represented by sprites, which are movable within the game background. This background may be analogized to a map, with respect to which the sprites travel. This "game data" is not to be confused with the software code that is executed by the CPU 27. The game data in this context is used to generate the video output and may be processed by the CPU 27, even if scrambled or encrypted. The processed game data visual information is composed of pixels. Each pixel has a color and an associated location for display. An illustrative pixel reference (34,15,26) may correspond to a blue color (indicated by the numeral 26) at a location residing at 34 pixels above the bottom of the screen (a horizontal datum) and 15 pixels to the right of the left side of the screen (a vertical datum). This information is stored in the read only memory of the game cartridge. Normally, the game program 26 is executed by the CPU 27, converted by appropriate means into a video signal (RF format), and communicated to a display device such as a TV. In this embodiment, the video signal contains altered characteristics, which must be applied to the descrambler 700 to make the output video signal represent the real game in the intended format. In the scrambling process, the pixel data may be algorithmically manipulated such that the pixel data does not represent the intended format. For example, the intended pixel (34,15,26) may be transformed into (12,02,68). The transformed pixel data is stored in the game cartridge and when processed, is unintelligible to the player if displayed on the TV without the intervening descrambling process. When the descrambler 700 is enabled with the proper Authenticatable Unlock Message, it operates on the video signal to convert (12,02, 68) back to (34,15,26), the intended format. The scrambling and descrambling process may utilize algorithm/inverse algorithm pairs and/or the cryptographic authentication protocols described herein. For example, the value (12,02,68) is obtained by encrypting (34,15,26) with a secret key, and subsequently authenticated with a public key in the descrambler 700. The descrambler 700 will not operate to descramble the video signal after the end date, or prior to receiving the proper Authenticatable Unlock Message AUM, Authenticatable Credit Authorization Message ACAM, or authenticatable flat rate message AFRM.

As a result of game play, reward points may be accumulated in a manner similar to a frequent flyer reward program. In this connection, each game played or each unit of time played generates one or more reward points. Players may also accumulate points for achieving certain results in a game, such as, for example, one reward point per each million scored points in a particular game. The reward point redemption instructions associated with a given game program 26 can reside in the Software Control Block 706 or the Secure Software Component 710 for that program in the insecure data source 704, or be permanently stored in the meter's non-volatile memory 506. During play, the meter 502 tracks reward points and stores such points in a reward point database in its non-volatile memory 506. To redeem reward points, a player requests a Reward Point Redemption function, which directs the meter 502 to generate an Authenticatable Point Redemption Message APRM, which includes ID_Meter or the secret computer or software ID SSCID, player PIN or other identifier, number of points for which redemption is requested, and the current Date/Time. This APRM may be encrypted with the SSCID and/or with the meter's secret key SK Meter. The central computer 12 reads and authenticates the Authenticatable Point Redemption Message APRM and increments the player's reward point balance by the appropriate number. These reward points may be subsequently utilized to purchase prizes or gifts, which purchases may be made in combination with additional payment if desired.

In an exemplary embodiment, the credits used in the pay-per-use process may be transferred between game computers 14 (i.e., from a source game computer 14 to a destination game computer 14) such that a player can bring credits to play on another player's game computer 14. This may be implemented by requesting a Credit Transfer function associated with the meter 502. The meter 502 prompts the player for a PIN, Account_Number, or other identifier to verify the player's identity. If this response is consistent with the data stored in the memory of the meter 502, the process proceeds with the player entering the game computer ID number or a public key PBK_Comp of the destination game computer 14, and/or the ID_Meter or public key PBK_Meter of the meter 502 associated with the destination game computer 14. The source meter 502 then generates an Authenticatable Transfer Message ATRM incorporating the Limit_Time or Limit_Cost for use on the destination game computer 14/meter 502 system, a PIN or other player identifier, the game computer ID number of the destination game computer 14, and the current Date/Time from the clock 512 associated with the source meter 502 or the clock 36 of the source game computer 14. This message may be encrypted or signed with the public key PBK_Comp of the destination game computer 14 or the public key PBK_Meter of the destination meter 502 associated with the destination computer 14. The source meter 502 then decrements the credit balance in its non-volatile memory 506 by the corresponding amount requested. The player writes down or prints out the Authenticatable Transfer Message ATRM (or downloads it to portable data memory media such as a floppy disk or PCMCIA card) and inputs the same into the destination meter 502 associated with the destination game computer 14. The destination meter 502 associated with the destination game computer 14 reads and authenticates the Authenticatable Transfer Message ATRM in accordance with the cryptographic protocols described above, such as, for example, by decrypting the ATRM with the destination meter's private key PRK_Meter (if the ATRM was encrypted with the destination meter's public key PBK_Meter) or with the destination computer's private key PRK_Comp (if the ATRM was encrypted with the destination computer's public key PBK_Comp), and stores the Date/Time in memory, and compares the Date/Time with previous messages to determine whether that Authenticatable Transfer Message ATRM has been used previously. If the Authenticatable Transfer Message is authenticated and the credit transfer authorized, the transfer credits are added to a "guest account" generated by the destination meter 502 associated with the destination game computer 14. The player uses these credits by entering his or her PIN or other identifier incorporated in the Authenticatable Transfer Message ATRM. The meter 502 then enables game play as described above. If a credit balance remains after play, the destination meter 502 generates an Authenticatable Balance Return Message ABRM, which incorporates the number of credits returned Limit_Cost and/or Limit_Time, the player PIN, source game computer ID number or source ID_Meter, and the current Date/Time. The ABRM may be signed with the private key PRK_Meter of the meter 502 associated with the destination game computer 14, or the private key PRK_Comp associated with the destination game computer 14. Contemporaneously, the guest account is deleted. The player enters the Authenticatable Balance Return Message ABRM into the source game computer 14 or meter 502 associated with the source game computer 14, and, if the meter 502 authenticates the ABRM, by, for example, decrypting the Authenticatable Balance Return Message ABRM with the public key PBK_Meter or PBK_Comp of the destination game computer, it adds the credits to the player's credit balance in the source meter 502.

Players may set up guest accounts on other player's computers via the central computer 12. In this connection, a player requests a guest account on another's game computer 14. The meter 502 displays an Authenticatable Guest Message AGM on the destination game computer 14, which message includes the SSCID of the destination game computer 14, a player PIN or other identifier, and the current Date/Time. This message may be encrypted with a public key PK_CC from the central computer 12. The player then calls the central computer 12, and is prompted to enter the Authenticatable Guest Message AGM, accompanied by the number of credits requested and a credit card number or some other instructions to arrange for payment. The central computer 12 authenticates the Authenticatable Guest Message AGM with the encryption/decryption module 52, and generates in return an Authenticatable Guest Credit Message AGCM, which includes the destination game computer SSCID, the number of credits requested, and the current date/time. This message may be encrypted with the SSCID of the destination game computer 14. The meter 502 associated with the destination game computer 14 then authenticates the Authenticatable Guest Credit Message AGCM, and adds the credits transferred to a guest account as described above.

Figure 28:
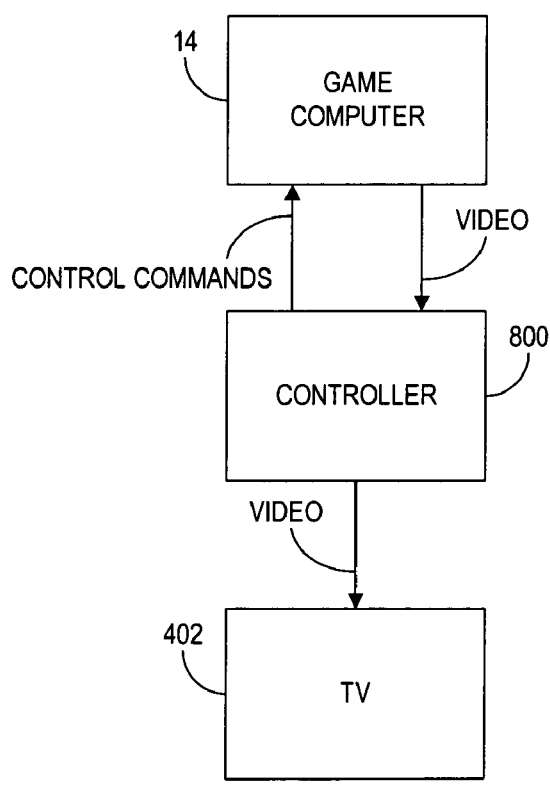
FIG. 28 is a schematic of a metering device incorporated into a video game controller.

Although the foregoing embodiments utilize an meter which is either part of or associated with (e.g., by way of a PCMCIA card and the like) the game computer 14, it is possible to incorporate the constituent components in a tamper-resistant game controller 800 as shown schematically in FIG. 28. One exemplary type of game controller is a joystick, in which player movements are transmitted to the game computer 14, to control the movements of game characters. This allows for backward compatibility with existing game computers 14. A game controller 800 includes the meter components described in the foregoing, plus the additional hardware to enable input controls such as joysticks and buttons which communicate via an input interface associated with the game computer 14 as is well known in the art. The game controller 504 also includes a video input interface for receiving NTSC (PAL in Europe) video signals. A video output interface communicates the video signal to a TV. The game controller contains a program in memory for recognizing data from the video screen to derive the outcome information to generate Authenticatable Outcome Messages as discussed at length above. The game controller memory also stores a unique controller secret serial number CSSN, a random number generator program, and the meter program instructions. As described above, the encryption/decryption functions implemented by the encryption/decryption module 28, are part of the meter in this embodiment. In this regard, the controller memory stores associated public and private encryption keys, and a public encryption key associated with the hardware manufacturer. The game software 15 contains or can read from another source, the public key of the controller 800, and the code used to generate random numbers. This code is obfuscated in order to render the operation of interposing devices, such as the above-described GAME GENIE, more problematic. In an exemplary scenario, a player purchases an Authenticatable Unlock Message AUM as described above, and enters it into the game controller 800. The game controller CPU under direction of the random number generator program generates a random number R1 and an Authenticatable Play Enable Message APEM authorizing play. This APEM includes the controller secret serial number CSSN, and may be encrypted with the private key of the game controller. The APEM is then communicated to the CPU 27 of the game computer 14 or to the descrambler 500 as described above. The game controller 800 also "signs" the public key of the game controller and the game controller secret serial number CSSN with the private key of the hardware manufacturer. The latter is known as a public key certificate. This enables the game computer 14 to authenticate the public key certificate and thus the game controller 504. Thus, the game computer 14 is able to verify that the controller secret serial number CSSN contained in the Authenticatable Play Enable Message APEM is correct for that game controller 504. The game computer 14 then generates a second random number R2, which is communicated to the game controller 504 along with random number R1. The game controller 504 confirms that this R1 matches the R1 previously created and included in the Authenticatable Play Enable Message APEM, and encrypts R1 and R2 with the private key of the game controller 504 into a response play enable message RPEM. The RPEM is read by the game computer 14 and decrypted with the public key of the game controller 504. R1 and R2 are now compared with the prior generated values. If they match, the game controller 504 is authenticated and it may be used to enable game play in accordance with the foregoing protocols.

Other Embodiments:

In some embodiments a game machine may output a coupon that includes an authentication code. This coupon may be in the form of a substrate with printed matter (e.g., a paper coupon, note that some or all of the coupon may be pre-printed); electronic media (e.g., a smart card, flash memory card); magnetic media (e.g., a floppy disk, a magnetic stripe card); and/or optical media (e.g., compact disc/DVD). The term coupon is used in a very broad sense, a coupon may also be known as a gift certificate, a voucher, a note, and/or a token. A coupon may include media that includes an indication of authentication code. A coupon may also be portable (i.e., such that it can be carried by a person).

An indication of an authentication code may be in the form of an authentication code printed, embossed, engraved, embedded, or otherwise indicated on a coupon (e.g., as an alphanumeric string of characters); an indication on disk (e.g., floppy disk, CD); and/or an encoded or encrypted version of the authentication code may be output. An authentication code may be indicated on coupon in a machine-readable form such as a bar code (e.g., UPC code, 2D bar code); a magnetic stripe; pits on the surface of a compact disc/DVD; radio frequency identification (RFID) tag (e.g., Mobile™ Speedpass); and/or an alphanumeric code. The substrate of a coupon may be paper, plastic, metal, cardboard, etc. The authentication code may be output in a manner that inhibits forgery such as, for example, special ink, invisible ink, special paper, and/or special substrate.

A coupon may be printed or otherwise output in response to a trigger. Examples of triggers include: an indication by a player (e.g. player requests that a coupon be output, player inserts substrate for coupon to be printed); a prize is awarded to player (e.g., print the coupon immediately when the player wins the prize); the end of a game (e.g., print coupon when the player finishes his game); and/or the end of gaming session (e.g., when a player logs off of a game machine or turns a game machine off).

In some embodiments a player may uses an authentication code to obtain a Prize. After receiving an indication of an authentication code from a game machine, a player may use this authentication code to obtain a prize. Player may indicate the authentication code to an electronic device in order to obtain a prize. Examples of electronic devices include: a web server (e.g. an authentication code may serve as password to website, without the authentication code, a player would have had to pay for access to the information on the website; an e-commerce terminal (e.g. an authentication code may be an "electronic coupon" code that may provide the user with a discount on products or services from an e-commerce website); a set-top box (e.g. entering authentication code into cable/satellite television box provides access to premium movie channel and the player may enter authentication code using remote control); a vending machine (e.g. a player enters authentication code into vending machine to receive a prize from the vending machine. Vending machines may provide prizes of products (e.g., food, drinks, gasoline), services (e.g., internet access, music downloads), discounts on products or services. Vending machine's may include a gas pump; an internet kiosk; a point-of-sale terminal (e.g. a authentication code is a UPC coupon code that serves as a debit card number and PIN and may be used to provide payment); a telephone (e.g. an authentication code serves as a telephone calling card number); an ATM machine (e.g. a player may get cash from a ATM machine by providing an authentication code and PIN); a game machine (e.g., slot machine, lottery terminal, arcade game wherein entering an authentication code into game machine gives a player credits on the game machine); and/or a cellular telephone (e.g. in a cell phone that has downloadable games entering the authentication code enables a player to download another game).

In some embodiments there may be different ways of indicating authentication code to an electronic device. For example, a player may use an input device (e.g., numeric keypad, keyboard, microphone with voice recognition, touch screen, stylus, etc) to indicate the authentication code to the electronic device. Or a player may indicate a coupon to an electronic device. Note that coupon may be paper coupon, computer disk, etc. Indicating coupon may include scanning a bar code on the coupon, activating an RFID tag on smart card, inserting a floppy disk into a floppy drive on computer. Electronic device may then read the authentication code from the coupon. In another example, a game machine transmits authentication code to the electronic device The electronic device may verify an authentication code as described above. Note that the electronic device may provide a prize to the player (e.g., vending machine dispenses prize, website allows player access to premium content).

According to some embodiments, at least one prize may be awarded to a player based on an authentication code. Examples of prizes include:

money (e.g., cash, or a credit to a financial account). Money or an alternate currency may be provided to a player in a variety of different ways, including: as a lump sum payment (e.g., through a check), as a recurring payment (e.g., $100 a month for the next 3 months, 10 points per day), or by crediting a financial account belonging to the player (e.g., bank account, credit card account, a store account).

alternate currencies (e.g., tickets, credits, tokens, points, frequent flyer miles, Beenz, minutes of long distance phone time, comp points)

products (e.g., a toaster oven, a souvenir watch, a sweatshirt, a magazine subscription, a trophy, a baseball card, a certificate of recognition, a frozen pizza, a soft drink, a video tape)

services (e.g., a free game, access to premium gaming services, an oil change, automatic bidding during an online auction, free delivery of a product). For example, a player may receive free access to a pay-per-use website or premium movie channel. This access may only last for a limited duration (e.g., a limited number of downloads, a 30-day membership, etc).

pricing benefits (e.g., discounts, rebates)—See details below.

an entry into a game (e.g., a game of skill, a game of chance). For example, a player may receive a free lottery ticket or a free spin of a slot machine reel. In a second example, a player may receive a free entry into an online Scrabble™ tournament.

a prizes for a friend of a player—See details below.

other considerations

Examples and details about different types of benefits are provided below.

In some embodiments, a player may receive multiple prizes. Examples include:

A player may also receive multiple benefits based on a single authentication code.

A player may provide multiple authentication codes and thereby receive multiple prizes.

A player may receive a prize for himself and two additional benefits for two of his friends.

In some embodiments, a prize may be shared between a plurality of players. Example: plurality of players wins a 100 hours of pay-per-view movies all players in the group draw from the same balance of hours remaining to be used up. Possible pricing benefits include:

a discount on a product or service services (e.g., 50% off the list price of a hotel room, 10% off when purchasing credits to play video games, $1 off a half gallon of ice cream)

a discount on a transaction that includes a product or service (e.g., 10% off a the total cost of a transaction)

a rebate on a purchase of a product or service (e.g., a mail-in rebate certificate, an automatic rebate, a point of sale rebate). For example, a customer may receive $10 cash back when he purchases a product.

a discount or rebate on a past or future purchase of a product or service. For example, a customer may be given a gift certificate.

a non-discounted price on a future purchase of a product or service. (This may be appealing to a customer if the price of a product varies greatly or is expected to rise.)

Note that a discount may be stated to a customer in various ways, including:

a reduced price for a product or service (e.g., $19.99)

a percentage discount (e.g., 20% off)

a monetary discount (e.g., $5 off)

a discount relative to another product (e.g., 10% less than the leading brand)

A customer may receive multiple pricing benefits. Examples include:

A customer may also receive multiple pricing benefits for performing a single pricing activity.

A customer may perform multiple pricing activities and thereby receive multiple pricing benefits.

A customer may select multiple products and then receive one or more pricing benefits for performing one or more pricing activities.

Note that a pricing benefit may be provided to a customer at various times, including:

before or after a pricing activity is performed before or after a product is selected According to some embodiments, a benefit may be provided to a party associated with the player (e.g., a friend of the player, a family member, a charity). While providing a benefit a player's favorite charity may not provide a tangible benefit to the player, the player does receive an intangible benefit (e.g., he may feel altruistic and good-hearted). For this reason, benefits to friends of players may be particularly motivational for a player. According to one embodiment, a benefit provided to a friend of a player may be contingent on the friend performing one or more activities. For example, a player's friend may be asked to perform sign up for an online gaming service in order to receive a benefit.

According to some embodiments, the controller operates an online gaming website. In this embodiment, the controller may provide prizes to players through the gaming website. Examples include:

free games or tickets that may be used to pay entry fees for games points or some other currency suitable for purchasing prizes services (e.g., instant messaging, access to premium games, notification of upcoming tournaments, reservations on prizes)

intra-game benefits (e.g., power-ups, hints, clues, extra lives, freebies, etc)

persistent benefits (e.g., a power-up that remains with the player over a plurality of games)

downloads of software and other media (e.g., sounds for games, help files)

A prize to be provided to a player based on an authentication code may be determined based on:

authentication code game data (e.g., a player's score in a game, how a player played a game)

characteristics of the player (e.g., player's purchasing preferences, shopping habits, gaming preferences)

game data of one or more other players (e.g., a player may receive a prize based on his performance relative to other players)

In some embodiments a coupon may be wearable (e.g., a pin, button, pendant, medallion, ID badge, bracelet, etc). Player may be encouraged to wear the coupon to obtain benefits. For example, a player walks around the casino wearing the coupon, and is rewarded with "comps" and/or a player walks into department store wearing a coupon, and as a result an employee is summoned to assist the player.

In some embodiments a wearable coupon may indicate its presence:

bar code visible on coupon (e.g., ImageID™ tag) may be recognized by a video camera RFID tag on coupon communicates with electronic device (e.g., a terminal at the doorway to a store)

A coupon may include a plurality of codes. For example, a UPC code and/or an authentication code. The authentication code may be a code used in processing the coupon, similar to the NestEggz.com™ system. The authentication code may authenticate the benefit provided by the coupon.

In some embodiments the coupon may be a collectible item. For example, the coupon may be in the form of a Pokemon™ card, a baseball card, a pin, a button, a medal, a certificate of recognition, and/or a trophy.

In some embodiments, stenographic techniques may be used to disguise an authentication code. For example:

authentication code may be hidden on a coupon that is printed by a game machine authentication code may be hidden in packets of data that a game machine transmits over a computer network (e.g., as part of an online gaming session)

authentication code may be hidden in game data output by the game machine

Using stenographic techniques may make it more difficult for a player to hack a game machine by hiding the authentication code and thereby obscuring the effects of any hacks that a player attempts on the game machine.

The present invention has been shown and described in what are considered to be the most practical and preferred embodiments. It is anticipated however that departures may be made therefrom and that obvious modifications will be implemented by persons skilled in the art.

Terms

The following terms are used throughout the specification and the claims. The example meanings, provided are merely for clarification purposes only.

Authentication: The process whereby the identity of the sender and/or integrity of a message is verified.

Authenticatable Balance Return Message (ABRM): An authenticatable message generated by the destination game computer which allows a player to return unused credits from a guest account back to the source game computer. The message may contain the secret serial number of the source game computer, the number of credits to return, the player PIN, and the current date/time.

Authenticatable Challenge Message (ACM): A message used in the challenge/response protocol that instructs the game software to generate an encrypted response message which enables the challenge/response protocol and which may also verify that the player is in possession of, or obtained the game outcome from the game software which enabled the player to play the game that resulted in the outcome for which the player seeks registration.

Authenticatable credit authorization message (ACAM): An authenticatable message generated by the central computer which is used to supply the player with additional credits. The message may contain the secret serial number, the number of credits requested, PIN, and a random number or sequence number to ensure message freshness. The secret serial number ensures that the credits received can only be used in one game computer.

Authenticatable Credit Request Message (ACRM): An authenticatable message generated by the game computer as a request for additional credits from the central computer to be used in the pay-per-use system. The message may contain the secret serial number, the number of credits requested, PIN, a sequence number, or a random number. The random number or sequence number are used to ensure message freshness. The secret serial number ensures that the returning ACAM can not be used in multiple game computers.

Authenticatable Flat Rate Request Message (AFRRM): An authenticatable message generated by the game computer, which provides a player for unlimited game play over a specified time period. The message may contain the SSCID, the period of time requested, the player PIN or other identifier, and the current date/time.

Authenticatable Flat Rate Message (AFRM): An authenticatable message generated by the central computer in response to the AFRRM. The message may contain the SSCID, the period of time requested, the player PIN or other identifier, and the current date/time.

Authenticatable Guest Message (AGM): This authenticatable message is generated by the game computer and allows a player, to set up a guest account without bringing credits from the source computer. The message may contain the secret serial number of the destination game computer, PIN or other player identification, and the current date/time.

Authenticatable Guest Credit Message (AGCM): This authenticatable message is created by the central computer in response to an AGM. The message may contain the secret serial number of the destination game computer, the number of credits requested, and the current date/time.

Authenticatable Outcome Message (AOM): An authenticatable representation of the game outcome (i.e., score, time to completion, and/or play-related data, etc.) which may be based upon and include at least one of the following, the software ID, a hash value of the game software, a unique attribute of the memory media in which the game software resides, a player PIN, etc.

Authenticatable Play Enable Message (APEM): An authenticatable message communicated to the CPU of the game computer, which authorizes game play. It may contain the SSCID, a random number, or an identifying source of the APEM.

Authenticatable Point Redemption Message (APRM): An authenticatable message generated by the game computer, which allows a player to transfer reward points to the central computer. The message may contain the SSCID, the number of points received, the player PIN or other identifier, and the -current date/time.

Authenticatable Response Message (ARM): An authenticatable message utilized in the challenge/response protocol, and which may also verify that the player is in possession of, or obtained the game outcome from the game software which enabled the player to play the game that resulted in the outcome for which the player seeks registration.

Authenticatable Start Message (ASTM): An authenticatable message generated by the central computer which enables tournament play to begin. The message may include instructions for the game software to generate specified or random initialization parameters for that tournament game. The message may also contain information regarding encryption keys to be used in the encryption process and/or handicapping parameters.

Authenticatable Timing Message (ATM): An authenticatable message representing the time to completion for a race of skill which may include at least one of the following, the software ID, a hash value of the game software, a unique attribute of the memory media in which the game software resides, player PIN, etc.

Authenticatable Transfer Message (ATRM): This message is used by players to transfer credit balances from one game computer to another. The message may contain the secret serial number, PIN or other player identifier, current date/time, and the game computer ID from the destination game computer. The ID from the destination computer prevents a player from using an ATM in multiple game computers.

Authenticatable Unlock Request Message (AURM): An authenticatable message generated by the game computer, which allows a player to request an extension of his current end date. The message may contain the SSCID of the game computer, the requested end date, and a random number.

Authenticatable Unlock Message (AUM): This authenticatable message is generated by the central computer in response to a request for a new end date. The message may contain the SSCID of the game computer, the new end date, and the random number received in the AURM.

Authenticated Outcome Confirmation Message (AOCM): The authenticated game outcome (i.e., score, time to completion, and/or any play-related data).

Biometrics: The processes and procedures used to uniquely identify a given individual via an independent measurement system. (e.g. a fingerprint reader, voice recognition system, retinal scanner and the like.)

Broadcast Start Message (BSTM) A start message that is broadcast to all players at the same time over a mass communications channel, e.g., television, radio and the like.

Central authority: A system utilizing a central computer applying cryptographic protocols, which ensures that the manner in which games are played is scrupulously fair and unbiased, and that the outcomes of such games are reported accurately, i.e., there is no undetected lying or cheating.

Central computer: A computer or network of computers which serve as the official tournament manager and/or the authenticator of scores. The central computer may or may not have some or all of the game software residing on it. The central computer is generally accessed via a telephone network from remote locations where the game computers are disposed. The telephone network may include interactive voice response units (IVRUs) for prompting the player to enter information through a telephone keypad, or the game computers may communicate directly through a modem.

Central scoreboard: A centralized database where all certified scores are maintained. This information could be made available via the Internet or major online providers, downloaded to game computers, or by mail or telephone.

Certified outcome: A game score, time to completion and/or any play-related data which has been authenticated by the central authority as having been achieved legitimately (fairly) and reported accurately.

Challenge/response protocol: A process by which a central computer exchanges messages with the game computer in order to authenticate the outcome message using cryptographic protocols, and may also prove that the player is in possession of, or obtained the game outcome from the game software which enabled the player to play the game that resulted in the outcome which the player submits for certification.

Cheat codes: When entered into the game software, these codes allow a player special benefits such as unlimited weapons or an infinite number of lives. Typically used by game programmers to test their software. Also referred to as "God codes."

Check digits: Digits appended to a message which are generated as a simple function of the original message. The receiver of the message repeats the function. If the result, does not match the check digits, a transmission error has occurred.

Classic tournament: A non-electronic tournament. Classic tournaments usually contain four attributes: 1) They are held at a specific time; 2) They are held at a specific location; 3) They are conducted under a set of rules which apply equally to all contestants; and 4) They are held under the supervision of one or more judges and/or a sanctioning authority.

Compression: A protocol which utilizes an algorithm to reduce a long string of data to a shorter string while retaining all or most of the information in the original long string.

Controller secret serial number (CSSN): A number which uniquely identifies the game controller. This number may be burned into the ROM chip(s) of the controller.

Credits: Payment units used in a pay-per-use system. Players purchase credits from the central computer. Unused credits are stored in the meter of the game computer.

Cryptographic protocol: A protocol whose purpose, for the present invention, allows for one or more of the following:

1) outcome legitimacy, i.e., the player did not simply invent an outcome, it was the result of playing a specific game.

2) outcome paternity, i.e., the outcome was generated by a specific game, and/or by a specific game computer and/or software package.

3) outcome integrity, i.e., the outcome has not been tampered with or modified in any manner.

4) software integrity, i.e., the game software has not been tampered with or modified in any manner.

5) tournament validity, i.e., the outcome was generated as a result of tournament and not practice play.

6) one-time usage, i.e., an Authenticatable Start Message may only be used once.

7) transmission integrity, i.e., the outcome represented in an encrypted outcome message cannot be altered during transmission, either accidentally or intentionally, without detection of such alteration.

8) non-repudiation, i.e., does not allow the player who registered a score with the central computer to subsequently deny having done so.

Dedicated game system: A game console—such as those manufactured by Sega or Nintendo. Unlike a PC, their primary use is to play games.

Destination game computer: When setting up a guest account, this is the game computer which is receiving the credit transfer from the source computer.

Digital signature: A sequence of bits based on both the game message being signed and the signer's private key that the receiver can use to verify both the identity of the sender and the integrity of the message.

Division: Tournaments may contain different player groups such as beginner, intermediate and advanced, or groups delineated by geographic location.

Encryption: The process of describing a message in such a way as to hide its substance.

Encrypting key: Any data string used to encrypt a message in a cryptographic protocol.

Encryption/decryption module: A computer program, block of code, or hardware/firmware which encrypts, decrypts and authenticates messages and/or data.

End date: A date stored within the non-volatile memory of the meter. When the current date exceeds this date in time, the game computer and/or game software is disabled. Alternatively, a descrambler device for descrambling a scrambled video signal is disabled.

Entry: Each separate opportunity to play in a tournament. Each entry may allow for multiple rounds of play. Some tournaments may allow players to enter multiple times.

Entry fee: The cost to purchase each entry. Players might pay by giving their credit card number to the tournament central computer. A specific number of entry fees can be included at no extra cost with the purchase of game software.

External authentication device: A secure device in which the encryption/decryption module resides, e.g., the iPower card, available from National Semiconductor Corp.

External clock signal: A time signal generated by a third party that is widely broadcast. Several government operated atomic clocks broadcast such signals throughout the United States, as does the Global Positioning System. This external clock signal may also be directed to a particular receiver if the signal is encrypted with that receiver's public key.

False score: A score which was obtained by altering the game software or by invoking "cheat codes."

Firmware: Programs stored in ROMs or in other devices which permanently keep their stored information.

Forged score: A counterfeit score which is used to try and deceive the central authority into believing that a fair game was played and a true score achieved when in fact the player made up the score or stole it from another player.

Game computer: The computer on which a game (or test) is being played. The game computer may be a video game console (e.g., Nintendo, Sega and the like), PC, PDA, coin-operated arcade machine, portable game units (e.g., GAME BOY, GAME GEAR and the like), etc.

Game of skill: Any game whose outcome is predominantly determined by skill, either per game played or over a series of games, e.g., backgammon, bridge, poker, etc., Games of skill may include components of luck such as, for example, the use of dice.

Game of chance: Any game where randomness is a key or dominant element in determining the outcome, or where the outcome is determined largely by external forces beyond the control or significant influence of the player.

Game parameters: Attributes of a game such as the number of levels, difficulty or variability. These parameters can be manipulated by the central computer and communicated to the game computer through the Authenticatable Start Message.

Game software: Code executed by the game computer which allows a player to play a game. The game software typically resides on a cartridge, CD-ROM, floppy disk, hard disk, etc.

Guest account: A temporary account for pay-per-use game play set up on another player's game computer. This account is managed by the game computer's meter.

Handicap device: Head-to-head games in which one player is clearly better can be handicapped by using initialization variables that provide the weaker player with more lives, more ammunition, and the like. The handicap device produces these initialization variables based on player ratings or titles.

Handicap values: A numerical method for equalizing two factors such as players of varying ability. A golf handicap, for example, might be four strokes.

Hardware inspection: The process by which a piece of hardware, such as a game cartridge, is physically inspected prior to a final official declaration. In a tournament where the grand prize is large enough, the winning player may be required to submit his or her game cartridge to prove that tamper-evident internal seals were not broken.

Hardware security: The use of specialized components or structures that provide a level of tamper-resistance and/or anti-counterfeiting to programs or results.

Hash function: A function that takes an input string (usually a series of digits) and converts ("hashes") it to a fixed size, usually smaller, output string. The object is to "fingerprint" the input string so that the resulting hash value is very likely to represent one and only one input string. Changing a single bit of the input string will result in a different hash value.

Hash value: The resulting string of data ("the fingerprint") after applying a hash function to an input string.

Instant prize: A prize which is earned for achieving a result without any consideration of what may be taking place in other related games or with other contestants. A player in a golf tournament might be eligible to win $5,000 for hitting a hole-in-one on a certain hole without consideration to his or her ranking in the overall tournament.

Internal clock: A clock contained within a game or computer system.

IVRUs: Interactive Voice Response Units are computer systems that are tied into a telephone in such a manner that a user may select prompts and enter data from a touch tone keypad or via voice commands recognized by the IVRU software.

Key card: A smart card which is used for the secure generation of encryption keys. Each card may be unique, and messages encrypted using the keys in the card are decryptable by the central computer.

League play: Team play in which there are a series of regularly scheduled matches.

Memory media signature: A unique readable set of data which is based upon an inherent property of a particular memory media and which cannot be easily duplicated.

Non-volatile memory: Data storage media including ROM, hard disks, floppy disks, optical disks, and the like, which do not require any power supply to maintain the memory contents.

Off-line: When a computer is not connected to (e.g. via modem) or receiving an electromagnetic external signal of any kind (e.g. RF signal) from another computer or outside source.

One-way function: A function that is relatively easy to compute but significantly harder to reverse or undo. For example, it is easy to multiply two X-digit numbers and create a Y-digit result. It is very hard to take an Y-digit number and figure out which two X-digit numbers were multiplied together to create the Y-digit number.

One-way hash function: A hash function that is also a one-way function. It is easy to compute a hash value from an input string but it is hard to generate a string that hashes to a particular value. A One-way hash function is also known as a compression function, contraction function, message digest, fingerprint, cryptographic checksum, data integrity check (DIC), manipulation detection code (MDC), message authentication code (MAC), and data authentication code (DAC).

One-way hash with key: One-way hash functions that require the use of both an input string and a specific key string. (The "key" is an additional input string which may be secret.) Only someone with the key can calculate the hash value, i.e., the hash value is encrypted with the key.

On-line: When, a computer is connected to, or receiving a signal from another computer. Typical examples include PCS on a local area network, PCS connected to the Internet using a modem and phone line, or cellular phones connected to the central phone switch over a wireless network.

On-line proctor: An on-line connection to a website or service whose purpose is to continuously or intermittently verify that a tournament game is proceeding in a manner consistent with the game's rules. This might involve temporary connections to verify that the software code governing the game has not been altered. It might also pose random simple questions to the player (e.g. what is your middle name) that would prevent an automated play system from being used.

Outcomes: A score, time to completion, and/or any play-related data that was the result of all or part of playing the game. The play related data may include special statistical information as determined by the game software, or the play related data can be used by the central computer to compile statistical information. Alternatively, an outcome may consist of all the game data for the entire game, i.e., the entire game is recorded in memory, including all of the player's actions, responses, moves and the like.

Outcome message: Outcome data exchanged between a game computer and the central computer.

Public-key certificate: A public key signed by a trusted authority.

Premiums: Non-cash prizes, e.g., tee shirts, coffee mugs, posters, certificates, etc.

Pre-paid tournament entries: Tournament entries paid in advance of the tournament start date.

Prize: A product or cash reward associated with the outcome of a tournament. Typically, players earn prizes in relation to their performance in the tournament. Cash prizes can be paid via check, electronic fund transfer, digital cash or credit card. Prizes may also take the form of credits toward future game play, or may represent non-material rewards such as recognition.

Qualification points: Points earned toward a given rank. Bridge players, for example, receive master points for tournament wins.

Ranking: The hierarchical position of a certified score (#1, #225, etc.). The hierarchy can be based on all contestants or limited to certain agreed groups or limitations (e.g. #4 in the state, #6 in a high school, etc.).

Rating: A value assigned to a player based on one or more certified scores, often achieved over a period of time. A chess rating is expressed as a 3 or 4-digit number such as 1,825. Ratings are based on achievement, not on position relative to others (rankings). Thus, two players could each have the same chess rating.

Sanctioning authority: The authority responsible for overseeing the policies and procedures used in connection with a tournament.

Save/resume code: A code which allows a player to temporarily stop a game, freezing the action until the resume code is entered into the game software.

Secure perimeter: A defined physical area of hardware which is tamper-resistant and/or temper-evident, in which resides data or algorithms whose characteristics must not be alterable in order for a system to remain secure.

"Self-starter" tournament: A tournament where the element of when the player competes is controlled by the player, though a permissible window of time may be set forth by the tournament director. A tournament to solve a puzzle where the solution is expected to take several weeks, might allow for players to start when they wanted so long as the player's start time is after a predetermined start date for the tournament.

Software ID number: A unique ID number incorporated into the game software which uniquely identifies the particular copy of the game software and which is difficult to alter in an undetectable manner.

Software registration process: A process by which the player sends personal information and a serial number SSN identifying a copy of the game software back to the central authority. Each game software copy may utilize a registration card having a special hologram and/or serial number SSN associated therewith which is difficult to forge.

Software security: The use of cryptographic techniques such as hash functions to ensure the integrity of the game software.

Software serial number SSN: A readily ascertainable (i.e., known) identification number associated with each copy of the game software. Not to be confused with the software ID contained within the game software and which is not known to or easily accessible by the player.

Source game computer: When setting up a guest account, this is the game computer which is sending the credits to the destination computer.

Sprites: The video representation of game characters. Players maneuver sprites with the game controller.

Start message: A message transmitted from the central computer to the game computer that activates a tournament game.

Submission: The process by which a player transmits a game outcome to the central computer.

Subscription fees: Monthly or yearly charges which allow a player a certain number of tournament entries.

Tamper-resistant: Hardware or software which is difficult to modify or alter from its intended purpose. In some cases, attempts to alter such hardware or software will render the hardware or software inoperable. In other cases, tampering is detectable by cryptographic tests.

Tamper-evident: Hardware or software which, upon inspection or interrogation shows evidence of any attempt or success at the modification or alteration of its intended purpose or stored data.

Tie-breaker: A secondary result other than the final score which is used to rank players of equal scores in lieu of a head-to-head playoff. For example, a computerized golf tournament might decide the winner based on the score, and, if scores are tied, then the tie is broken based on play-related information such as the fewest putts taken, and if the players are still tied, then based on the distance of the longest drive. Tie-breaks can also be based on, for example, the number of keystrokes or clicks of a mouse.

Time-stamp: A secure timing protocol for attaching the current time and/or date to a message. A time-stamp may be done with a secure device such as the central computer or via a trusted third party such as a digital time stamping service.

Title: Ratings within a given range qualify their holders to a "rank" or honorific title based on predetermined ranges. Thus a chess "expert" is rated between 2,000 and 2,290 and a black belt in karate is someone who has achieved certain measured standards of proficiency. The achievement of a certain title is not necessarily based on numerical scoring, but rather on certain play-related data such as number of levels completed or number of opponents defeated and the like.

Token: A tamper-resistant and/or tamper-evident portable device (e.g., an iPower card) used for one or more of the following:
1) storing of secret or private keys.
2) storing random digits.
3) encrypting and/or decrypting messages.
4) signing and/or verifying messages.

Tournament: Any contest where players, singly or in teams, compete for prizes and/or rankings.

Tournament ID number: A number uniquely identifying the tournament.

Transmission error check module: A computer program or block of code which examines the check digits on incoming messages to ensure that no transmission errors have occurred.

Types of tournaments—There are many different types of tournaments. The following represent some of the more common varieties:

In a scoring tournament, a player plays against the game (and/or a clock) and the highest score wins. Golf, bowling or duplicate bridge are classic scoring tournaments.

In a head-to-head tournament, players compete against each other instead of against the game. Boxing and tennis are classic head-to-head tournaments. These tournaments are interpersonal in nature.

In a puzzle tournament, players compete to solve a puzzle, sometime ranked by time, other times, simply in a race to be first. A crossword puzzle tournament might be a good example of this.

Talent competitions are another type of tournament. Unlike scoring tournaments which usually do not involve subjective elements, a talent competition utilizes judges to evaluate performance and award scores based on subjective elements. A gymnastics tournament is an example.

Finish-line races, are a form of head-to-head tournaments whereby the fastest time as measured against a field of competitors is the determinant of winning. A car race or 100 yard dash is won by the person who finishes first, regardless of the time involved.

Forecasting competitions are those that involve the comparative accuracy of a series of predictions, such as handicapping a football season or predicting a variety of financial indicators at some future time. Lottery games such as Lotto may be thought of as a non-skill forecasting tournament.

Note that all types of tournaments can either be single-player or multi-player (teams).

Volatile memory: memory media such as RAM, in which all stored data is lost if power is interrupted.

Website: Any computer connected to the Internet which is capable of being accessed via the World Wide Web.

We claim:

1. A method, comprising:
    receiving, by a gaming machine and from an entity other than a player, an authenticatable start message defining an initialization parameter for a game;
    generating an outcome for the game using a game program and the initialization parameter, in which at least a portion of the game program is stored in a memory of the gaming machine;
    generating, via an encryption/decryption module stored in a secure perimeter associated with the gaming machine, an authenticatable outcome message based on the outcome;
    communicating the authenticatable outcome message to a central computer, the central computer being configured to authenticate the authenticatable outcome message;
    generating, via the encryption/decryption module, a value based on at least a portion of the game program; and
    verifying the game program based on a comparison of the generated value with a stored value.

2. The method of claim 1, further comprising:
    disabling the game program based on the comparison of the generated value and the stored value.

3. The method of claim 1, in which the entity comprises a central server.

4. The method of claim 1, in which the encryption/decryption module resides within a portion of the memory that is non-alterable.

5. The method of claim 1, in which at least one of a portion of the game program and an encryption/decryption module resides on a central computer.

6. The method of claim 1, in which the entity comprises a dongle removably coupled to the gaming machine.

7. The method of claim 1, in which the initialization parameter is randomly determined by one or more of a central computer and a dongle removably coupled to the gaming machine.

8. The method of claim 1, in which generating the authenticatable outcome message comprises:
    encrypting the outcome with a secret key that is shared with a central computer, in which the central computer is further configured to decrypt the authenticatable outcome message with the secret key.

9. The method of claim 1, in which generating the authenticatable outcome message comprises:
    hashing the outcome with a message authentication code and a secret key, in which a central computer is further configured to hash the authenticatable outcome message with the secret key.

10. The method of claim 1, in which generating the authenticatable outcome message comprises:
    encrypting the outcome with a private key, in which a central computer is further configured to decrypt the authenticatable outcome message with a public key associated with the gaming machine.

11. The method of claim 1, further comprising:
    receiving a random number generated by a central computer; and
    in which generating the authenticatable outcome message comprises:
        incorporating the random number in the authenticatable outcome message.

12. The method of claim 1, in which the generated value is a hash value of the game program.

13. The method of claim 12, further comprising:
    signing the hash value using a private key and a digital signature protocol.

14. The method of claim 13, in which the signed hash value is verifiable using a public key.

15. The method of claim 14, in which the public key resides at a central computer.

16. The method of claim 14, in which the public key resides at the gaming machine.

17. The method of claim 13, in which the private key resides in the encryption/decryption module.

18. The method of claim 12, in which the authenticatable outcome message includes the hash value.

19. The method of claim 1, in which the game comprises a tournament and in which the initialization parameter causes the game to be non-symmetrically varied in accordance with a differential between abilities of players in the tournament.

20. The method of claim 1, in which the game comprises a tournament and in which the initialization parameter is defined by a central computer to equalize playing conditions for players with differing ability within the tournament.

21. The method of claim 1, in which the stored game value is stored within the secure perimeter.

22. The method of claim 1, in which the authenticatable start message is received from a central computer.

23. The method of claim 1, in which the authenticatable start message is received from a handicap device.

24. The method of claim 1, in which verifying comprises:
determining by the gaming machine that the generated value does not match the stored value.

25. The method of claim 1, in which verifying comprises:
determining that the generated value and the stored value do not match.

26. The method of claim 1, further comprising:
determining that the game program should be disabled.

27. A computer readable medium storing instructions configured to direct a processor to perform a method, the method comprising:
receiving, by a gaming machine and from an entity other than a player, an authenticatable start message defining an initialization parameter for a game;
generating an outcome for the game using a game program and the initialization parameter;
generating, via an encryption/decryption module stored in a secure perimeter of the computer readable medium, an authenticatable outcome message based on the outcome;
communicating the authenticatable outcome message to a central computer, the central computer being configured to authenticate the authenticatable outcome message;
generating, via the encryption/decryption module, a value based on at least a portion of the game program; and
verifying the game program based on a comparison of the generated value with a stored value.

28. A gaming apparatus, comprising:
a processor;
a display device controlled by the processor; and
a memory in communication with the processor, the memory storing software including a game program, the processor being operable with the software to:
receive, by the gaming apparatus and from an entity other than a player, an authenticatable start message defining an initialization parameter for a game;
generate an outcome for the game using the game program and the initialization parameter;
generate, via an encryption/decryption module stored in a secure perimeter associated with the gaming apparatus an authenticatable outcome message based on the outcome;
communicate the authenticatable outcome message to a central computer, the central computer being configured to authenticate the authenticatable outcome message; and
generate, via the encryption/decryption module, a value based on at least a portion of the game program.

29. The method of claim 1, in which the game is a game of chance.

30. The method of claim 1, in which the game is a game of slots.

* * * * *

UNITED STATES PATENT AND TRADEMARK OFFICE
CERTIFICATE OF CORRECTION

PATENT NO. : 7,362,862 B2 Page 1 of 1
APPLICATION NO. : 11/284309
DATED : April 22, 2008
INVENTOR(S) : Bruce Schneier et al.

It is certified that error appears in the above-identified patent and that said Letters Patent is hereby corrected as shown below:

In column 1, line 17, INSERT -- a -- preceding "Continuation-In-Part".

In column 8, line 48, INSERT -- also -- following the word "but".

In column 17, line 2, DELETE "cryptograhic" and INSERT -- cryptographic -- following the word "when".

In column 68, line 50, DELETE "machine's" and INSERT -- machines -- following the word "Vending".

Signed and Sealed this

Thirtieth Day of June, 2009

JOHN DOLL
*Acting Director of the United States Patent and Trademark Office*